US005566353A

United States Patent [19]

Cho et al.

[11] Patent Number: 5,566,353
[45] Date of Patent: Oct. 15, 1996

[54] POINT OF PURCHASE VIDEO DISTRIBUTION SYSTEM

[75] Inventors: Nack Y. Cho, Mill Valley; Jerry E. Magilton, Jr., San Francisco, both of Calif.

[73] Assignee: Bylon Company Limited, Kowloon, Hong Kong

[21] Appl. No.: 301,320

[22] Filed: Sep. 6, 1994

[51] Int. Cl.$^6$ ............................................. H04N 7/00
[52] U.S. Cl. ................................ 455/2; 348/2; 348/13; 455/3.1; 455/6.3
[58] Field of Search ................... 455/3.1, 3.2, 4.1, 455/4.2, 5.1, 6.1, 6.3, 11.1, 12.1, 13.1, 13.3, 7, 14, 15, 16, 18, 19, 2, 31.1, 32.1, 33.1, 39, 49.1, 53.1, 66; 345/2; 348/2, 6, 12, 13, 61, 552; H04N 7/00, 7/10, 7/20, 7/22

[56] References Cited

U.S. PATENT DOCUMENTS

| | | |
|---|---|---|
| Re. 31,735 | 11/1984 | Davidson . |
| 4,028,733 | 6/1977 | Ulicki . |
| 4,630,108 | 12/1986 | Gomersall .................. 358/84 |
| 4,720,873 | 1/1988 | Goodman et al. . |
| 4,724,491 | 2/1988 | Lambert . |
| 4,725,886 | 2/1988 | Galumbeck et al. . |
| 4,814,883 | 3/1989 | Perine et al. . |
| 4,916,539 | 4/1990 | Galumbeck . |
| 4,937,821 | 6/1990 | Boulton . |
| 5,029,014 | 7/1991 | Lindstrom . |
| 5,099,319 | 3/1992 | Esch et al. . |
| 5,119,188 | 7/1992 | McCalley et al. . |
| 5,132,992 | 7/1992 | Yurt et al. . |
| 5,133,081 | 7/1992 | Mayo ........................... 455/66 |
| 5,151,782 | 9/1992 | Ferraro . |
| 5,155,591 | 10/1992 | Wachob . |

FOREIGN PATENT DOCUMENTS

| | | |
|---|---|---|
| 0624040A2 | 11/1994 | European Pat. Off. ........ H04N 7/173 |
| 2613520 | 10/1988 | France .......................... 345/2 |
| 3534652 | 4/1987 | Germany ....................... 345/2 |
| 62-36932 | 2/1987 | Japan . |
| 62-235835 | 10/1987 | Japan . |
| 63-276337 | 11/1988 | Japan . |
| 1-97028 | 4/1989 | Japan . |
| 1-103335 | 4/1989 | Japan . |
| 1-220925 | 9/1989 | Japan . |
| 2-295240 | 12/1990 | Japan . |
| 3-70438 | 3/1991 | Japan . |
| 3-117123 | 5/1991 | Japan . |
| 3-145828 | 6/1991 | Japan . |
| 3-196726 | 8/1991 | Japan . |
| WO94/03995 | 2/1994 | WIPO . |
| WO94/10775 | 5/1994 | WIPO ........................ H04K 1/02 |
| WO94/14283 | 6/1994 | WIPO ........................ H04N 7/163 |

*Primary Examiner*—David E. Harvey
*Attorney, Agent, or Firm*—Townsend and Townsend and Crew LLP

[57] ABSTRACT

A video distribution system for full motion video media, usually in the form of advertisements, that allows video programs to be transmitted from a distribution center to a multitude of receiving sites, typically retail stores, dispersed over a wide geographic area. Video program segments are transmitted from the distribution site (100) and received at the receiving sites (254). Television monitors located at selected points in the receiving sites display the video program segments to an audience, which usually will include shoppers in the course of shopping. The invention allows users located in the distribution center to customize the video programs for particular target audiences or markets, such that the series of programs played in one receiving site could be quite different from that played in another.

23 Claims, 14 Drawing Sheets

POINT OF PURCHASE VIDEO DISTRIBUTION SYSTEM

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

The present invention relates generally to audio-visual media broadcasting and advertising. More specifically, the invention relates to transmission systems for distributing point-of-purchase video advertising and related information to stores.

Commercial network television has been recognized as a powerful and efficient medium for broadcasting advertising messages to a large, widely disbursed audience. As a result, network television traditionally has garnered a major share of advertising budgets. However, due to a variety of factors, commercial television advertising revenues have been dropping over the past several years, a trend which is expected to continue. One major drawback of television advertising is network television's ability to do nothing more than deliver a large number of impressions to a large and relatively undifferentiated audience. Advertising dollars are ineffectively spent on messages that reach the wrong audiences under the wrong circumstances. Further, national network television is well suited only for the limited number of product categories which are truly national in scope and relatively impervious to regional and seasonal variation. Moreover, the cost of multiple regional campaigns will often equal or exceed that of a national program.

Point of purchase promotion accomplishes what in-home television cannot, in large part because it is directed not toward passive, unreceptive viewers, but rather toward consumers who are actively making choices and seeking information. Ample evidence demonstrates consumers in a shopping environment are much more susceptible to televised messages than otherwise.

While meeting with substantial success, prior point of purchase advertising systems have met with some limitations. In some cases they are based on a static, print-oriented media comprised of signage or packing labels, with product messages lost in the clutter. On-site demonstrations or educational devices are often prohibitively expensive, take up valuable selling space and are limited to a store by store approach.

One known system of electronic point of purchase advertising utilizes silent electronic dot repeating message signs, similar to reader boards found in major airports and brokerage houses, in the high-traffic aisles of supermarkets. Such silent reader boards, with limited two-dimensional displays, do not have the effectiveness of television in catching and retaining viewer attention.

Another known variation on electronic point-of-purchase advertising utilizes electronic display screens such as liquid crystal displays on individual shopping carts which convey messages to the shopper. Such systems again do not have the effectiveness of television, and further require a great deal of maintenance down-time due to their susceptibility to damage.

Other known systems have used satellite-transmitted television to broadcast advertising into supermarkets. However, such systems are typically based on commercial network programming and have typically located television monitors only at checkout counters. Further, known satellite-based systems do not permit on-line selective customizing of promotional messages.

U.S. patent application Ser. No. 07/926,664, incorporated herein by reference for all purposes, and PCT international application No. PCT/US93/07449, also incorporated herein by reference for all purposes, respond to the need for an effective and cost-efficient point-of-purchase promotional medium. These patent applications provide methods and apparatus for distributing and broadcasting a customized video program from a distribution center to a plurality of geographically dispersed receiving sites. These patent applications are pioneering in the field of audiovisual media broadcasting and the advertising field. A unique aspect of these systems are their capability for on-line creation of audio-visual programs customized for individual retail chains, stores, or ultimately aisles within a store, as well as for particular geographic areas and times of day. Unique programs tailored to a particular demographic market are assembled on-line and broadcast simultaneously to a multitude of different locations. This feature eliminates the need for producing separate video programs on separate videotapes for each customized program desired, and requires little or no operational intervention of personnel at the store.

SUMMARY OF THE INVENTION

The present invention responds to the need for a more effective, cost-efficient point-of-purchase promotional scheme. The invention provides a method and apparatus for distributing and broadcasting a customized video program from a distribution center to a plurality of geographically dispersed receiving sites.

The present invention is a video media distribution network including (1) a distribution center which transmits video program segments to the receiving sites, (2) receivers which receive the segments, (3) a tracking system which tracks the product movement at the receiving sites, (4) a network management system which forms playlists for each of the receiving sites in response to inputs from a user, and (5) display units which display the playlists in the receiving sites. The user, located in the distribution center, has access to the product movement information.

In the preferred embodiment, entertainment-based commercial promotional programming in full motion video format is broadcast via a communication medium to the point of purchase in retail outlets nationwide. The signal is received at each retail store and later broadcast throughout the store by monitors, preferably located over the aisles and the major walls. The location of monitors and the volume level of the speakers are preferably designed to unobtrusively blend in with each stores decor and enhance its aesthetics while being easily visible to shoppers as they move through the aisles.

One aspect of the present invention is an advanced method of providing a "store and forward" feature. "Store and forward" occurs when the video program segments are stored in the receiving site and later forwarded to the display unit by the system's network management software when the segments are needed for a playlist. A playlist is a particular program sequence requested by a user who is located in the distribution center. Currently available transmission equipment cannot provide the required store and forward feature of the present invention. Thus, the present invention provides a new store and forward feature which allows for flexible access to the various video program segments (clips) at the receiving site.

The present invention is compatible with many different media of data transportation. Several different communication media between the distribution center and the receiving site can be implemented. These communication media may include one or more of a satellite with one channel, a dedicated communication channel, a dedicated optical fiber link and/or telephone connections. These communication media can also be used as a back up to one another, in conjunction with one another or alone in order to efficiently and cost-effectively transmit and assist in the transmission of the required video from the central site to the receiving sites.

In the preferred embodiment, the program segments (clips) are transmitted in digital signals. Therefore, only a single transponder of a satellite is required. Usually, the digital signals are compressed in the distribution center using advanced digital compression techniques.

The invention further affords communication between the system's technical operation center and the receiving computers in each retail location. This is particularly useful for product promotions and pricing changes, wherein a network advertiser offers a reduced price, coupon, two-for-one sale, or other such promotion. Additionally, purchase time, aisle where purchased, and cashier information can be tracked for monitoring product movement (sales of consumer goods) in each receiving site. The monitoring of product movement can also be used to determine the effectiveness of the overall system and to refine the video distribution system.

Because of its ability to more efficiently tailor its commercial messages to particular chains, stores, times of day and geographic regions, the video distribution system of the present invention provides advertisers the capability to reach target audiences with customized messages. Further, such customized programming is assembled on-line at each receiving site, eliminating the need for preassembly of multiple unique programs, or the involvement of personnel at the receiving sites.

The distribution center includes an uplink technical operation center and an uplink earth station which utilize two-to-one redundancy in order to reduce system downtime. In addition, the receiver system can be a time division multiplex system which receives a digital data sent by the uplink control system. The data are stored in compressed form and then decoded/converted such that it can be viewed and heard in the receiving sites (stores).

The network management system in the preferred embodiment schedules and sequences commercials and other programming segments comprised of digitized videos which are played in the receiving sites. A wheel concept is used to continually display commercials and other program segments in an efficient manner. The network management system determines what is displayed at the stores along with when it is to be displayed, and it also determines commercial placement in the various levels within retail organizations (produces a customized program).

The distributed audio system in the preferred embodiment provides audio control assistance to the display of the customized program by adjusting the level of audio in various areas of the retail store in response to the existing noise levels in various zones within the retail stores.

The receiving sites of the present invention are not limited to stores. The present invention could be used to distribute customized programs to many different types of receiving sites. For example, hospitals, schools, other facilities open to the public, and/or other community gathering places could be receiving sites.

Moreover, the video segments distributed to the receiving sites could contain picture alone, audio alone, a combination of video and audio, and/or multi-media.

A further understanding of the nature and advantages of the invention may be realized by reference to the remaining portions of the specification and the drawings.

DESCRIPTION OF SPECIFIC EMBODIMENTS

The present invention provides a distribution network for transmitting real-time motion video, usually in the form of promotional advertisements, from a distribution center to a multitude of receiving sites, typically retail stores, dispersed over a wide geographic area. Video segments (clips) for programs are transmitted from the distribution center and received at the receiving sites. Television monitors located at selected points in the receiving sites display programs to an audience, which usually will include shoppers in the store. Importantly, the invention provides for customizing programs for particular target audiences or markets, such that the program played in one receiving site could be quite different from that played in another. Equally important is the invention's flexibility in on-line formation of customized programs without the need for preassembly of each unique program or operational involvement of personnel at the receiving sites.

After the clips have been received and stored in the receiving sites, the system's software scheme performs the on-line program formation automatically in order to form the playlists. In the preferred embodiment, users enter the desired playlists for each receiving site into the system from the technical operation center. The user may enter one set of playlists for many stores, may update playlists in a few stores, etc. For each individual receiving site, the software assembles the desired playlist with the clips stored in that receiving site, and then forwards the clips to monitors for display.

This advanced method of storing and forwarding clips is similar to the accessing of data files in a personal computer. The store and forward feature allows for flexible access to various video clips. Each video clip is separately encoded and compressed such that it can be handled as a data file is handled in a personal computer. Currently available transmission equipment cannot provide the required store and forward feature because of the extensive access to the compressed data files needed at the local receiving sites.

Figure 1:
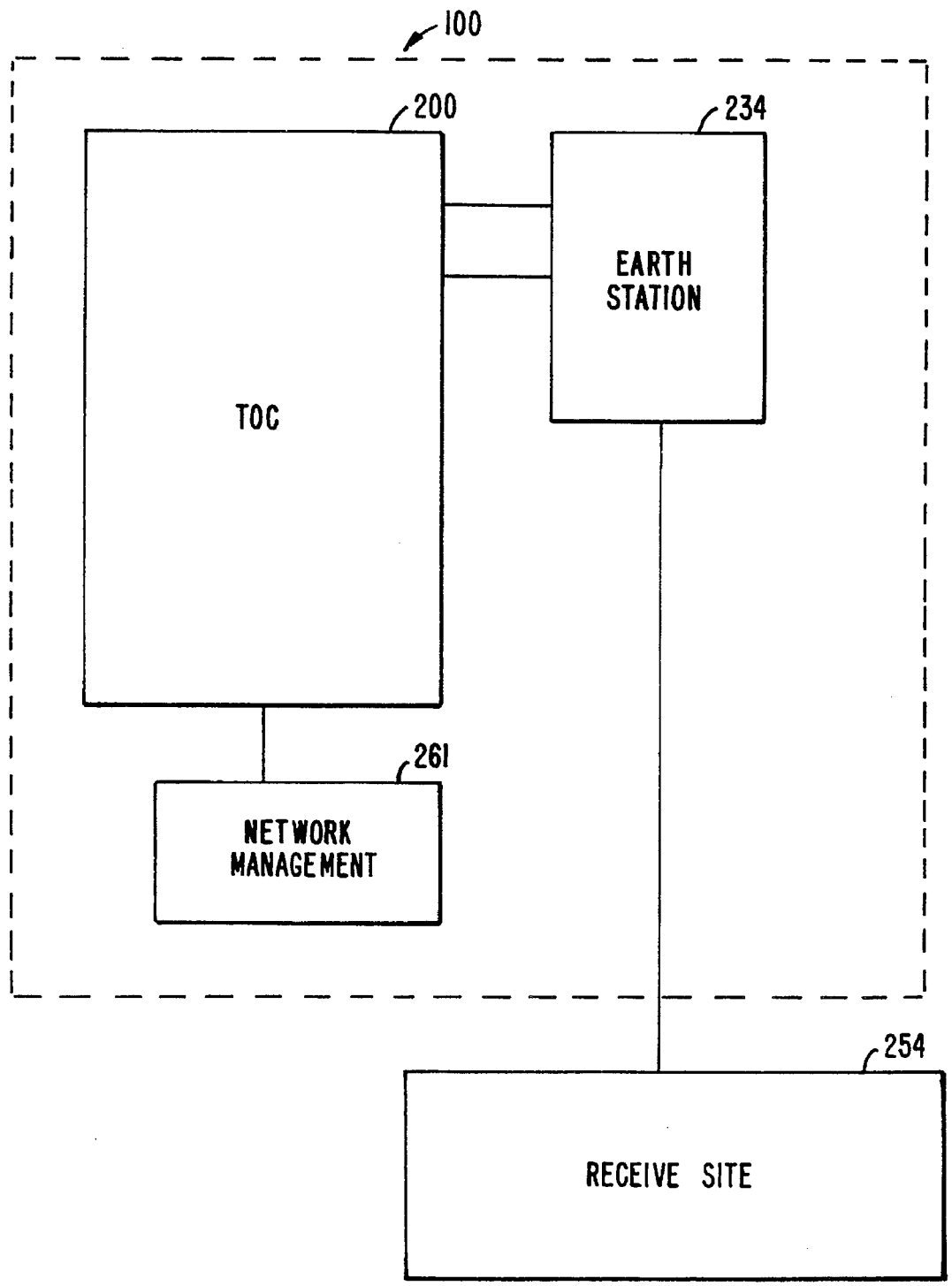
FIG. 1 is a block diagram of the distribution network system's compression uplink and downlink system.

In the preferred embodiment, as illustrated in FIG. 1, the distribution network includes a distribution center 100 (technical operation center 200, earth station 234 and network management 261) and a receiving site (receive system 254). FIG. 1 is a diagram of the video distribution system's compression uplink and downlink system. Clips are complied in technical operation center 200, prepared for distribution in earth station 234, and sent from earth station 234 to receive site 254 via one of the system's available media. Network management 261, which is coupled to technical operation center 200, contains the software which prepares the programs for display.

A. Communication Media

Several communication media are used in the preferred embodiment for sending clips and control data from earth station 234 to receive site 254. The media described below can be used (1) as a back up to one another, (2) in conjunction with one another, or (3) alone in order to efficiently and cost effectively transmit and assist in the transmission of the required video from the distribution site to the receiving sites. The available communication media for this system include: (1) satellite, (2) dedicated communication channel, and (3) dedicated optical fiber link (T1). In the preferred embodiment, only one satellite channel with a typical bandwidth (e.g., 36 MHz) is employed.

The dedicated communication channel involves a commercially available telephone line which is dedicated to the transmission of the video distribution network data. Commercially available modem products are sufficient connections for this communication medium. The dedicated optical fiber link (T1) is a dedicated data line on optical fiber link (MCI and AT&T provide this type of commercial service).

Each mode of transmission through a different selected transmission medium results in a different transmission rate and a different transmission time. For example, the transmission rate of a 30 second video segment (clip) compressed at 8.3 Mbps and sent through satellite (half transponder) is 21.5 Mbps. In comparison, the same clip with the same compression has a transmission rate of 1.5 Mbps when sent through an optical fiber link (T1). For further comparison, the transmission rates and transmission times for a 30 second clip compressed at 8.3 Mbps and 1.2 Mbps, and sent through the described media are presented below:

| Medium | Compression | Trans. Rate | Trans. Time |
| --- | --- | --- | --- |
| Half transponder | 8.3 Mbps | 21.5 Mbps | 11.6 seconds |
| T1 circuit | 8.3 Mbps | 1.4 Mbps | 2.6 minutes |
| Dial up | 8.3 Mbps | 56.0 Kbps | 1 hr. 15 min. |
| Half transponder | 1.2 Mbps | 21.5 Mbps | 1.7 seconds |
| T1 circuit | 1.2 Mbps | 1.5 Mbps | 30 seconds |
| Dial up | 1.2 Mbps | 56.0 Kbps | 11 minutes |

B. Uplink Control System

1. Technical Operation Center

Figure 2:
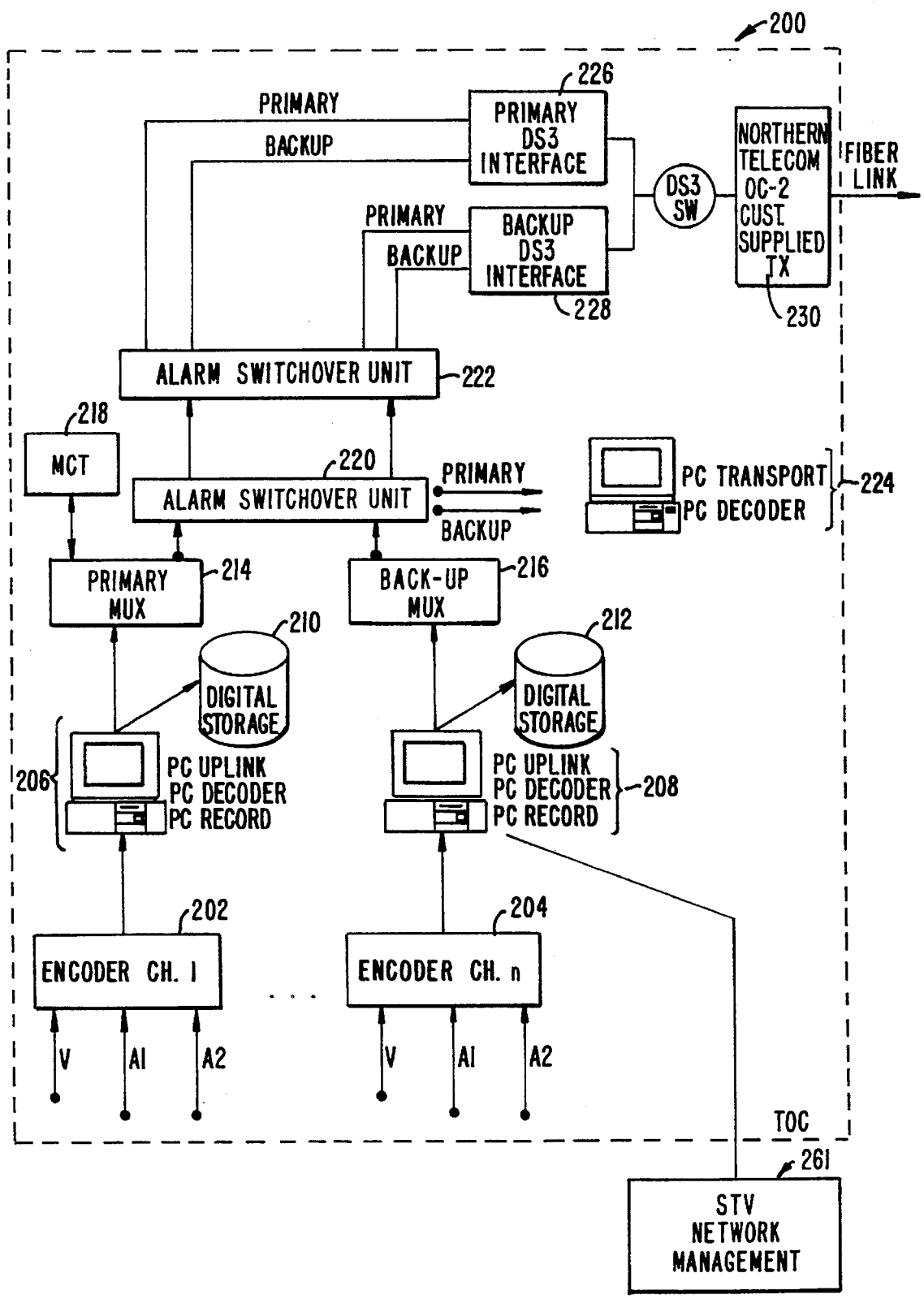
FIG. 2 is a diagram of the distribution network system's technical operation center.

FIG. 2 is a diagram of the video distribution system's technical operation center. Technical operation center 200 arranges and prepares the clips along with control data which will be sent to the receiving sites from earth station 234. In the preferred embodiment, this system has a 2-to-1 redundancy such that channel 1, which travels through encoder 202, is replaced by channel N, which travels through encoder 204, if any difficulties arise. These two channels could be utilized together in order to prepare and send clips along with control data to earth station 234. Moreover, additional channels could be employed to work in unison with or as back-up to channel 1. In the preferred embodiment, channel N is a stand-by unit. Thus, channel N is used, for example, when channel 1 is down.

Video, audio 1 and audio 2 (represented by V, A1 and A2) enter encoder 202 and are encoded from analog to digital signals. Video, audio 1 and audio 2 make up the program clips which are sent to the receiving sites. After the signals are encoded, they are then sent to-channel personal computer ("PC") 206. Channel PC 206 decodes and compresses the signal and then sends the signal to digital storage 210 and/or primary MUX 214. Digital storage 210 houses the clips until they are needed, and MUX 214 multiplexes the signal sent by channel PC 206. Multiplexer control terminal ("MCT") 218 controls MUX 214 and contains the systems clock. The signal sent to MUX 214 is the signal which will ultimately be sent to the receiving sites. Thus, channel PC is directly controlled by the Network Management software which determines which clips are needed in the receive sites.

The signal then travels from MUX 214 into two alarm switchover units 220 and 222. Alarm switchover units 220 and 222 work in conjunction with PC 224 in order to ensure minimum system downtime by providing for data transport through several paths to DS-3 Interface 226 or DS-3 Interface 228. The DS-3 samples the received signal, detects where information is in the signal and preserves that information. The data next enters Northern Telecom OC-12 230, which transforms the signal into light such that the signal can travel through optical fiber. The signal is then sent from technical operation center 200 to earth station 234 through optical fiber.

Many different hardware configurations can be employed to achieve the signal transfer described in the above paragraphs. In the preferred embodiment, encoder 202 is, for example, a D5200 DSR MPEG-1 (Moving Picture Experts Groups) encoder commercially available from Scientific Atlanta. This unit, which is combined with the record, uplink, transport and decoder boards described below, supports a wide spectrum of digital storage, transmission and retrieval applications.

Channel PC 206 preferably contains a PC based satellite uplink board (D5320 Scientific Atlanta), a PC decoder board (D5101 HI-MEM Scientific Atlanta) and a PC record board (D5310 Scientific Atlanta). The PC based satellite uplink board is used to transfer compressed digital data to digital multiplexer 214 (D9100 Scientific Atlanta). The PC decoder board formats and transfers compressed digital video, audio, and closed captioned data to SCSI-2 (Small Computer Standard Interface) digital storage device 210. The PC decoder board also decodes the compressed audio and video data in real time from digital storage 210 or from an ISA (Industry Standard Architecture) bus at bit rates from 8.3 to 1.5 Mbps while maintaining the audio-video synchronization at all times. The PC's utilized in technical operation center 200 and in receive site 254 can be any IBM compatible 386 or 486 PC operating at, for example, 33 MHz. Channel PC 206 contains a PC uplink board which prepares the data for serialization.

The outgoing data from PC 206 may be stored in digital storage device 210. Digital storage 210 interfaces with a fast SCSI-2 drive. The storage device may be, for example, a Seagate Barracuda series hard disk. The primary MUX 214 is, for example, a time division multiplexer. According to one specific embodiment, the MUX 214 is a D9100 21.5 Mbs multiplexer from Scientific Atlanta. MCT 218 is a computer (PC) and software which controls the MUX and contains the systems clock. The MCT allows for the combining of video control data (used for the remote site) with the actual video footage.

Alarm switchover units 220 and 222 can be D9157 Alarm Switchover Units from Scientific Atlanta. When the primary MUX is down the alarm warns the operator and activates the stand-by components (channel N back-up MUX 216 etc.). Monitoring PC 224, which includes a PC transport board (D5330 Scientific Atlanta) and a PC decoder (D5101 HI-MEM Scientific Atlanta), controls which channel is being used as a primary or as a back-up. The monitoring PC also checks and monitors the data traveling through the alarm switchover unit for problems. If a problem arises, PC 224 controls the switchover units such that the signal is sent via a different path. The monitoring PC in conjunction with the two alarm switchover units form a four-way system similar to a bus in a network. Thus, four different paths are available for data transport which results in little, if any, downtime in the system.

Next, under normal circumstances, the data enters primary DS-3 interface 226 which can be a D9700 DS-3 Interface that accepts two 21.5 Mbs inputs, such devices are available from Scientific Atlanta. As stated above, DS-3 226 samples the received signal at a rate of 21.5 Mbs and detects where information is in the signal and preserves the detected information.

OC-12 230 (consumer supplied TX) is a passive device with an opto-coupler which transforms the received modulated signal into light so that the signal can travel through optical fiber. As stated above, the signal is then sent from technical operation center 200 to earth station 234 through optical fiber.

2. Earth Station

Figure 3:
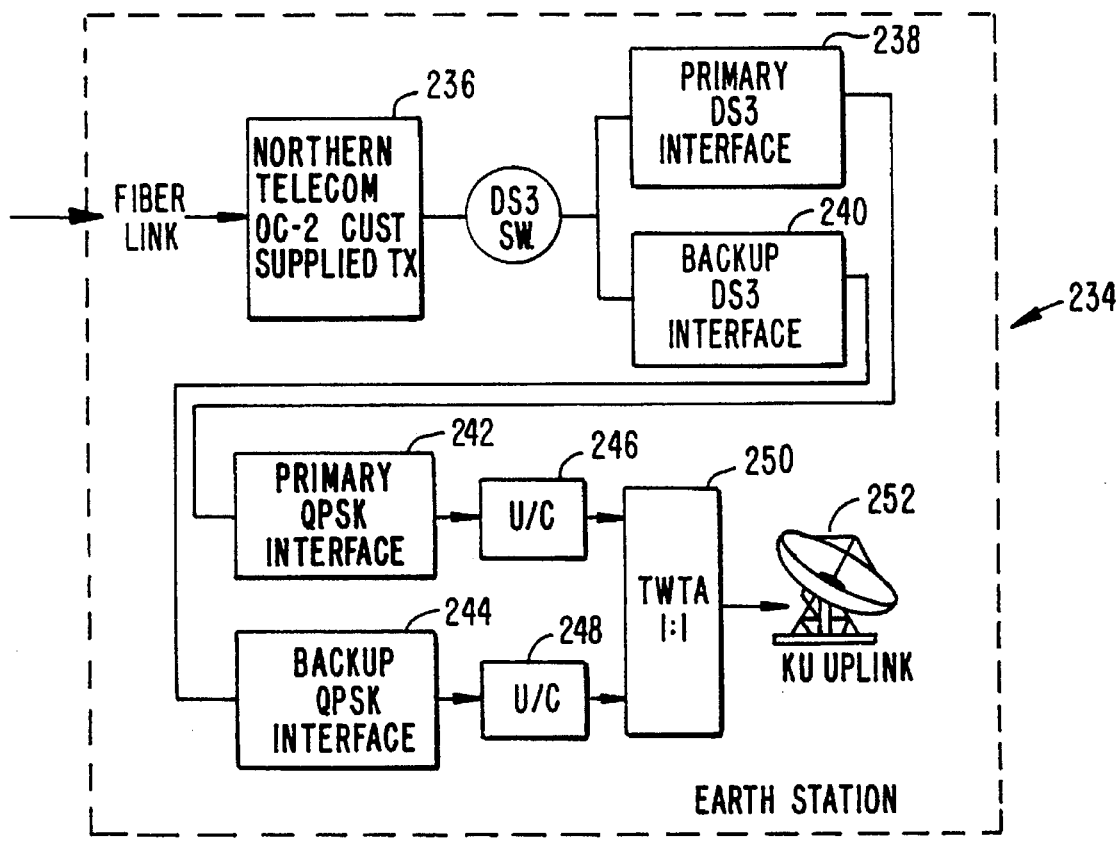
FIG. 3 is a diagram of the distribution network system's earth station.

FIG. 3 is a diagram of the video distribution system's earth station. In the preferred embodiment, earth station 234 is physically distanced from technical operation center 200. Devices DS-3 Interface 226 through DS-3 Interface 240 are only required if uplink earth station 234 is remotely located from technical operation center 200. The data enters earth station 234 and goes directly to Northern Telecom OC-12 customer supplied TX 236 where it is transformed back into the digital form it had before entering Northern Telecom OC-12 customer supplied TX 230. The information then, under normal conditions, enters primary DS-3 interface 238 which is the same device as primary DS-3 interface 226.

The data next enters primary QPSK Mod 242 which is a Quadrature Phase Shift key Modulator. This device Modulates the signal into the quadrature phase which results in a better signal-to-noise ratio than the normal PSK. The signal then enters Ku-band upconverter ("U/C") 246 which changes the baseband signal entering the device into a Ku band frequency.

Various hardware configurations can be utilized to send data through the earth station. In the preferred embodiment, QPSK Mod 242 is a D9170 43.0 Mbs QPSK Modulator from Scientific Atlanta. U/C 246 is, for example, a 7795 Ku-Band Upconverter from Scientific Atlanta. U/C 246 includes a mainframe which is ovenized (for controlling the temperature) and a 10 MHz reference oscillator with a synthesizer which stops the frequency from drifting (phase locked). In addition, U/C 346 has a 70 MHz intermediate frequency, a 40 MHz bandwidth, +7 dBm output power, a 115 VAC input voltage characteristic and is 50/60 Hz.

The path of Channel N mimics the path of Channel 1. Therefore, Channel PC 208 is equivalent to Channel PC 206, digital storage 212 is equivalent to digital storage 210, backup MUX 216 is equivalent to primary MUX 214, backup DS-3 interfaces 228 and 240 are equivalent to primary DS-3 interfaces 226 and 238, backup QPSK Mod 244 is equivalent to primary QPSK Mod 242, and U/C 248 is equivalent to U/C 246. This 2-to-1 redundancy greatly reduces any system downtime.

The signal is then sent to TWTA 250 which is a traveling wave tube amplifier. This device is used to amplify the signal in the KU band frequency. Finally, the signal is uplinked through the KU uplink 252. Any of the above-described media can be used to send the signal from earth station 234 to the receiving site 254. In the preferred embodiment, KU uplink 252 is a satellite utilizing a typical bandwidth transponder, (e.g., 36 MHz).

C. Receiver System

Figure 4:
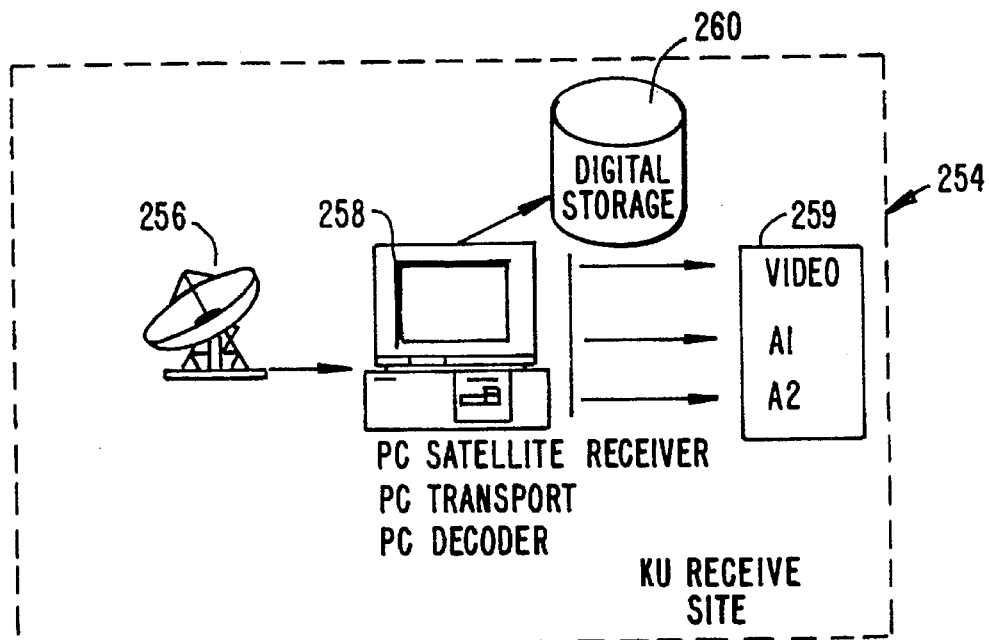
FIG. 4 is a diagram of the distribution network system's receive system.

FIG. 4 is a diagram of the video distribution system's receive system. In the preferred embodiment, receiving site 254 is a satellite receiver 256 time division multiplex system. Satellite receiver 256 can be a D9410 TDM Receiver from Scientific Atlanta. Receiver 256 is synchronized with the uplink's system clock and checks the timeframe of the incoming signal to see if it matches up with the system clock. When a proper matching of the time slot in conjunction with the correct address assigned to the local site occurs, the received signal is demodulated and then sent to receiving PC 258 which contains a PC transport board (D5330 Scientific Atlanta) and a PC decoder board (D5101 HI-MEM Scientific Atlanta).

From receiving PC 258, the signal is sent to digital storage 260 and stored there in compressed form. Digital storage 260 can be any storage device which has a typical access time (e.g., 8 msec) and a typical amount of storage (e.g., 2 gigabytes). For example, a Seagate Barracuda series hard disk may be used for digital storage 260. The PC decoder within receiving PC 258 takes information from digital storage 260 and decodes/converts it into NTSC which is compatible with video V, and audio 1 A1 and audio 2 A2, for display on a monitor 259.

After being stored in digital storage 260, the clips are accessed as needed for display in the receive site. PC 258 works in conjunction with the network management software to provide the desired program for display.

D. Tracking System

In the preferred embodiment of the invention, a tracking system is utilized to track purchase time, aisle where purchased and cashier information for product movement (sales of consumer goods) in each receiving site 254. This PC based system is a user friendly database system which automatically collects data from the stores. The monitoring of product movement is used to determine the effectiveness of the overall system and to refine the system.

Usually stores already have scanning systems in place which collect all transactional data, or data of particular interest, during each business day. This data is then stored locally on, for example, an IBM 4680 computer (scanning system) connected to a PC with a Token Ring Network. The present invention utilizes the data collected by the scanning systems by building a database with this collected data at technical operation center 200.

In the preferred embodiment, the tracking system utilizes a Pentium based PC which runs a FoxPro database. This database/PC is, preferably, located in the distribution center and is connected to Network Management 261. The FoxPro database interfaces with Receiving PC 258 and downloads a full day of product movement information from each store. This downloading can be done through a modem (phone line). The FoxPro database then provides reports detailing product movement resulting from the video distribution network. In the preferred embodiment, the correlation between the actual product movement in the store and which program segments (clips) have been displayed in the store is determined by the network management software. This information is then utilized by users to determined if any modifications should be made to the system. The network management software allows the user located in the technical operation center to make quick modifications based on the actual product movement in each of the stores.

E. Network Management System

The network management system allows the user to create programs by scheduling and sequencing the clips comprised of digitized videos which are to be displayed in the retail stores. The network management system determines what is to be displayed at each of the retail stores along with when it is displayed. Moreover, the network management system monitors which clips are located in each receiving site and which additional clips are required in each receiving site to display the desired programs. This information is then used to determine which clips will be sent from the distribution center to each receiving site.

Playlists are lists of video clips that are to be displayed at each of the retail stores. A playlist is created for each store on a periodic basis (e.g., daily). If the playlist is unique to even the lower levels of the retail organizations, then a voluminous number of playlist combinations are developed. Thus, the number of playlists could number from the tens to thousands.

Receiving PC 258 contains the store and forward hardware which holds the available clips required by the playlist for displaying. Changes in the playlist after clips have been delivered to the stores is possible. The Network Management system makes sure desired new clips added to the playlist are accessible from the store and forward device before the insertion or deletion of clips related to a playlist alteration is allowed. In the preferred embodiment, modifications to the playlist (this includes "last minute" modifications) are made through a phone line which is connected to the store's local PC system via a commercially available modem.

A "wheel" concept is used to handle the high volume of commercials and other programs which are displayed in the stores. A wheel is a cycle of time that represents the format of what will be shown on the televisions in the stores. For example, if the wheel cycle is three hours, then every three hours the display would repeat itself. The network management system provides the cycling needed for this wheel concept. Multiple wheels per day allow the system to establish playlists for the entire day. Additionally, the wheel format simplifies the contract, invoicing and billing required because these can be initially based on the original wheel(s) and later changed based on the actual number of plays. Rates may be set and sold by the wheels.

The software in the network management system interacts with channel PCs 206 and 208. In the preferred embodiment, the distribution center sends enough data to fill the downlink digital storage in a receiving site with approximately 2 gigabytes of information. Each receiving site has a store number or address, and each playlist is assigned one or more store numbers/addresses such that certain playlists are distributed to certain stores depending on the user's desired distribution.

Playlists are refreshed or replaced weekly such that different clip combinations can be used for different times on different days during particular weeks, or in any other planned time frame. A clip can contain various combinations of news, facts, commercial information, product information, etc. The digital storage in each receiving site includes a local clip library which has all of the clips required to make up the combinations for the playlists in each store. Each individual program is a clip and clip numbers are assigned at the local receiving site (store). Each significant combination of clips are considered a program, and programs are numbered and identifiable on a global basis.

The network management system is really a trafficking system which keeps track of the all the clips at each local library. The network management system can change the combination of clips in any manner at any time. Management commands, such as the acknowledgement that a program/playlist transmission was received or the warning that specific clips in a playlist are not available, are sent with the playlists from the uplink center to the receiving site. The PC decoder within receiving PC 258 stores the commands for the playlist log in receiving PC 258.

The above-described technique utilized by network management system 261 allows a small amount of playlists to be used extensively and-can also give emphasis to certain programs which are market specific in response to the demographics of the local area. This massive flexibility is extremely valuable because desired changes and additions can be quickly implemented. Moreover, information sent weekly from the uplink to the receiving site could be programmed to replace only stale or selected parts of the playlists or of the program clips (if desired). This saves in transmission costs and time along with memory space required at the receiving site.

F. Software

In the preferred embodiment, a software scheme is used for the Tracking System and the Network Management System (including software for databases and forms). The software described in this section is included in the attached Appendix. The core functionality of the software is to (1) generate playlists for the stores, (2) use the satellite to send required information for the playlists and (3) communicate with the store for quick software updates, for program status and for emergency situations (e.g., a substitute playlist needs to be sent to a store before the next scheduled satellite uplink).

1. Network Management Software Databases

The Network Management software includes, for example, the following databases: Store Info Database, Playlist Database, Clip Library Database, Template Database, System Database, Equipment Database and Uplink Database. First, the Store Info Database has, for example, (1) a table of store site information (e.g., store ID, store name, street address, city, state, country, country code, area code, exchange, number, manager, modification information, modifying operator, data telephone, etc.), (2) a site disk contents table which lists all the clips located at that particular receiving site, and (3) the number and content of site playlist sockets (playlist sockets are places where a "wheel", as defined above, can be placed).

The Playlist Database has, for example, (1) a table of playlists names for the receiving sites which includes the playlist IDs along with the template IDs (a template works as the backbone of the playlist and is described in greater detail below), the playlist's create date, the creating operator, the playlist's modification date and the modifying operator, and (2) a contents table for each playlist that gives information on the clips (e.g., clip sequence number) included in each playlist.

The Clip Library Database has, for example, (1) a table of valid clip types which includes a clip description along with valid run times for each of the valid clip types, and (2) a video clip table which includes the clip number, the clip title, the clip type, the clip run time and the clip frequency rate.

The Template Database has, for example, (1) a table of playlist templates which includes the template ID, the creating operator, the date of creation, the finalizing operator and the date of finalization, and (2) a template ID contents table which includes sequence numbers, clip type and clip duration.

The System Database has, for example, a table of system users which includes each operator's last name, first name, middle initial, security level, modification date and modifying operator. In the preferred embodiment, the users listed in this database are the individuals located in the technical operations center who control the content and sequencing of the video clips which are played in the receiving sites. This allows the clips to be organized and placed by someone in the technical operations center, rather than by individuals in the stores.

The Equipment Database has, for example, a table of system equipment which includes bar code information (e.g., equipment description, manufacturer, location and comments).

Finally, the Uplink Database has, for example, (1) a table of clip numbers to be sent to specific stores and (2) a table of playlist sockets (socket number and socket content) to be uploaded to specific stores. The information from this database is used to compile an uplink data file for broadcast to all receive sites.

2. Network Management Forms Software

Figure 5:
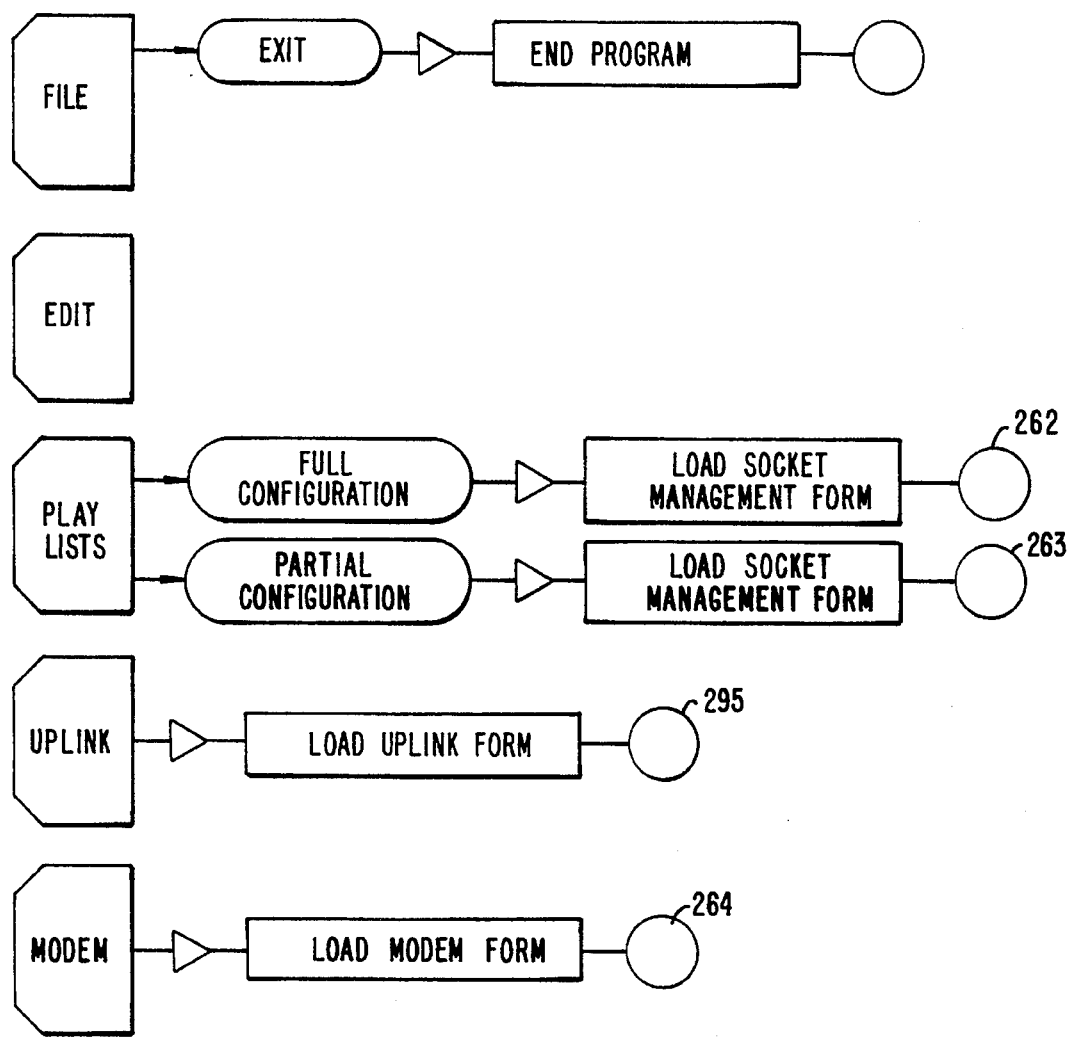
FIG. 5 is a diagram of a possible Windows menu setup for the Network Management Program.

Part of the system's software is divided into forms. These forms perform as subroutines would in a computer program. In the preferred embodiment, a Windows menu is utilized to walk the user through the various options and forms which are available. FIG. 5 is the diagram of a possible Windows menu setup for the Network Management Program. The user will initially see the following five available choices: FILE, EDIT, PLAYLISTS, UPLINK and MODEM. First, FILE allows the user to control the files which are open to that user. Each user has a security level which allows that user access to certain programs. User's with lower security levels will only be allowed to partially configure (i.e., edit rather than create) the playlists which will be played in the stores.

PLAYLISTS permits the user (depending on that user's security level) to edit a playlist with minor changes, or to create an entire playlist from scratch, or even to create a new template (all playlists are built upon playlist templates to ensure a proper playlist balance). The PLAYLISTS option loads the Socket Management Form 262 or 263 and gives the user access to certain parts of that form depending on the user's security level.

The software monitors which video clips are available at each receive site (Store Info Database) and which additional video clips are required to provide a desired playlist. When playlists or created or updated, the program determines which additional video clips are needed at the stores and sets a pending flag. The pending flag remains with these additional video clips until they are uplinked to the store which needs them. UPLINK loads the Uplink Form 295 which compiles the information (which includes the additional video clips) required at the receiving sites for the playlists.

MODEM loads the Modem Form 264 which gives the user elaborate modem communication with all the stores (allows user to update playlists and perform system maintenance).

Figure 6:
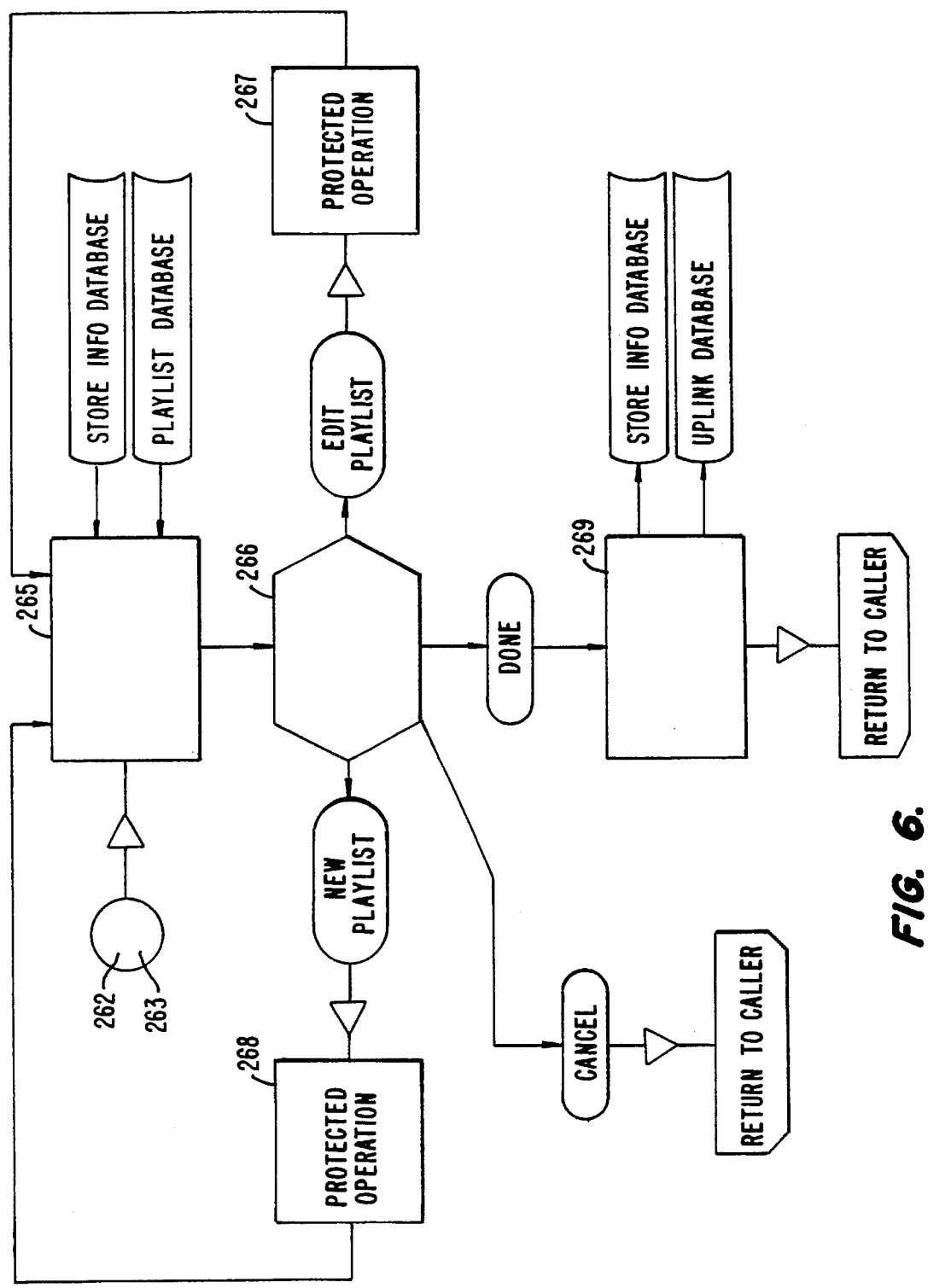
FIG. 6 is a process flow chart of the system's Socket Management form.

FIG. 6 is a process flow chart of the system's Socket Management Form. Playlist sockets are places where a "wheel" can be placed. When the user selects the PLAYLISTS option, the program enters the Socket Management Form 262 or 263 (depending on the user's security level) and displays a list of all store sites, the list of sockets for store no. 1 (as a default) and a list of all the available playlists 265. The user can then move through the list of stores displaying the sockets for each store in the process. The Store Info Database and the Playlist Database provide the information needed for this display.

The user can then select from the available playlists to fill sockets of a particular store site 266. Each store site has its own number of sockets. For example, if a store is displaying 30 minute wheels of playlists for 18 hours (all the store's open hours), the store has 36 sockets which must be filled with wheels of playlists. At this point, the user can also edit a playlist and/or create a new playlist depending on the user's security level. To edit a playlist, the Edit Playlist Form 267 is loaded.

Figure 7:
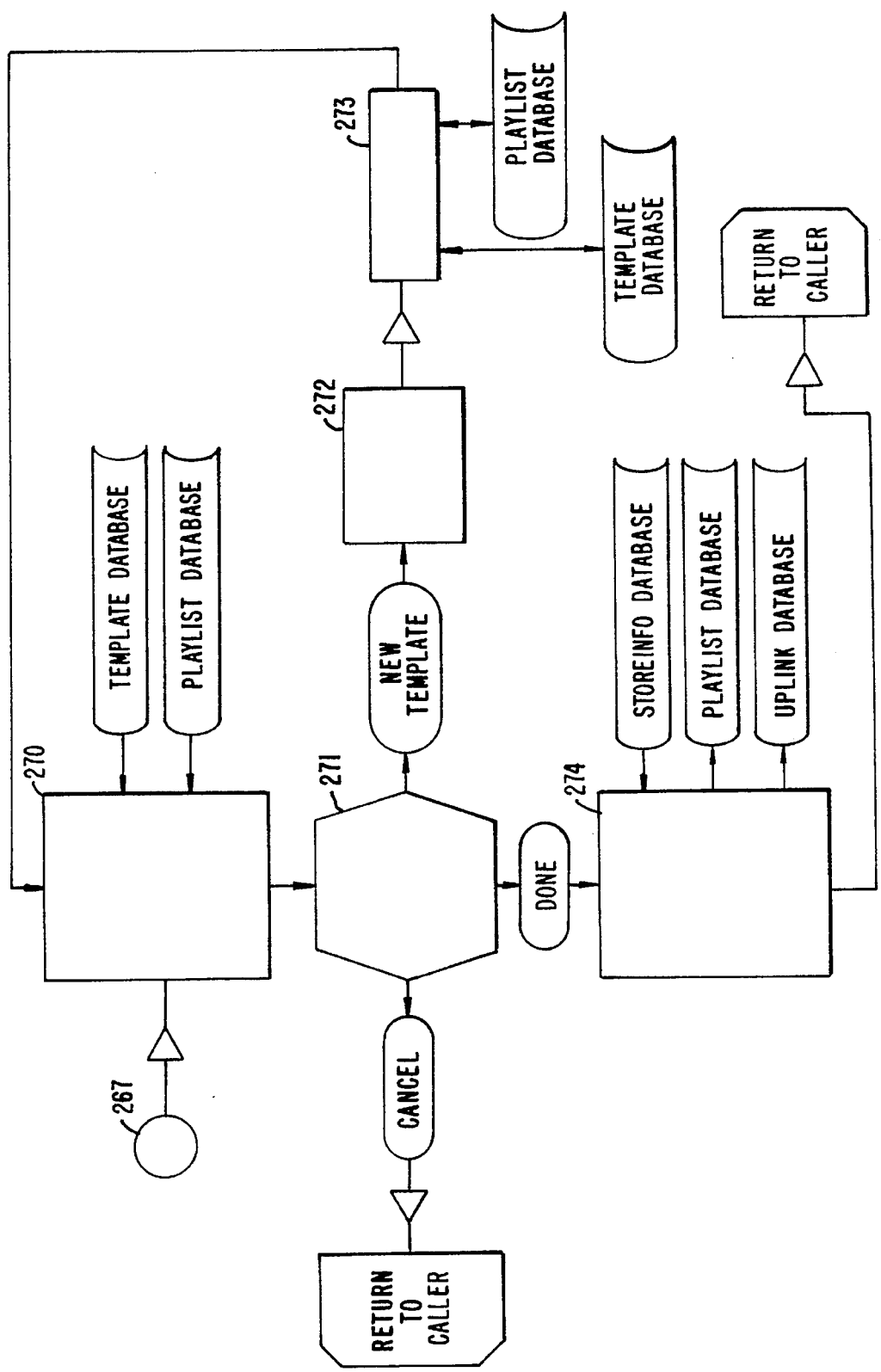
FIG. 7 is a process flow chart of the system's Edit Playlist form.

FIG. 7 is a process flow chart of the system's Edit Playlist Form. When the user selects the Edit Playlist option, the program enters the Edit Playlist Form 267 and displays a list of the contents of the selected playlist, the contents of the template used to construct that playlist, and the contents of the system's clip library (the clips being segregated by clip type) 270. The Template Database, the Playlist Database and the Clip Library Database provide the information needed for this display. The template used to construct the playlist is the backbone of the playlist. The template predefines the order of certain types of selected video clips. For example, a template for a 30 minute wheel playlist may begin with a commercial clip, then a news clip, then a fact clip, then another commercial clip, etc. This ensures the balance of the playlist and avoids any undesired order of certain clip types (e.g., 8 commercials in a row).

At this point in the program, the user can revise the playlist 271. The level of revisions available to the user depends on the user's security level. For example, if a user has a lower security level, the user may not be able to change any of the commercials in a playlist. Additionally, without regard to the user's security level, all playlists must conform to their respective templates.

The user can then opt to create a new template or save the playlist 274. If the user decides to create a new template, the program warns the user that all existing entries in the playlist will be removed/erased 272. The program then loads Open Template Form 273 (described below). If the user decides to save the playlist 274, the program (1) makes the corresponding changes to the Playlist Database and (2) uses the Store Info Database to notify the Uplink Database of all the stores that will need to receive the updated playlist and the updating video clips (the pending flag, introduced above, is also set at this time for additional video clips that need to be sent to stores).

Figure 8:
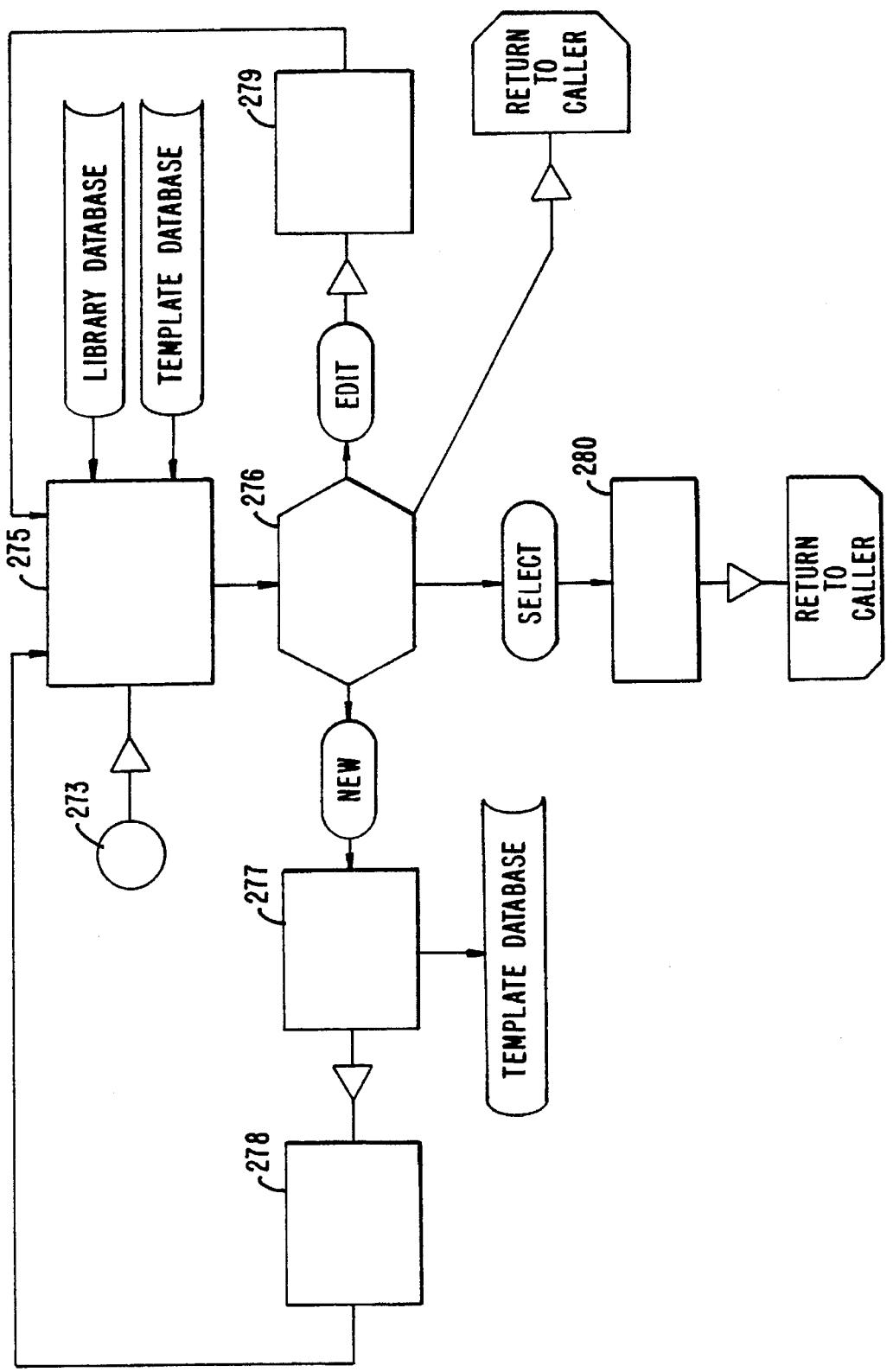
FIG. 8 is a process flow chart of the system's Open Template form.

FIG. 8 is a process flow chart of the system's Open Template Form. When the user selects the Open Template option, the program enters the Open Template Form 273 and displays a list of all the available playlist templates and a detail list with the video clip types located in the selected playlist template 275. The Template Database and the Clip Library Database provide the information needed for this display.

The user can then select the desired playlist template 276. This desired template can be edited or made into a new template. To edit the template, the program loads the Edit Template Form 279 (described below). Templates cannot be edited after they have been finalized (finalizing is described below). To make a new template, the user provides a new template name and the program adds the new template name along with an empty template to the Template Database 277. The user can then add to this empty template through the Edit Template Form 278.

Figure 9:
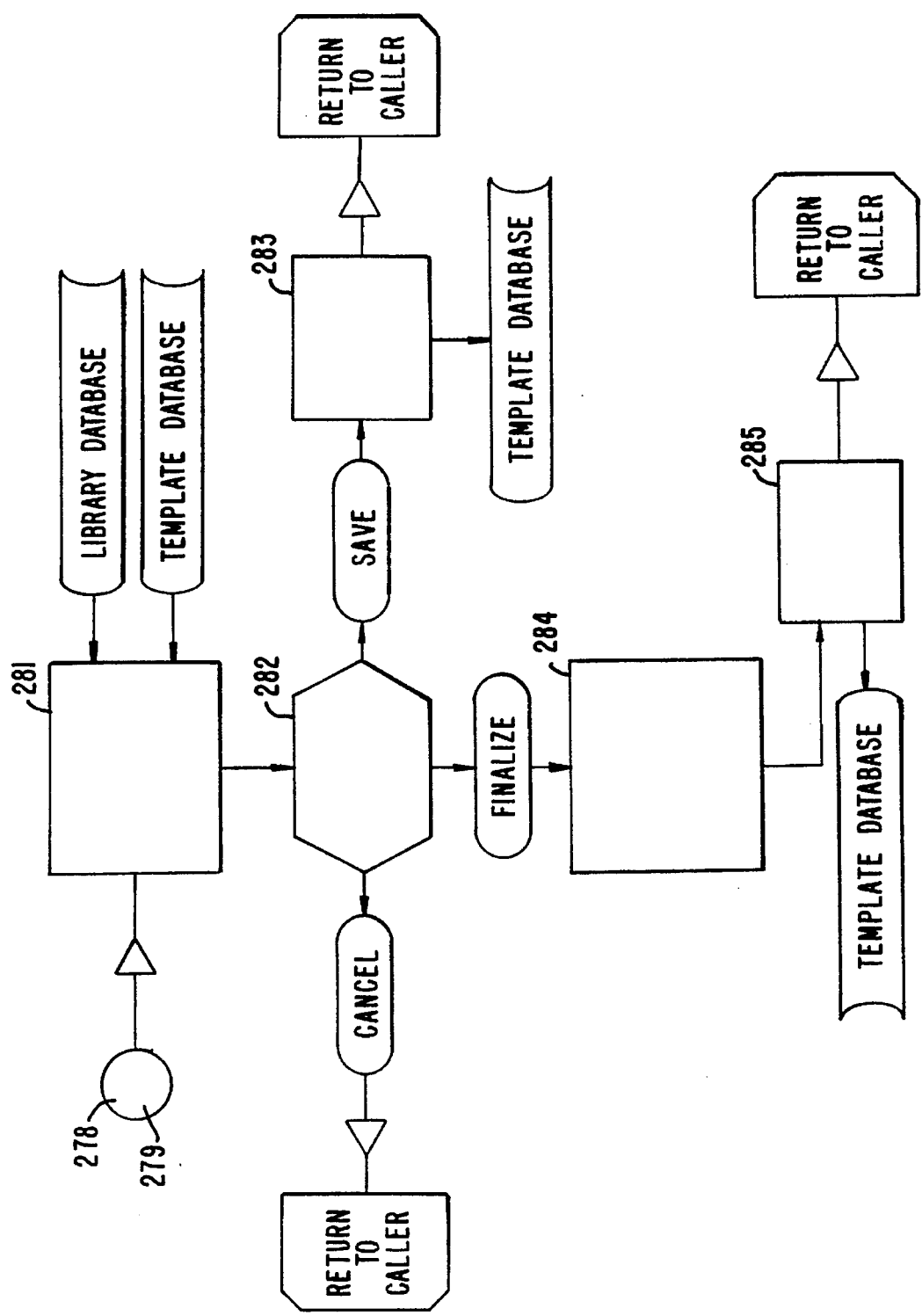
FIG. 9 is a process flow chart of the system's Edit Template form.

FIG. 9 is a process flow chart of the system's Edit Template Form. When the user enters the Edit Template Form 278 or 279, the program displays the contents of the selected template and the possible clip types along with associated valid clip durations 281. The Template Database and the Clip Library Database provide the information needed for this display. The user then builds/modifies the selected template using selections from the possible clip types 282.

After the user is done building and modifying the template, the user can choose between saving or finalizing that template. If the user saves the template, the originally selected template is removed from the existing table in the Template Database and replaced with the newly created template 283. If the user finalizes the template, (1) the program informs the user that this is a one-way operation because the template can no longer be changed/edited, and (2) the template becomes usable (a playlist cannot be added to a template until the user has finalized the template) 284. In addition, finalizing removes the selected template from the existing table in the Template Database and replaces the template with the newly finalized information (adding finalized data to the Template Database) 285. Finally, after a user has based a playlist on a template, the user cannot edit the template. If the user decides to change the template after a playlist has been based on it, the user must start with a new template (create a new template).

Figure 10:
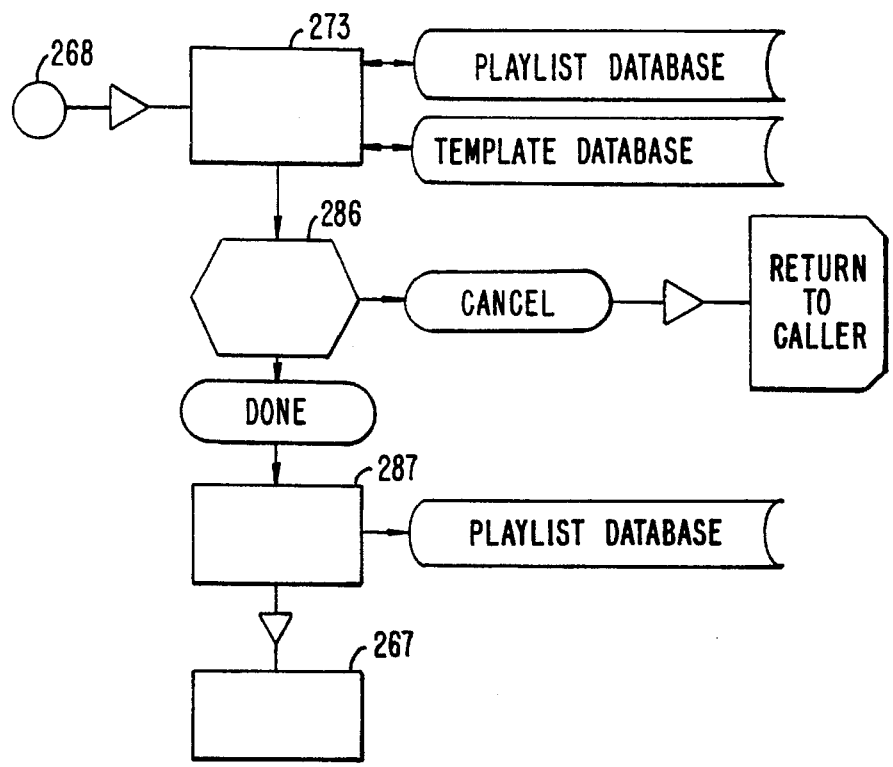
FIG. 10 is a process flow chart of the system's New Playlist form.

As stated above, while in the Socket Management Form, the user can edit a playlist and/or create a new playlist depending on the user's security level. To create a new playlist, the New Playlist Form 268 is loaded. FIG. 10 is a process flow chart of the system's New Playlist Form. After loading the New Playlist Form 268, the program loads the Open Template Form 273 and goes through that form as described above (see FIG. 8). When the user leaves the Open Template Form, the user returns to the New Playlist Form and is asked to input the name of the new playlist along with any comments the user may have 286. When the user is done, the Playlist Database is updated 287 and the Edit Playlist Form is loaded 267 (see FIG. 7). In sum, when creating a new playlist, the user gets an empty template to fill.

Figure 11:
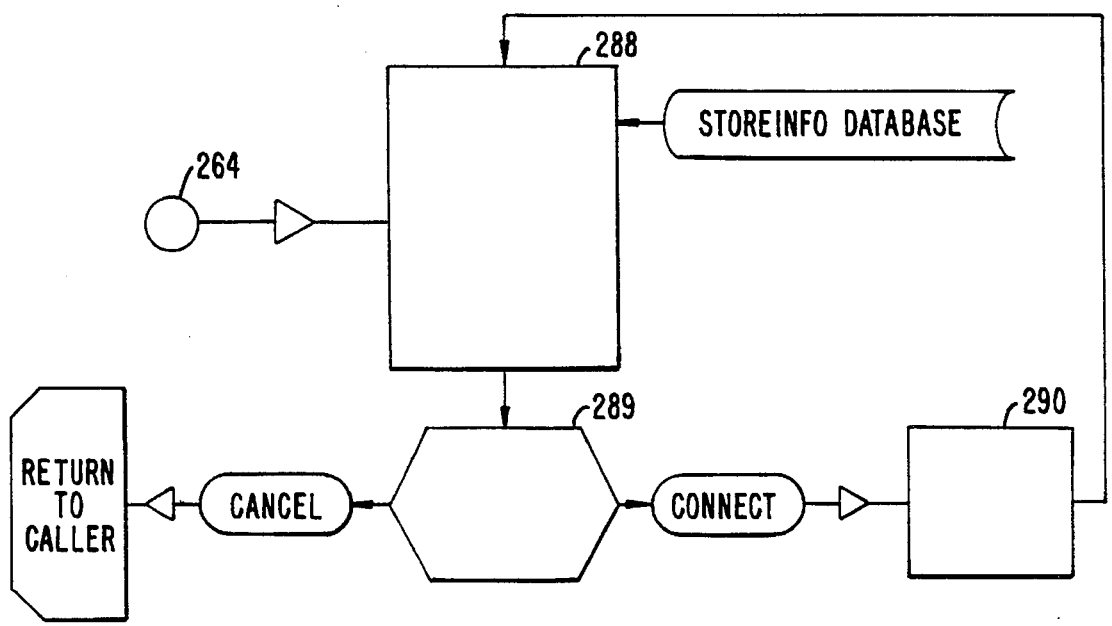
FIG. 11 is a process flow chart of the system's Modem form.

FIG. 11 is a process flow chart of the system's Modem Form. When the user selects MODEM (see FIG. 5), the program enters the Modem Form 264 and displays a list of all the receiving sites 288. The Store Info Database provides the information needed for this display. The user can then choose to connect to a receiving site 289. If the user decides to connect, the program enters Serial Store Communications Form 290 by dialing a phone, establishing a connection and loading store information.

Figure 12:
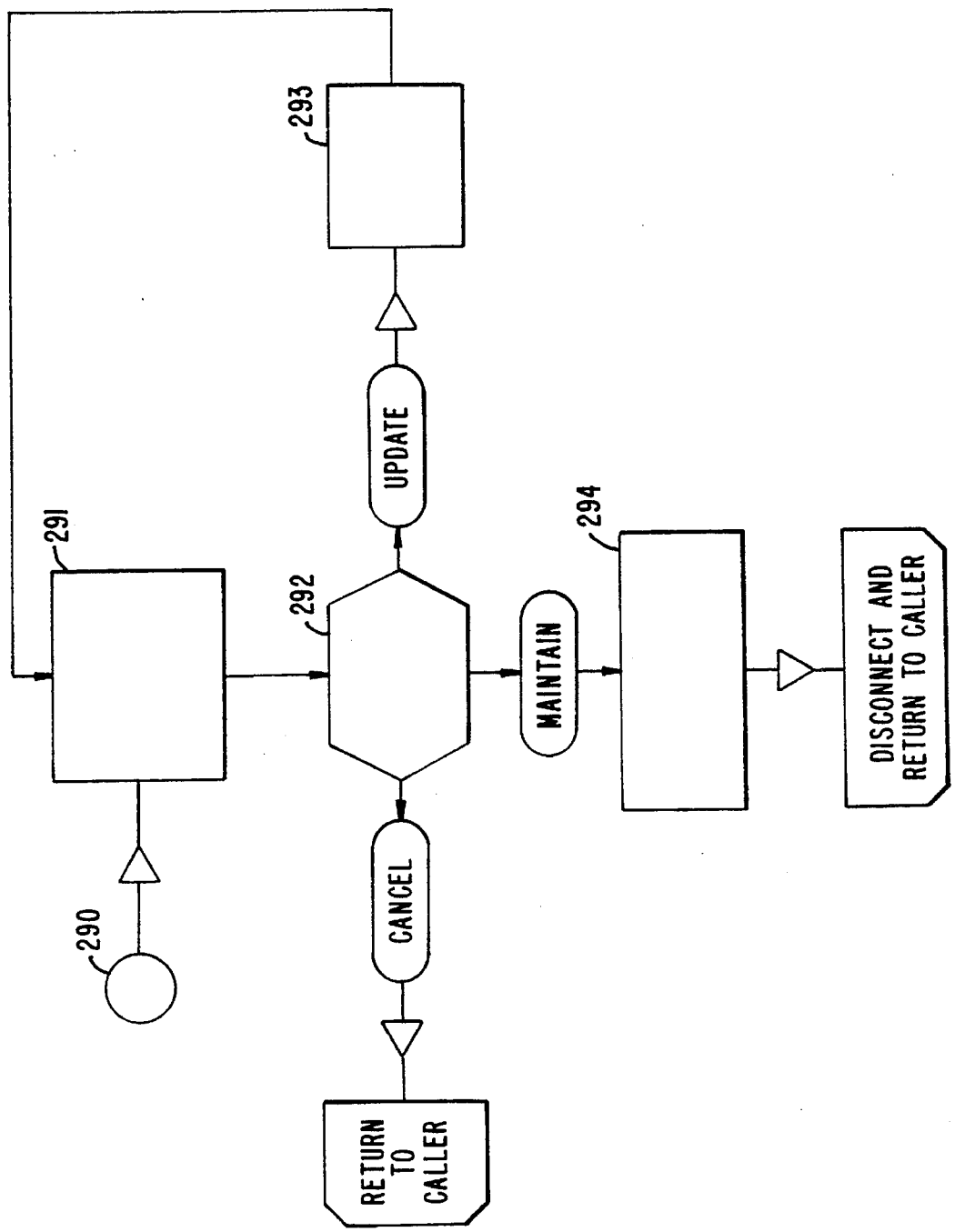
FIG. 12 is a process flow chart of the system's Serial Store Communications form.

FIG. 12 is a process flow chart of the system's Serial Store Communications Form. This Form begins by displaying the user's status and the information related to the downlink PC including uptime, error codes and log information 291. The user can then update playlist data or perform system maintenance 292. If the user decides to update, a new playlist is sent to the receiving site 293. The user can only change the playlists in the connected store if all the new clips required for the change are already in that store.

If the user decides to perform maintenance, the user can send commands to (1) update the software, (2) get the list of what clips were actually displayed in the store and when they were displayed, (3) get transaction logs from the bar code information in the store (tells what has been sold in the store and when it was sold), and/or (4) reset/reboot the system causing the system to disconnect and reconnect in order to achieve a better connection, or clean up an otherwise unresolvable remote problem.

Figure 13:
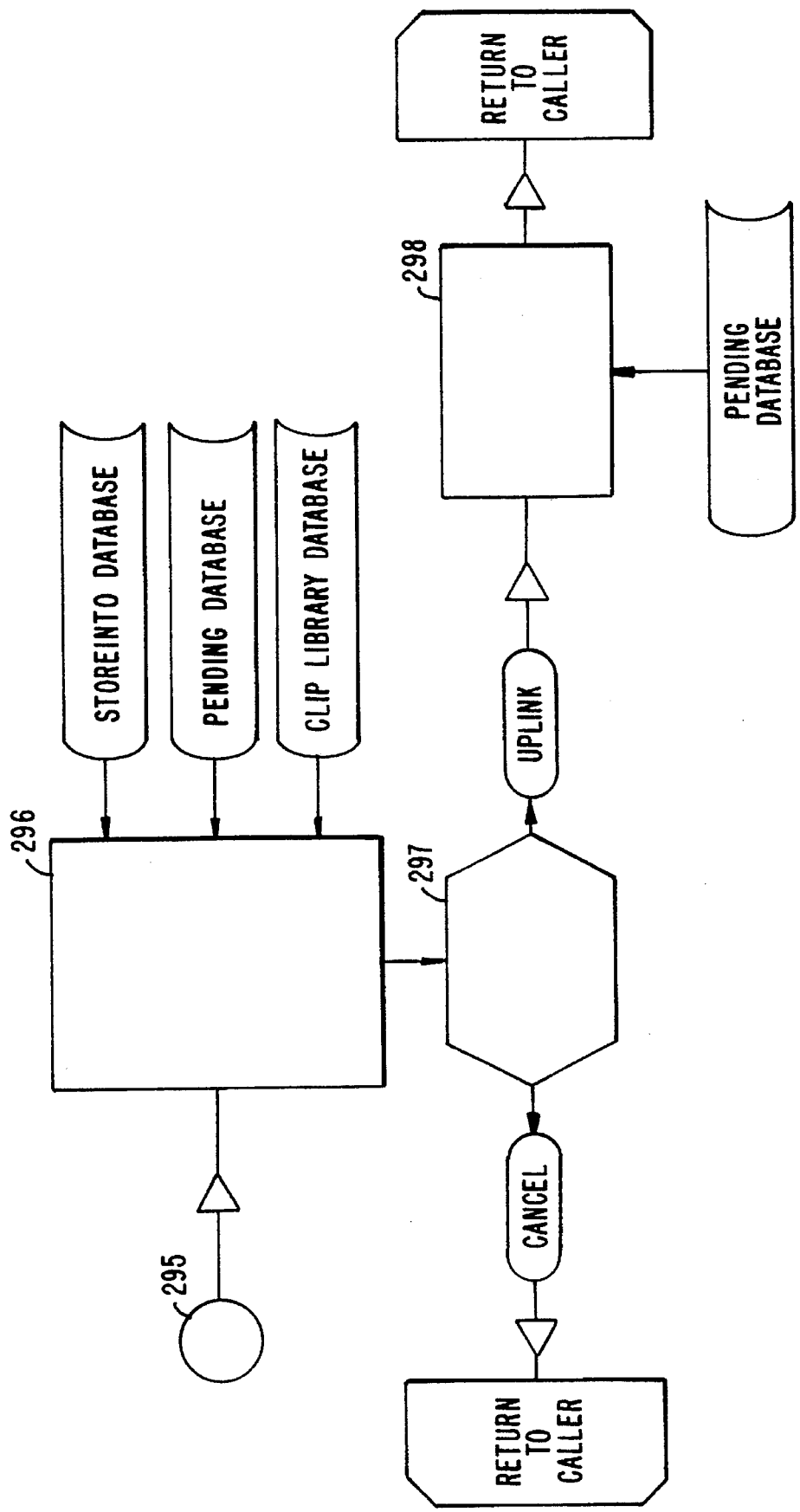
FIG. 13 is a process flow chart of the system's Uplink form.

FIG. 13 is a process flow chart of the system's Uplink Form. When the user selects UPLINK (see FIG. 5), the program enters the Uplink Form 295 and displays all the store sites which will be affected by an uplink at that point in time 296. The Store Info Database and the Playlist Database provide the information needed for this display. At this point, the user can choose to compile the uplink 297. If the user decides to compile, the program compiles all the pending data in the Playlist Database into a file formatted for the uplink 298. In the preferred embodiment, the complied information is sent via satellite once a week at a predetermined and regular time (e.g., every Friday at midnight).

For a more detailed description of the above described software, please refer to the attached Appendix

G. Distributed Audio System

The audio system controller in the preferred embodiment adjusts the level of the audio in up to four zones in each retail store in response to varying noise levels in each zone. Using a multi-zone control scheme provides a more effective distribution of the audio part of the display. Approximately 20–25 speakers are located in each zone. In the preferred embodiment, these zones are laid out in rectangular shapes with an aspect ratio close to 1. The speakers are placed in a herringbone location pattern in order to cover a large area in the retail store with the fewest number of speakers. In most stores, the room can be divided into quadrants. Distributed remotely, the system utilizes loudspeakers and noise monitoring microphones which may be, but are not necessarily, located on the display televisions.

The desired audio level is unobtrusive and yet still intelligible. Strategically placed noise detectors are used for determining the current volume levels because the acoustical environment in a retail store is far from homogeneous. The audio system measures the noise levels with these noise detectors and adjusts the volume of the audio based on this received information.

Figure 14:
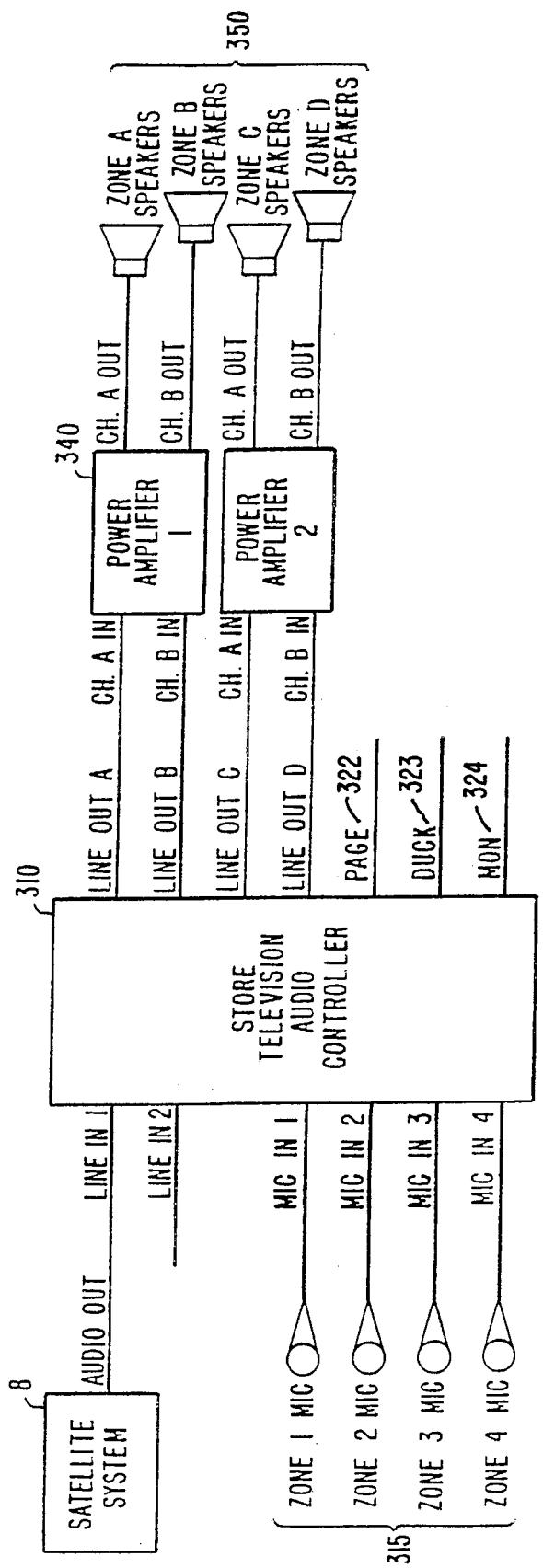
FIG. 14 is a block diagram of the distributed audio system.

FIG. 14 is a block diagram of the distributed audio system 305. Audio controller 310 in audio system 305 is a cascade of an equalizer and an automatic level control (see FIG. 15), and the equalizer is a cascade of digital filters. The automatic level control monitors the sound in the room via microphones and adjusts the gain between program source and power amplifier in order to maintain a constant relation between signal and noise. Audio system 305 includes audio controller 310, zone microphones 315, power amplifiers 340 and zone speakers 350. Power amplifiers 340 are 70 volt Crown CT200. The audio output from the signal sent through the satellite is sent into audio controller 310 on Line in 1. Line in 2 is unused. Audio controller 310 monitors the sound level in various areas with zone microphones 315 (ZONE 1 MIC, ZONE 2 MIC, ZONE 3 MIC, and ZONE 4 MIC) connected to audio controller 310 at its microphone inputs (MIC IN1, MIC IN2, MIC IN3, and MIC IN4). The audio controller takes the information from both the audio input and microphone inputs and generates audio signals which are sent to audio power amplifiers 340. Amplifiers 340 amplify the received signals and then sends them to zone speakers 350 (ZONE A speaker corresponds to ZONE 1 MIC, etc.).

Zone microphones 315 are, for example, Crown PXM11 sold commercially by Crown International Incorporated and power amplifiers 340 are, for example, Crown CT200 also sold commercially by Crown International Incorporated. Zone speakers 350 are speakers made up of two loudspeakers sitting back to back. These loudspeakers are positioned with their faces at 70 degree angles such that their sound is directed toward the area where an average height person would be walking in the retail store.

Audio Controller 310 also provides the following: PAGE output 322, DUCk input 323 and MON output 324. PAGE output 322 is a relay closure which sends out a signal to enable background music when regular audio is not playing. DUCK input 323 is an opto-isolated input which causes the controller to drop the audio level by 10dB in order to enable the store's paging system to be heard. MON output 324 allows for monitoring of the audio with headphones (very useful for testing and set-up of the audio system).

Figure 15:
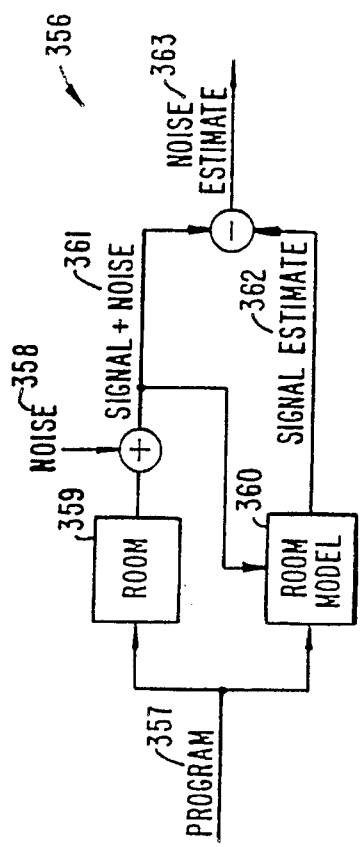
FIG. 15 is a process flow chart for the control processor in the audio controller.

FIG. 15 is a process flow chart for control processor 356 which is the automatic level control in audio controller 310. The device samples the area noise and adjusts the sound level in the four zones, described above, in a round-robin fashion. Control processor 356 receives the display's audio at program source 357. Reverberated program 358 is distinguished from noise generated by other sources in room 359. This is accomplished by constructing room Model 360 based on a comparison of program 357 and microphone signals 361. The system must learn the room Model before the signal to noise ratio estimation or control of the signal to noise ration can occur. Room learning must be done following a reset. Room Model 360 produces estimate of signal power 362 which is the signal power the microphones would detect if room 359 was absent of noise 358. Signal estimate 362 is compared with the combination of signal and noise 361 detected by the microphones to produce noise estimate 363 and the signal to noise ratio (in decibels).

The automatic level control utilizes a computer program which simulates the room. The computer program performs a Fast Fourier transform ("FFT") on the two signals (program and microphone), and for the amplitude in each band of frequency for both signals, the program finds the average of the ratio of the two signals (the room response measurement).

The automatic level control also contains a controlled time response. In order to avoid drastic sound changes, an error signal output is applied to a long time constant gain servo. The maximum change allowed is only 0.5 dB/minute in the preferred embodiment.

The implementation of this system using a digital signal processor (Motorola's DSP 56002 PQFP can be used) requires that the audio signals be represented by 16 bit integers immediately after analog to digital conversion and immediately before digital to analog conversion (internal representation uses more bits). This requires that analog signal levels be adjusted to stay within a fixed range, but it is nonetheless desired to use as much of the range as possible. This is the purpose of the gain adjustments and level meters provided in the audio controller. The analog to digital conversion is performed by a CODEC manufactured by Crystal (CS4248 rev C). The digital signal processor in this embodiment communicates with a microcontroller (Siemens SAB 3C537-16-N) which runs the display, keyboard and serial interface.

Audio Controller 310 in distributed audio system 305 has the following four main functions: (1) audio program compression, (2) equalization, (3) monitoring sound and controlling gains/attenuators, and (4) automatic level control. First, the audio program compression involves compressing the analog dynamic range (over the first 10 dB of operational range it does not compress). This is adjustable on the front panel of the audio system in the receiving sites. The adjustment can be made from 1–1 to 4–1 in integer steps. This compression can be done by a DBX 160 from DBX Corporation in Boston. Second, the equalization is achieved with two equalizers. A second order highpass filter is used to protect the loudspeaker (this filter can prevent damaging low frequency signals from reaching the loudspeaker). The highpass filter gives a fourth order highpass characteristic to the system along with a corner frequency of about approximately 100 Hz. The threshold for potential damage to a loudspeaker depends on the loudspeaker. An equalizer (similar to the one used in an automobile) is used to improve the acoustical performance of the loudspeaker. A Klark-Technik DN360 can be used for the equalization. Third, monitoring and controlling can be done with a mixing console Ramsa WR 1244 (Ramsa is a division of Panasonic). This device provides meters for various stages within the sound system (see FIG. 16 below: program level 370, output levels 382, and microphone level 376). This device also controls the gains and attenuators such that external equipment can be matched, and this device can be controlled from the front panel of the audio system in the receiving sites. Fourth, the automatic level control was described above (FIG. 15).

Figure 16:
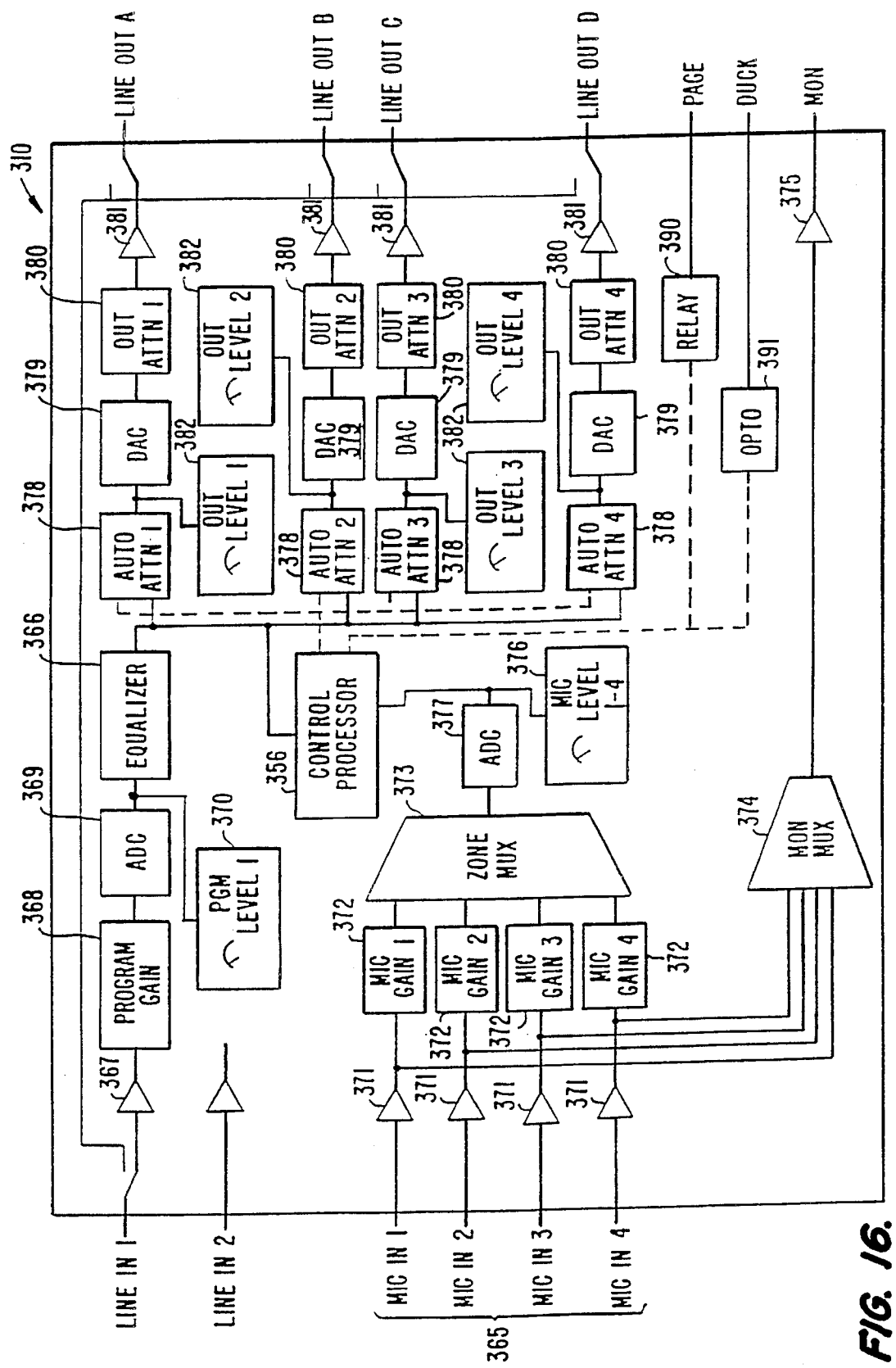
FIG. 16 is a block diagram of the audio controller in the distributed audio system.

FIG. 16 is a block diagram of audio controller 310. The audio output from the signal sent from the uplink site to the receiving site is input to audio controller 310 and sent through buffer 367 to amplifier 368 which amplifies the incoming signal to match the range of analog to digital converter ("ADC") 369. After passing through ADC 369, the signal is monitored by meter 370 and sent through equalizer 366 to control processor 356. Equalizer 366 is a cascade of digital filters. Control processor 356 monitors the sound in the room via microphones 365. The signal from microphones 365 is sent through buffers 371 to multiplexer 374 and to amplifiers 372. Multiplexer 374 sends one signal at a time through buffer 375 to an output allowing for monitoring of the signals from microphones 365. Amplifiers 372 amplify the incoming signals to match the range of ADC 377 and then sends these amplified signals to multiplexer 373 which allows only one microphone signal to enter ADC 377 at a time. The signal output by ADC 377 is monitored by meter 376 and is sent to control processor 356.

The signal output by the control processor 356 is sent to the automatic attenuators 378 which attenuate the signal based on information received from control processor 356. Attenuators 378 output to monitors 382 and to DACs 379. The signals are next sent to output attenuators 380 which attenuate the signals such that they match the subsequent equipment. The output from attenuators 380 is sent through buffers 381 and then output from audio controller 310. Control processor 356 also has an interactive paging system. Signals received through opto-isolator 391 inform control processor 356 that a page is going to occur throughout the store. Based on this information, control processor 356 causes the sound from audio system 305 to be turned down during the page. Control processor 356 outputs, in order to interface with the paging system, through relay 390.

The distributed audio system is a 70 volt system which permits many speakers to be placed in parallel. A transformer is utilized to change the speaker load from a low impedance load to a high impedance load. The reflected impedance is approximately 1 Kohm when driven by a high voltage which allows 20–25 loudspeakers to be placed in parallel as desired in the preferred embodiment.

A Kenwood KFC-1053 driver and Soundolier HT-87 transformer can be used in the loudspeakers. The low frequency performance of the KFC-1053 driver are characterized by Thiele-Small parameters, which are measured using impedance curves obtained in a 4'×4' baffle and in a 1.18 liter box and are listed below.

| | |
|---|---|
| $f_s$ | 144 Hz |
| $R_e$ | 3.7 ohm |
| $Q_{ts}$ | 0.89 |
| $Q_{ms}$ | 5.75 |
| $Q_{es}$ | 1.05 |
| $V_{as}$ | 1.51 liter |

The volume of the cavity behind each driver in the loudspeaker is 5 liters, which results in a system Q of approximately 1. In the preferred embodiment, the box is operated in conjunction with a second order high pass filter to give a 4th order high pass characteristic to the system. The combined filter and loudspeaker have a lower 3dB cutoff frequency and steeper roll-off below the cutoff frequency than the unfiltered box. This filter is implemented digitally in audio controller 310.

The KFC-1053 driver has a plastic dust cap and whizzer cone that radiate efficiently beyond 10 kHz. This gives a quality of "brightness" to the sound that is desirable in the store environment.

In the preferred embodiment, the loudspeaker is intended for operation in a 70.7 V distribution system. Each of the two drivers is equipped with its own transformer and primary tap selector switch. The specifications of the Soundolier HT-87 constant voltage transformer are listed below:

| | |
|---|---|
| primary voltage | 70.7 V |
| frequency response | +− 1 dB, 50 Hz–15 kHz |
| primary taps | 1, 2, 4, 8 W |
| secondary impedance | 4 and 8 ohm |

Tap selection is provided to allow the sound level to be adjusted to compensate for local noise conditions such as proximity to refrigerators. Both the loudspeaker and transformer contribute to the total harmonic distortion produced by the system.

Figure 17A:
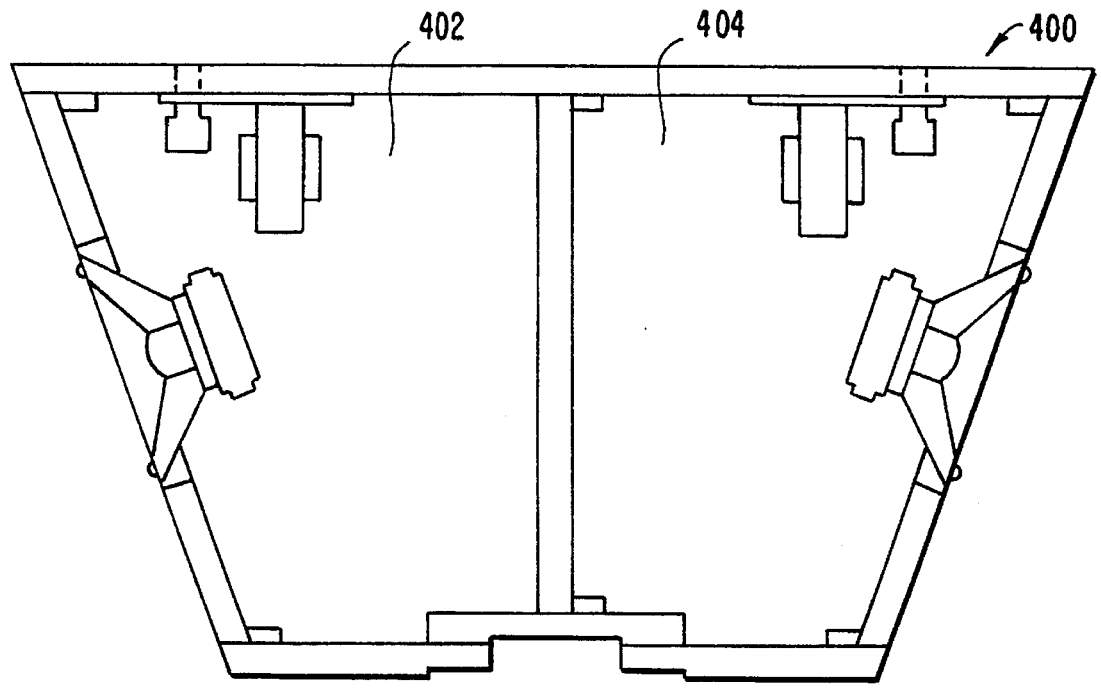
FIG. 17 is a drawing of the loudspeaker for the distributed audio system in the preferred embodiment.
Figure 17B:
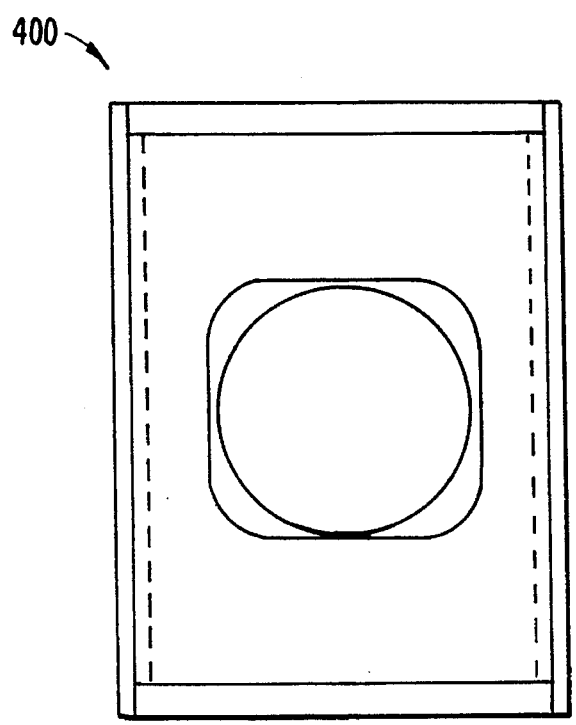

FIG. 17 is a drawing of the loudspeaker for the distributed audio system in the preferred embodiment. Loudspeaker 400 consists of two separate cavities 402 and 404, one for each driver. All cabinet joints and penetrations are air-tight. The material is ½" birch veneer plywood, and all joints are glued and nailed. This method of construction provides sufficient freedom from cabinet vibration without additional bracing. Loudspeakers 400 is covered with cloth grills made of nylon monofilament fabric specifically intended for loudspeaker use. The rear interior surface of each cavity is covered with 2" of glass wool to damp high-frequency internal reflections. The dimensions of loudspeaker 400 are as shown in the drawing.

POINT OF PURCHASE VIDEO DISTRIBUTION SYSTEM

APPENDIX

```
/*
            StoreTelevision Multimedia Presentaion System
                   Copyright 1994 STV Network, Inc.

Author J. Magilton
                                              Revision 0.9b 08/29/94

Revision History:
   0.9b  -  Release to Patent Attorney

*/ include "stdio.h"
include "stdlib.h"
#include "string.h"
#include "conio.h"
#include "ctype.h"
#include "time.h"
#include "math.h"
#include "bios.h"
#include "dos.h"
#include "major.h"
#include "major_d.h"
#include "alloc.h"
#include "process.h"
#include "io.h"
#include "stv.h"

// Data Structure for Playlist Socket Information
struct socket_info
{
   int total_sockets ;
   int current_socket ;
   char playlist_start [MAX_PLAYLIST_SOCKETS ][5];
   char playlist_duration [MAX_PLAYLIST_SOCKETS ][4];
   char playlist_title [MAX_PLAYLIST_SOCKETS ][12];
};
struct socket_info far *socket;

typedef struct
    {
        int repeat_count ;
        struct
        {
           int scsi_id;
           int scsi_lun;
           int control ;
           long duration ;
           int black_count ;
           char clip_name [10];
        }entry[MAX_SCHEDULE_ENTRIES ];
    }schedule_command ;

schedule_command  schedule ;

char clip_name_buffer [MAX_SCHEDULE_ENTRIES ][10];
char far *log_flnm;

// Global Definitions for STV Local Site S/W
int done=FALSE;
int log_open=FALSE;
int com_open=FALSE;
int verbose = TRUE;
int debug = TRUE;
int overlay = FALSE;
int playlist_open ;
int clip_count = 1;

FILE *playlist;
FILE *log_file;
fpos_t playlist_BOF ;

//These values should ultimately all be read out of the stv.ini file
char *path = "C:\\DVLP\\STV\\" ;
char *ucode_flnm = "UCODE";

// The Big Program...
void main()
{
```

```
char clip_name [20];
char ch;

// Retrieve Playlist Titles for each programming socket
if(read_SOCKET_config ()==NULL)
    log_STV_error (NO_SOCKET_CONFIG );        /* Fatal Error */

// Open Log File
if((log_file = fopen(date_based_flnm (timestamp()),"a+rt")) != NULL)
{
    log_open =TRUE;
    fprintf(log_file,"->Program Start: %s" ,(void *)timestamp());
}
else
    log_IO_error (ferror(log_file),date_based_flnm (timestamp()));

// Initialize the S/A Boards and S/A Data Structures
if (!sa_init())
{
    // Select the Decoder Board and SCSI controller for Playback
    dindex=0;
    poll_mail (FALSE);

if(!select_scsi ())
    {
        log_SA_error (1,"Could not select SCSI Controller" );
        done=TRUE;
    } if(!select_board (dindex,FALSE))
    {
        log_SA_error (1,"Could not select decoder board" );
        done=TRUE;
    }

// Skip Merrily throught the playlists
    while ( !done )
    {

// Disable any overlay that may be on the screens
        if ((err=disable_overlay ())!=NULL)
            log_SA_error (err,"Could not Disable Overlay at Start Time" );

// Open Playlist File -- Playlist Socket (title of playlist file) is
        //     determined by the time of day (overlay flag is set by get_playlist_name)
        if((playlist = fopen(get_playlist_name ((void *)timestamp()),"rt")) != NULL)
        {
            fprintf(log_file,"Playling playlist %s\n" ,get_playlist_name ((void *)timestamp()));
            fsetpos(playlist,&playlist_BOF ); /* Setup to be able to rewind file to BOF */
            playlist_open =TRUE;
        }
        else
        {
            log_IO_error (ferror(playlist),get_playlist_name ((void *)timestamp()));
            done=TRUE;
        } show_screen (MAIN_SCREEN );

if(!overlay)
        {
            // Submit the opened playlist for display
            if(play_playlist (playlist)!= NULL)
                done=TRUE;
        }
        else
        {   // Display the Overlay (Screen Saver/Destroyer)
            if(load_palette (get_overlay_name (playlist)))
                if(upload_overlay (get_overlay_name (playlist)))
                    if((err=enable_overlay ())!=NULL)
                        log_SA_error (err,"Not able to enable overlay" );

// Listen for the downlink and phone calls.
            if(sit_and_wait ()!=NULL)
                done=TRUE;

overlay=FALSE;
        } fclose(playlist);
    }
```

```c
    }
    else
        log_SA_error (1,"SA Stuff didnt start right" );

if (log_open)
        fclose(log_file);

atexit(close_all);
    printf("Normal Program Exit" );
}

//---------------------------------------------------------------------------// int play_playlist (FILE *playlist)

// reads the opened playlist, builds a playback schedule, and decodes the
// video clips in the playlist to the televisions {
    long count, last_count;

int loop,
        current_clip =0,
        clip_count ,
        prev_clip_count ,
        done = FALSE,
        short_list = FALSE,
        ready_to_append = FALSE,
        tout = TIME_OUT;

int *data_ptr;

char name[10];

// Place a group of clips into the schedule data structure
    short_list =build_playlist_schedule (playlist,&clip_count );
    prev_clip_count =clip_count ;

// A clip_name_buffer is used instead of the schedule data structure
    // because the clip_name information changes as the playlist
    // is appended. (before the playlist playback has completed).
    for (loop=0;loop<clip_count ;loop++)
    {
        memset(clip_name_buffer [loop],0x00,10);
        strcpy(clip_name_buffer [loop],schedule .entry[loop].clip_name );
    }

//Load the Playback schedule data structure onto the SA decoder card
    do
    {
        send_command (LOAD_PLAYBACK , 1+(11*clip_count ), (void *)&schedule );

do
        {
            receive_data (10);
        } while (((data & 0xF000) != 0xE000)&((data & 0xF000) != 0xA000));

} while ((data == SCSI_DISK_BUSY ) && (tout-- > 0));

//Handle the -Microcode Load Required- Error gracefully
    if((data & 0xF000)==0xE000)
    {
        if(data == UCODE_NOT_LOADED )
        {
            log_SA_error (data,"Reloading Microcode..." );
            if(download_decoder_ucode (ucode_flnm ) == NULL)
                return(0);
        }
        else
        {
            log_SA_error (data,"Load Playback Error" );
            return(1);
        }
    }

// Reset the Time Out Counter
    tout=TIME_OUT ;

// Begin playback of the queued playback schedule
    do
    {
        send_command (START_PLAYBACK , 0, data_ptr );
```

```c
    do
    {
        receive_data (10);
    } while (((data & 0xF000) != 0xE000)&((data & 0xF000) != 0xA000));

} while ((data == SCSI_DISK_BUSY ) && (tout-- > 0));

if((data & 0xF000)==0xE000)
{
    log_SA_error (data,"Start Playback Error" );
    return (1);
} clear_error ();
printf ("%s: %s",clip_name_buffer [current_clip ],(void *)timestamp ());
if (log_open)
    fprintf (log_file,"Clip Aired : %s : %s" , clip_name_buffer [current_clip ],(void *)timestamp ());

while (!done)
{
    // Reset the Time Out Counter and Housekeep unusal playlist conditions
    tout=TIME_OUT ;
    if (short_list )
        done=TRUE;

// Keep After the SA System Status
    do
    {
        send_command (PLAYBACK_STAT_REQ ,0,data_ptr );
        receive_data (5);

if((data & 0xF000)==0xE000)
            log_SA_error (data,"Playback Status: -->Error Occurred" );

// Verify Clip Playback Progress
        last_count =count;
        count = (long)response [1] | ((long)response [2]<<16);

if(count==last_count )
            // possible stall condition
            tout--;
        else
            tout=TIME_OUT ;

if (tout==0)
        {
            log_SA_error (1,"Decoder Stall...Timeout" );
            return (1);
        }

// Clip Has Changed
        if (data == 0xF430 )
        {
            current_clip ++;

if (current_clip >= clip_count && !done)
            {
                current_clip =0;

// A clip_name_buffer ia used instead of the schedule data structure
                // because the clip_name information changes as the playlist
                // is appended. (before the playlist playback has completed).
                for (loop=0;loop<clip_count ;loop++)
                {
                    memset (clip_name_buffer [loop],0x00,10);
                    strcpy (clip_name_buffer [loop],schedule .entry [loop].clip_name );
                }
            } if (done && current_clip >= prev_clip_count )
            {
                current_clip =0;

// A clip_name_buffer is used instead of the schedule data structure
                // because the clip_name information changes as the playlist
                // is appended. (before the playlist playback has completed).
                for (loop=0;loop<clip_count ;loop++)
                {
                    memset (clip_name_buffer [loop],0x00,10);
                    strcpy (clip_name_buffer [loop],schedule .entry [loop].clip_name );
                }
            }
```

```
            if (current_clip == clip_count -3 && !done)
                ready_to_append =TRUE;

clear_error ();
            printf ("%s: %s",clip_name_buffer [current_clip ],(void *)timestamp ());

if (log_open)
                fprintf (log_file,"Clip Aired : %s : %s" , clip_name_buffer [current_clip ],(void *)timestamp ());
        } update_screen_time (timestamp ());

if (ready_to_append )
        {
            ready_to_append =FALSE;
            prev_clip_count =clip_count ;

// Place the next group of clips into the schedule data structure
            done=build_playlist_schedule (playlist, &clip_count );

send_command (APPEND_PLAYBACK , 1+(11*clip_count ), (void *)&schedule );

do
            {
                do
                {
                    receive_data (10);
                } while (((data & 0xF000) != 0xE000)&&((data & 0xF000) != 0xA000));
            } while ((data == SCSI_DISK_BUSY ) && (tout-- > 0));

if(debug)
            {
                gotoxy (ERRORX,ERRORY+1);
                printf("Playlist Appended: %s" , (void *)timestamp ());
                if (log_open)
                    fprintf (log_file,"Playlist Appended: %s" ,(void *)timestamp ());
            }
        }

}while ((data != PLAYBACK_COMP ));
    } while (check_mail (0))
    {
        receive_data (5);              /* Wait for completion */
        printf ("%x\n",data);
    }
    return (0);
}
//------------------------------------------------------------------------// int sit_and_wait (void)
{
    char ch;

do
    {
        ch=getch ();
    } while (ch!=0x0D);
    return (0);
}

//------------------------------------------------------------------------// int disable_overlay (void)
{
    int *data_ptr;

data_ptr = (int *)&cwdata [0];    /* need arg for call, won't use */ send_command (OVERLAY_OFF ,0,data_ptr );

/* Wait for ack or error */ do
    {
        receive_data (TRUE);
    } while (((data & 0xF000) != 0xE000)&&((data & 0xF000) != 0xA000));

if((data & 0xF000) == 0xE000)
```

```c
        return(data);

return(0);
}
//----------------------------------------------------------------------// int enable_overlay (void)
{
    int *data_ptr;

data_ptr = (int *)&cwdata[0];    /* need arg for call, won't use */ send_command (OVERLAY_ON ,0,data_ptr);

/* Wait for ack or error */ do
    {
        receive_data (TRUE);
    } while (((data & 0xF000) != 0xE000)&&((data & 0xF000) != 0xA000));

if((data & 0xF000) == 0xE000)
        return(data);

return(0);
}

//----------------------------------------------------------------------// char *get_overlay_name (FILE *playlist)
{
    int loop;
    char *flnm;

flnm=(char *)malloc(12);
    memset(flnm,0x00,12);

// Load the Screen Saver Name from the top of the NOOP Socket File
    if(fgets(flnm,12,playlist) != NULL)
    {
        for (loop=0;loop<=12;loop++)
        {
            if(flnm[loop]=='\n')        // Clear the newline char from flnm
                flnm[loop]='\0';
        }
        fsetpos(playlist,&playlist_BOF); /* Rewind the file for future calls */
        return(flnm);
    }
    else
    {
        log_IO_error (ferror(playlist),"Could not get Overlay title" );
    }
    return("NONE");
}

//----------------------------------------------------------------------// int upload_overlay (char *ofile)

// Each NOOPxxxx playlist may contain the name of an overlay file which
// will be displayed during periods of system inactivity. This (.ovr) filename
// is read from the first entry field of the NOOPxxxx playlist and
// then loaded into memory on the SA Decoder card. (Note: a call to load_palette(flnm),
// and to enable_overlay() is then necessary to make the overlay visible.)
{
    char read_file[14];
    unsigned int total_words;

memset(read_file,0x00,14);
    strcpy(read_file,ofile);

/* Open the overlay file */ if(( pc_file = fopen(read_file,"rb")) == NULL)
    {
        log_IO_error (ferror(pc_file),read_file);
        return(FALSE);
    }

/* Send command to decoder to enable overlay */
```

```c
    data_ptr =(int *) &cwdata[0];      /* just used as arg place holder */ send_command (ENABLE_OVERLAY ,0,data_ptr );

do
    {
        receive_data (TRUE);
    } while (((data & 0xF000) != 0xE000)&&((data & 0xF000) != 0xA000));

if((data & 0xF000) == 0xE000)
    {
        printf("Error %x occured while enabling overlay upload of %s"   ,data,read_file );
        fclose(pc_file);
        return(FALSE);
    }

/* Read and transfer the overlay data */ while(!feof(pc_file))
    {
        total_words = 0;

total_words = fread(big_buffer,2,2048,pc_file);

if(total_words > 0)
        {
            /* need to transfer this data to the decoder */ for (i = 0; i < total_words; i++)
            {
                while (!(inpw(bi->portid[dindex] + BOARD_STATUS_REG ) & TRANSFER_READY ))
                {
                    ikbhit();
                } outpw(bi->portid[dindex] + DATA_BUS_REG ,big_buffer[i]);   /* Output word */
            }
        }
    }

/* Close file */ fclose(pc_file);

/* Tell decoder we're done */ send_command (DISABLE_OVERLAY ,0,data_ptr );

do
    {
        receive_data (TRUE);
    } while (((data & 0xF000) != 0xE000)&&((data & 0xF000) != 0xA000));

if((data & 0xF000) == 0xE000)
    {
        printf("Error %x occured while disabling overlay upload of %s"   ,data,read_file );
    } return(TRUE);
}
//------------------------------------------------------------------------// int load_palette (char *pfile)

// Each overlay file has an accompanying palette (.PAL) file which contains
// information such as X-Y Screen coordinates at which to display the (.OVR)
// file.
{
    char read_file [14];

memset(read_file,0x00,14);
    strcpy(read_file,pfile);
    strcpy(&read_file[strlen(read_file)-4],".PAL");      /* add palette extension */

/*  Open the palette file */
    if((pc_file = fopen( read_file,"rb")) == NULL)
    {
        log_IO_error (ferror(pc_file), read_file );
        return(FALSE);
    }
```

```c
/* Read palette data */ data_ptr = (int *)&send_data[0];

if (fread(data_ptr,60,1,pc_file) != 1)
{
    printf("Error reading palette file %s"  ,read_file);
    fclose(pc_file);
    return(FALSE);
} fclose(pc_file);

/* Send palette to decoder */ send_command ( LOAD_OVERLAY_PALETTE ,30,data_ptr);

do
{
    receive_data (TRUE);
} while (((data & 0xF000) != 0xE000)&&((data & 0xF000) != 0xA000));

if((data & 0xF000) == 0xE000)
{
    if(data == UCODE_NOT_LOADED )
    {
        log_SA_error (data,"Reloading Microcode..." );
        if(download_decoder_ucode (ucode_flnm) == NULL)
            return(FALSE);
    }
    else
        printf("Error %x occured while loading overlay palette %s"  ,data,read_file);
} return(TRUE);
}

//-----------------------------------------------------------------------// int build_playlist_schedule (FILE *playlist,int *clip_count)

// Currently, each playlist is broken down into groups of five clips
// which are loaded into a playback schedule and displayed. (This reduces the
// black frames between discrete clips) This subroutine gathers the next five
// clips to play into the schedule data structure so that they may be appended
// to the playback schedule. (Note that this function returns a true value if
// there are fewer than (5) clips to append)
{
    int done=FALSE;
    char clip_name [20];

*clip_count =0;

while ((*clip_count < MAX_SCHEDULE_ENTRIES ) && !done )
    {
        if( fgets(clip_name,10,playlist) != NULL )
        {
            if (clip_name [0]!= '\n')       /* Prevents Blank Line Loading */
            {
                if(file_exists (clip_name ))
                {
                    schedule .repeat_count =1;
                    schedule .entry[*clip_count ].scsi_id=0;
                    schedule .entry[*clip_count ].scsi_lun=0;
                    schedule .entry[*clip_count ].control=V_ENABLE |A_ENABLE |CC_ENABLE ;
                    schedule .entry[*clip_count ].duration=0;
                    schedule .entry[*clip_count ].black_count =0;
                    memset (schedule .entry[*clip_count ].clip_name ,0x00,10);
                    strncpy (schedule .entry[*clip_count ].clip_name ,clip_name ,end_of_line (clip_name ));

*clip_count =*clip_count +1;
                }
                else
                {
                    clear_error ();
                    printf("Clip not on local disk ->%s\n"  ,clip_name );
                    if (log_open )
                        fprintf (log_file ,"Clip not on local disk ->%s\n"  ,clip_name );
                }
            ;
        }
```

```
        else
           return (TRUE);
    } return (FALSE);
}
//---------------------------------------------------------------------// void close_all (void)
{
    if(playlist_open )
        fclose(playlist );

if(log_open )
    {
        fprintf(log_file,"->Program Stopped %s\n" ,(void *)timestamp ());
        fclose(log_file );
    }
    return;
}

//---------------------------------------------------------------------// void log_IO_error (int error, char *flnm)
{
    clear_error ();
    if(verbose || !log_open )
        printf("File I/O Error: %d %sFile Name -> %s \n"   ,
            error,strerror(error),flnm);

if(log_open )
        fprintf(log_file,"File I/O Error: %d %sFile Name -> %s \n"   ,
            error,strerror(error),flnm);

}
//---------------------------------------------------------------------// void log_SA_error (int error, char *errmsg )
{
    clear_error ();
    if (error!=0)
    {
        if(verbose || !log_open )
            printf("S/A Error: %s %x\n" ,errmsg, error);

if(log_open )
            fprintf(log_file,"S/A Error: %s %x\n" ,errmsg,error);
    }
    else
    {
        if(verbose || !log_open )
            printf("S/A Message: %s\n" ,errmsg);

if(log_open )
            fprintf(log_file,"S/A Message: %s\n" ,errmsg);

}
}

//---------------------------------------------------------------------// void log_STV_error (int error)
{
    char ch;
    clear_error ();
    if(verbose || !log_open )
        printf("STV Downlink Program Error: %x \n" ,error);

if(log_open )
        fprintf(log_file,"STV Downlink Program Error: %x \n" ,error);

}
//---------------------------------------------------------------------//

// Returns the name of the playlist scheduled to play
// in the playlist socket for the present time of day.

// Places the current index value for the selected playlist socket into
// the playlist socket data structure.

char *get_playlist_name (char *timedate)
{
```

```
    int socket_count;
    char hour[3],
         min[3],
         buffer[4],
         xloop,
         yloop;

strncpy(hour,&timedate[11],2);
    hour[2]='\0';
    strncpy(min,&timedate[14],2);
    min[2]='\0';

for (socket_count =0;socket_count <=MAX_PLAYLIST_SOCKETS ;socket_count ++)
    {
        if (atoi(hour)==socket_count /2)
        {
            if(atoi(min)>=45 && atoi(hour)==23)
            {
                socket->current_socket =0;
                point_to_socket ();

// See if this is a playlist or an overlay
                strncpy(buffer,socket->playlist_title [0],4);
                buffer[4]='\0';
                if(!strcmp(buffer,"NOOP"))
                    overlay=TRUE;

return(socket->playlist_title [0]);
            }
            else if (atoi(min)>=45)
            {
                socket->current_socket =socket_count +2;
                point_to_socket ();

// See if this is a playlist or an overlay
                strncpy(buffer,socket->playlist_title (socket_count +2],4);
                buffer[4]='\0';
                if(!strcmp(buffer,"NOOP"))
                    overlay=TRUE;

return(socket->playlist_title [socket_count +2]);
            } else if (atoi(min)>=15)
            {
                socket->current_socket =socket_count +1;
                point_to_socket ();

// See if this is a playlist or an overlay
                strncpy(buffer,socket->playlist_title [socket_count +1],4);
                buffer[4]='\0';
                if(!strcmp(buffer,"NOOP"))
                    overlay=TRUE;

return(socket->playlist_title [socket_count +1]);
            }
            else
            {
                socket->current_socket =socket_count ;
                point_to_socket ();

// See if this is a playlist or an overlay
                strncpy(buffer,socket->playlist_title [socket_count ],4);
                buffer[4]='\0';
                if(!strcmp(buffer,"NOOP"))
                    overlay=TRUE;

return(socket->playlist_title [socket_count ]);
            }
        }
    }
    return ("NONE");
}
//-------------------------------------------------------------------//

// Looks at the playlist socket data structure to determine the current
// playlist socket. Performs an iteration and presents a cursor pointer
// on the Multimedia Presentation System status display identifying the
// playlist socket currently being decoded to the television.

void point_to_socket (void)
{
```

```c
    int xloop,yloop;

for (xloop=1;xloop<=3;xloop++)
    {
        for (yloop=1;yloop<=16;yloop++)
        {
            if (((xloop*16)-15)+yloop == socket->current_socket +2)
            {
                gotoxy(((xloop*25)-18),yloop+4);
                printf(">");
            }
        }
    }
}

//-----------------------------------------------------------------// void show_SA_boards (void)

// Provide information on the Multimedia Presentation System status screen
// regarding the SA boards installed in the computer {
    int i=0,
        scrx=56,
        scry=22;

// Display Info about S/A boards found in PC
    while (i<num_boards )
    {
        switch (bi->board_type [i])
        {
            case ('D'): gotoxy(scrx,scry);
                        printf("(%d) %s ",i,decoder_name );
                        scry++;
                        break;
            case ('R'): gotoxy(scrx,scry);
                        printf("(%d) %s ",i,record_name );
                        scry++;
                        break;

case ('T'): gotoxy(scrx,scry);
                        printf("(%d) %s ",i,transport_name );
                        scry++;
                        break;

case ('U'): gotoxy(scrx,scry);
                        printf("(%d) %s ",i,uplink_name );
                        scry++;
                        break;
        } printf("at %03x %02x\n",bi->portid[i],bi->board_address [i]);
        i++;
    }

}

//-----------------------------------------------------------------// int sa_init (void)

// Original Subroutine to Initialize SA Boards provided by Scientific Atlanta
//                                                   Written by Gary Thomas
//
// Modified for use by STV Multimedia Presentation System by J. Magilton
//

// Select and Initialize the Scientific Atlanta Decoder and Transport Boards.
{
    int btype;      /* Board type */
    total = 10;

bi = (struct board_info far *) farmalloc (sizeof(struct board_info ));

if (bi == NULL)
    {
        log_SA_error (1,"Unable to allocate board region buffer" );
```

```
      wait_char();
      exit(0);
   } for (i=0;i<MAX_BOARDS ;i++)
   {
      bi->direct_mode[i] = FALSE;     /* Not operating in direct mode */
      bi->trans_enab[i] = FALSE;      /* Transport NOT enabled */
      bi->s_tnum[i] = 0;              /* No files in schedule */
      bi->match_var[i] = -1;          /* no variable assigned */
      bi->nfile_var[i] = -1;          /* no variable assigned */
      bi->count_var[i] = -1;          /* no variable assigned */
   } auto_rec = FALSE;
   script_echo = FALSE;     /* Not echoing commands yet */
   script_force = FALSE;    /* do not force to main */ exit_action[FATAL] = SCRIPT_EXIT ;   /* Default to exit script file */
   exit_action[ERROR] = SCRIPT_EXIT ;   /* On any type of error */
   exit_action[WARNING] = SCRIPT_EXIT ;

strcpy(ucode,"ucode_2.2f" );        /* Default microcode */ testp = TRUE;            /* perform parameter testing */
   detail = FALSE;          /* use high level menus */ dma_areg[1] = 0xc4;      /* define registers for DMA */
   dma_creg[1] = 0xc6;
   dma_preg[1] = 0x8b;
   dma_areg[2] = 0xc8;
   dma_creg[2] = 0xca;
   dma_preg[2] = 0x89;
   dma_areg[3] = 0xcc;
   dma_creg[3] = 0xce;
   dma_preg[3] = 0x8a;

for (i=0;i<16;i++)
   {
      irq_cnt[i] = 0;       /* No one using the interrupts */
      irq_flag[0] = 0;      /* No ints received */
   } irq_vect[5] = 0x0d;      /* Set the vector # related to each IRQ */
   irq_vect[7] = 0x0f;
   irq_vect[10] = 0x72;
   irq_vect[11] = 0x73;
   irq_vect[12] = 0x74;
   irq_vect[15] = 0x77;

irq_mask[5] = 0x20;      /* Set the mask bit for eah IRQ */
   irq_mask[7] = 0x80;
   irq_mask[10] = 0x04;
   irq_mask[11] = 0x08;
   irq_mask[12] = 0x10;
   irq_mask[15] = 0x80;

irq_port[5] = 0x21;      /* port # to output mask */
   irq_port[7] = 0x21;
   irq_port[10] = 0xa1;
   irq_port[11] = 0xa1;
   irq_port[12] = 0xa1;
   irq_port[15] = 0xa1;

top_pos = 0xffffffff;

for (i=0;i<26;i++)
   {
      sstor[i]=0;           /* Script symbol storage */
      script_pos[i] = 0xffffffff;
   } script_delay = 1200;     /* Default delay for script file scrren updates */

/* Read config file and setup boards */
   if (!read_SA_config())
   {
      log_SA_error (1,"Could not read MAJOR.CFG file" );
      return(1);
   }

//textbackground(text_bcolor);
```

```c
    //textcolor(text_color);

infile = stdin;
    script = FALSE;

/*************************************************************************
 *
 *  Perform necessary initialization
 *
 *************************************************************************/

/*  Enable CTRL-BREAK Handler  */ ctrlbrk(break_handler );
    setcbrk(1);

/*  Allocate memory for disk i/o transfers */ big_buffer = (unsigned int far *) farmalloc(BUFF_SIZE );

if (big_buffer == NULL)
    {
        log_SA_error (1,"Unable to allocate buffer" );
        wait_char ();
        exit(0);
    } direct_buff = (unsigned char far *) farmalloc(DIRECT_BUFF_SIZE );

if (direct_buff == NULL)
    {
        log_SA_error (1,"Unable to allocate direct mode buffer" );
        wait_char ();
    } write_data = big_buffer;
    read_data  = big_buffer;
    cwdata     = big_buffer;

enable_ints ();              /* Enable any interrupts passed */ memset (blank_line ,' ',80);   /* Blank line */
    blank_line [80] = 0;           /* Terminate */
    log_SA_error (0,"Init Complete" );
    return (0);
}
//----------------------------------------------------------------------// int break_handler (void)
{
// Intercept the <CNTR-BREAK> if(log_open )
    {
        fprintf (log_file ,"->Program aborted via CTRL-BREAK: %s\n\n"   ,(void*)timestamp ());
        fclose (log_file );
    } clear_error ();
    log_SA_error (0,"**Program aborted via CTRL-BREAK **\n"   );
    send_command (STOP_PLAYBACK ,0,data_ptr );

atexit(close_all );
    return (0);
}

//----------------------------------------------------------------------// int read_SOCKET_config (void)
{
// Read the playlist title for each time socket into a structure for playback int count;
    char linein[80], start[4],duration[3],title[10];
    FILE *cfg;

socket = (struct socket_info far *) farmalloc(sizeof(struct socket_info ));
    if (socket == NULL)
    {
        log_SA_error (1,"Unable to allocate socket info region buffer"   );
        return (FALSE );
```

```c
    }
    // Decode the config line and fill in the socket information
    if((cfg=fopen("SOCKET.CFG","rt"))!=NULL)
        for (count=0;count<MAX_PLAYLIST_SOCKETS ;count++)
            if(fgets(linein,80,cfg) != NULL)
            {
                strncpy(socket->playlist_start [count],&linein[0],4);
                socket->playlist_start [count][4]='\0';

strncpy(socket->playlist_duration [count],&linein[5],3);
                socket->playlist_duration [count][2]='\0';

strncpy(socket->playlist_title [count],&linein[9],10);
                socket->playlist_title [count][end_of_line (socket->playlist_title [count])]='\0';
            }
    else
    {
        log_IO_error (ferror(cfg),"SOCKET.CFG" );
        return (FALSE);
    } socket->total_sockets =count;
    return (TRUE);
}
//----------------------------------------------------------------------// int show_screen (char *title)
{
// Display the Multimedia Presentation System's status screen.

int done=FALSE,
        xloop,
        yloop;
    char flnm[50], linein[80];
    FILE *screen;

clrscr();
    strcpy(flnm,SCREEN_PATH );
    strcat(flnm,title);

if((screen = fopen(flnm,"a+rt")) != NULL)
        do
        {
            if(fgets(linein,80,screen)==NULL)
                done=TRUE;
            else
                printf("%s",linein);
        } while (!done);

else
    {
        log_IO_error (ferror(screen),flnm);
        return (FALSE);
    } update_screen_time (timestamp());
    update_screen_date (timestamp());
    show_SA_boards ();                    /* Depends on sa_init done first */
    point_to_socket ();                   /* Depends on get_playlist_name done first */ for (xloop=1;xloop<=3;xloop++)
        for (yloop=1;yloop<=16;yloop++)
        {
            gotoxy(((xloop*25)-16),yloop+4);
            printf("%s",socket->playlist_title [(16*xloop)-17+yloop]);
        } fclose(screen);
    return (TRUE);
}
//----------------------------------------------------------------------// void update_screen_time (char *timeinfo)
{
// Write the current time in the time window of the display char hours[10];

strncpy(hours,&timeinfo[11],8);
```

```c
    hours[8]='\0';

gotoxy(TIMEX,TIMEY);
    printf("%s",hours);

}
//---------------------------------------------------------------------------// char *date_based_flnm (char *timeinfo)
{
// Return a filename for the logfile that is based on the current date log_flnm = (char far *) farmalloc(10);

strncpy(&log_flnm[0],&timeinfo[4],3);
    strncpy(&log_flnm[3],&timeinfo[8],2);
    strncpy(&log_flnm[5],".",1);
    strcpy(&log_flnm[6],"LOG");

return (log_flnm);
}
//---------------------------------------------------------------------------// void update_screen_date (char *timeinfo)
{
// Write the current date in the date window of the display char date[8];

strncpy(date,&timeinfo[4],6);
    date[6]='\0';

gotoxy(DATEX,DATEY);
    printf("%s",date);

}
//---------------------------------------------------------------------------// int file_exists (char *clip_name)
{
// Determine if the passed file name exists on the SA Scsi drive and
// return a semaphore as an indicator int *data_ptr;
    char name[10];
    memset(name,0x00,10);
    strncpy(name,clip_name,end_of_line(clip_name));
    data_ptr = (int *)name;

send_command (FILE_EXISTS ,5,data_ptr);

// Listen for response from SA SCSI
    do {
        receive_data (TRUE);
    }while (((data & 0xF000) != 0xE000)&&((data & 0xF000) != 0xA000));

if(data == NOT_EXIST )
        return (FALSE);

return (TRUE);
}
//---------------------------------------------------------------------------// int download_decoder_ucode (char *ucode_flnm)
{
    FILE *ufile;
    unsigned int total_words;

/* Open file (make sure it exists) */
    if((ufile = fopen(ucode_flnm,"rb")) == NULL)
    {
        log_IO_error (ferror(ufile),ucode_flnm);
        return(1);
    } log_SA_error (0,"Downloading microcode...");

/* Read file and send data */
```

```c
    while(!feof(ufile))
    {
        /* Validate that command is there */ if (fread(cwdata,2,2,ufile) == 2)      /* read command & length */
        {
            if ((cwdata[0] != DOWNLOAD_MICROCODE )&&
                       (cwdata[0] != CONFIG_DECODER ))
            {
                log_SA_error (0,"Command not found in microcode " );
                fclose(ufile);
                return(1);
            }

/* Read data if exists */ total_words = cwdata[1];

if (total_words > 2048)
            {
                log_SA_error (0,"Invalid record size for microcode" );
                fclose(ufile);
                return(1);
            }
            else if (total_words > 0)
            {
                if (fread(&cwdata[2],2,total_words,ufile) != total_words )
                {
                    log_IO_error (ferror(ufile),ucode_flnm );
                    fclose(ufile);
                    return(1);
                }

/* Have data, issue command to decoder */ data_ptr = (int *)&cwdata[2];

send_command (cwdata[0],total_words,data_ptr );

do
                {
                    receive_data (TRUE);                /* make sure loaded ok */
                } while ((( data & 0xF000) != 0xE000)&&((data & 0xF000) != 0xA000));

if((data & 0xF000) == 0xE000)
                {
                    log_SA_error (data,"Error on DOWNLOAD_MICROCODE" );
                    return(1);
                }
            }
        }
    } log_SA_error (0,"Download of microcode done" );
    fclose(ufile);

return(0);
}
//----------------------------------------------------------------------//
void clear_error (void)
{
// Move the screen cursor to the error window and clear the existing error
//           -- the cursor is left at the start of the error window.

gotoxy(ERRORX,ERRORY);
    printf("%s",CLEAR_ERROR );
    gotoxy(ERRORX,ERRORY);
}
//----------------------------------------------------------------------//
```

```
PLAY.FRM
'FORM USAGE

'MODIFICATION HISTORY:
'    (none)

'FUNCTIONAL DESCRIPTION:

'  This form allows a privleged user to construct a new
'  playlist template out predefined STV program building
'  blocks. This template is then used to build program
'  wheels for individual stores.

'NOTES:
'    (none)

Dim seq_num As Integer
Dim total_time As Integer
Dim template_name As String * 30

Sub Add_to_Playlist (clip_type As String, clip_time As String, List As Control)

'SUBROUTINE USAGE and ARGUMENTS
'
'    call add_to_playlist (clip_type {string}, clip_time {string}, list{control})
'
'    The first argument is a string and should be the clip description field
'    The second argument is a string and should be the clip run time in seconds
'    The third argument is a control and should be the list box to add informatio
n to.
'
'GLOBAL/EXTERNAL DEPENDANCIES
'
'    max_playlist_minutes  - integer
'                            maximum playlist length in miuites.
'                            (can be exceeded)

'    in_twilight_zone      -- logical
'                            set to true when max_playlist_minutes
'                            value exceeded '    playlist_changed      -- logical
'                            set to false to indicate that playlist has
'                            been modified.

'MODIFICATION HISTORY:
'    (none)

'FUNCTIONAL DESCRIPTION:

'    This Subroutine adds clips to the playlist listbox

'NOTES:
'    (none)

done_button.Enabled = True

If List.ListCount > 0 Then
```

```
            For index_position = 0 To List.ListCount

If List.Selected(index_position) Then out$ = Format(Str(index_position + 1), "0000") & " " & format_c
um_time(0) & "  " & clip_time & "    " & "<" & clip_type & ">"
                        List.AddItem out$, index_position + 1
                        List.Selected(index_position + 1) = True
                        Call Recalculate_Listbox(List)
                        Exit Sub
                End If
            Next out$ = Format(Str(index_position + 1), "0000") & " " & format_cum_time(
0) & "  " & clip_time & "    " & "<" & clip_type & ">"
            List.AddItem out$
            List.Selected(List.ListCount - 1) = True
            Call Recalculate_Listbox(List)
            Exit Sub
        Else
            out$ = Format(Str(List.ListCount + 1), "0000") & " " & format_cum_time(
0) & "  " & clip_time & "    " & "<" & clip_type & ">"
            List.AddItem out$
            List.Selected(List.ListCount - 1) = True
            Call Recalculate_Listbox(List)
        End If End Sub Sub Extract_Template ()
'
'SUBROUTINE USAGE and ARGUMENTS
'
'    call Extract_Template ()
'
'
'GLOBAL/EXTERNAL DEPENDANCIES
'
'    clip_addr_listbox
'    clip_type_listbox
'    pl_template_listbox
'    num_initial_records
'    template_library.{table}
'        {table} is the selected playlist from user
'
'
'MODIFICATION HISTORY:
'    (none)
'
'FUNCTIONAL DESCRIPTION:
'
' Fill the Playlist Template Listbox with the selected
' playlist template data from the battery of databases
' and stuff...
'
'NOTES:
'    (none)

'    On Error GoTo 100

Do While Not template_library.Recordset.EOF
```

```
                                 template                              Fields
        clip_typex$ = template_library.Recordset.Fields(Left$(template.table(tem
plates).Field(t_clip_type).name, End_of_Line(template.table(templates).Field(t_c
lip_type).name)))
        legnth% = template_library.Recordset.Fields(Left$(template.table(templat
es).Field(t_duration).name, End_of_Line(template.table(templates).Field(t_durati
on).name)))
        template_library.Recordset.MoveNext
        duration$ = format_cum_time(legnth%)
        For i = 0 To clip_abbr_listbox.ListCount
            If clip_typex$ = clip_abbr_listbox.List(i) Then
                type_desc$ = clip_types_listbox.List(i)
            End If
        Next
        Call Add_to_Playlist(type_desc$, duration$, pl_template_listbox)
    Loop
    num_initial_records = pl_template_listbox.ListCount If num_initial_records < 1 Then
        Empty_Table = True
    Else
        template_library.Recordset.MoveFirst
    End If Exit Sub 100 :
    MsgBox (Str(Err))
    Unload edit_template
    Exit Sub End Sub Sub Parse_Clip_Timedata (field_data As String, list_box As Control)

'SUBROUTINE USAGE and ARGUMENTS
'
'   call Parse_Clip_Timedata (field_data As String, list_box As control)
'       For more info on format of field_data see NOTES:
'
'GLOBAL/EXTERNAL DEPENDANCIES
'TBD
'
'MODIFICATION HISTORY:
'   (none)
'
'FUNCTIONAL DESCRIPTION:
'
'   This subroutine reads valid clip durations passed in a string that have
'   been taken from the library database. The string of numbers is broken
'   out into individual run legnths, formatted using the format_cum_time()
'   function, and placed into a list box control.
'
'NOTES:
'
'   Run legnth database entries appear in the following format: 5;10;15;20;
'       There is a 255 character database field limitation and the final
'       number MUST be followed by a semi-colon (;)
'
'   Run legnths are specified in the clip_type table of the library database.
'
    Dim char_pos, start, legnth As Integer
```

```
        start = 1

For char_pos = 1 To End_of_Line(field_data)
        If Mid$(field_data, char_pos, 1) = ";" Then
            legnth = Val(Mid$(field_data, start, (char_pos - 1)))
            list_box.AddItem format_cum_time(legnth)
            start = char_pos + 1
        End If
    Next End Sub Sub Recalculate_Listbox (listbox As Control)

'Function USAGE and ARGUMENTS
'
'   Call Recalculate_Listbox(listbox)
'       Pass the listbox control and this routine calculates
'       the cumulative playlist time for the entire listbox.
'
'
'GLOBAL/EXTERNAL DEPENDANCIES
'
'   Max_Playlist_Minutes as global max playlist len to display warning
'
'MODIFICATION HISTORY:
'   (none)
'
'FUNCTIONAL DESCRIPTION:
'
'   Recalculates the Cumulative field in the playlist template
'   listbox and updates the cumulative time histogram
'
'
'NOTES:
'   (none)
'

Dim current_selection As Integer
    Dim cum_time As Integer
    Dim listbox_entry As Integer listbox.MousePointer = hourglass current_selection = listbox.ListIndex
    For listbox_entry = 0 To listbox.ListCount - 1

If listbox_entry > 0 Then
            cum_time = decode_cum_time(Mid$(listbox.List(listbox_entry - 1), 7,
7))
        Else
            cum_time = 0
        End If cum_time = cum_time + decode_cum_time(Mid$(listbox.List(listbox_entry),
16, 7))

Entry$ = listbox.List(listbox_entry)
        Mid$(Entry$, 7, 7) = format_cum_time(cum_time)
```

```
            Mid$(Entry$, 1, 4) = Format(Str(listbox_entry + 1), "0000")
            listbox.List(listbox_entry) = Entry$
    Next If cum_time > (max_playlist_minutes * 60) And Not in_twilight_zone Then
        MsgBox ("test")
        in_twilight_zone = True
    Else
        If cum_time < (max_playlist_minutes * 60) Then in_twilight_zone = False
    End If Call Update_Histogram(cum_time, pl_histogram)
    listbox.MousePointer = default
End Sub Sub Remove_from_Playlist (listbox As Control)

'Subroutine USAGE and ARGUMENTS
'
'   Call Remove_from_Playlist (listbox As control)
'
'GLOBAL/EXTERNAL DEPENDANCIES
'
'   max_playlist_minutes - integer
'                           maximum playlist length in miuites.
'                           (can be exceeded)

'   in_twilight_zone     -- logical
'                           set to true when max_playlist_minutes
'                           value exceeded
'
'MODIFICATION HISTORY:
'   (none)
'
'FUNCTIONAL DESCRIPTION:
'   tbd
'
'NOTES:
'   (none)
'
    done_button.Enabled = True If listbox.ListIndex >= 0 Then current_selection = listbox.ListIndex
        listbox.RemoveItem (current_selection)

If current_selection > 0 Then
            listbox.Selected(current_selection - 1) = True
        Else
            If listbox.ListCount > 0 Then listbox.Selected(0) = True
        End If Call Recalculate_Listbox(listbox)
    Else
        Beep
    End If
End Sub Sub Update_Histogram (seconds As Integer, histogram As Control)
```

```
'SUBROUTINE USAGE and ARGUMENTS
'
'   call Update_Histogram (seconds as integer, histogram As control)
'
'   The first argument is the current cumulative time in seconds
'
'   The second argument is a guage control
'
'GLOBAL/EXTERNAL DEPENDANCIES
'TBD
'
'MODIFICATION HISTORY:
'   (none)
'
'FUNCTIONAL DESCRIPTION:
'
'
'NOTES:
'   (none)
'

If Not in_twilight_zone Then histogram.Enabled = True
        histogram.ForeColor = red
        pl_mins_display.Enabled = True histogram.Value = seconds
        pl_mins_display.Text = format_cum_time(seconds)
    Else
        histogram.Enabled = False
        histogram.ForeColor = black
        pl_mins_display.Enabled = False
    End If
End Sub Sub Add_Button_Click ()

Dim i, j As Integer edit_template.MousePointer = hourglass
    status.Text = "Adding Entry..."

For i = 0 To clip_types_listbox.ListCount - 1
        If clip_types_listbox.Selected(i) = True Then
            For j = 0 To valid_times_listbox.ListCount - 1
                If valid_times_listbox.Selected(j) = True Then
                    clip_time$ = valid_times_listbox.List(valid_times_listbox.ListIndex)
                    clip_typex$ = clip_types_listbox.List(clip_types_listbox.ListIndex)
                    Call Add_to_Playlist(clip_typex$, clip_time$, pl_template_listbox)
                End If
            Next
        End If
    Next edit_template.MousePointer = default
```

```
        status.Text = template_name
                              ^
End Sub

Sub Cancel_Button_Click ()
    If done_button.Enabled Then
        mb_response = MsgBox("Playlist changes will be LOST! OK to Proceed?", ml
_okcancel + mb_iconexclamation + mb_defbutton1, "Close Template Window")
    Else
        mb_response = idok
    End If If mb_response = idok Then
        Unload edit_template
    End If End Sub Sub Clip_types_listbox_Click ()

'   Disable ADD button (add button is only 'on' when
'   both a clip type and a clip duration are selected)

add_button.Enabled = False

'   Whenever a new clip type is selected fill the
'   valid_times list box with all possible durations allowed
'   for that particular clip type.

valid_times_listbox.Clear
    sql = "Select * from clip_types where type_desc = """ & clip_types_listbox.l
ist(clip_types_listbox.ListIndex) & """"
    clip_library.RecordSource = sql
    clip_library.Refresh '   Valid times are kept in a single string of the
'   clip_types table for each clip_type entry.
'   Values are separated by a ; and consequently must
'   be parsed into individual values before loading
'   into the valid_times listbox info$ = clip_library.Recordset.Fields("valid_times")
    Call Parse_Clip_Timedata(info$, valid_times_listbox)

End Sub

Sub clip_types_listbox_DblClick ()
    Dim i, j As Integer

For i = 0 To clip_types_listbox.ListCount - 1
        If clip_types_listbox.Selected(i) = True Then
            For j = 0 To valid_times_listbox.ListCount - 1
                If valid_times_listbox.Selected(j) = True Then
                    clip_time$ = valid_times_listbox.List(valid_times_listbox.Li
stIndex)
                    clip_typex$ = clip_types_listbox.List(clip_types_listbox.Lis
tIndex)
                    Call Add_to_Playlist(clip_typex$, clip_time$, pl_template_li
stbox)
                End If
            Next
```

```
        End If
    Next

End Sub

Sub Done_Button_Click ()

Dim mb_response As Integer

If pl_histogram.Value / 60 < min_playlist_minutes Then
         mb_response = MsgBox("Playlist is less than " & min_playlist_minutes & '
 Minutes. Save Anyway?", mb_yesno + mb_iconquestion + mb_defbutton2, "Playlist t
oo Short")
    Else
         mb_response = idyes
    End If If mb_response = idyes Then
         edit_template.MousePointer = hourglass
         status.Text = "Removing Old Template..."

'        Release the selected_template table by establishing
'        a lock on the index database
         template_library.RecordSource = template.table(template_data).name
         template_library.Refresh '        Delete the table being updated from the database
         Call delete_table(template_library.Database, selected_template)
         status.Text = status.Text & ok '        Re-Add the table and replace the indexes
         status.Text = "Adding New Template..."
         Call add_table(template_library.Database, selected_template, template.ta
ble(templates))
         Call add_index(template_library.Database, selected_template, template.ta
ble(templates))
         status.Text = status.Text & ok '        Lock on to now empty selected template table
         template_library.RecordSource = selected_template
         template_library.Refresh '        Move contents of listbox to the selected_template table
         status.Text = "Writing to Database..."
         For i = 0 To pl_template_listbox.ListCount - 1
             thisline$ = pl_template_listbox.List(i)
             type_desc$ = Mid$(thisline$, 27, Len(thisline$))
             duration = decode_cum_time(Mid$(thisline$, 16, 7))

'            Scoot through all valid clip types to get
'            appropriate clip type abbreviation for database
'            -----------------------------------------------
             For j = 0 To clip_abbr_listbox.ListCount
                 If Left$(type_desc$, Len(type_desc$) - 1) = clip_types_listbox.L
ist(j) Then
                     clip_typex$ = clip_abbr_listbox.List(j)
                 End If
             Next j
```

```
'           template_library.Recordset.AddNew
'           template_library.Recordset.Fields("seq_num") = i + 1
'           template_library.Recordset.Fields("clip_type") = clip_typex$
'           template_library.Recordset.Fields("duration") = duration
'           template_library.Recordset.Update template_library.Recordset.AddNew
            template_library.Recordset.Fields(Left$(template.table(templates).Fi
eld(t_seq_num).name, End_of_Line(template.table(templates).Field(t_seq_num).name
))) = i + 1
            template_library.Recordset.Fields(Left$(template.table(templates).Fi
eld(t_clip_type).name, End_of_Line(template.table(templates).Field(t_clip_type)
name))) = clip_typex$
            template_library.Recordset.Fields(Left$(template.table(templates).Fi
eld(t_duration).name, End_of_Line(template.table(templates).Field(t_duration).na
me))) = duration
            template_library.Recordset.Update
        Next i
        status.Text = status.Text & ok
        edit_template.MousePointer = default
    Unload edit_template
    End If
End Sub '
Sub Finalize_Button_Click ()
    MsgBox ("Man I got a headache")
End Sub Sub Form_Load ()

Dim Empty_Table     'logical
    template_name = "Editing Template " & Left$(selected_template, End_of_Line(s
elected_template) + 1) & "..."

'   Tell FORM database controls about the databases they
'   will be accessing clip_library.DatabaseName = drive & local_path & library_name
    clip_library.RecordSource = "Select * from clip_types"
    clip_library.Refresh '     template_library.DatabaseName = drive & local_path & template_library_name
'     template_library.RecordSource = selected_template
'     template_library.Refresh template_library.DatabaseName = template.name
    template_library.RecordSource = selected_template
    template_library.Refresh ' Load the VALID_CLIP_TYPES Listbox and select item#1 as
' the default selected item Do While Not clip_library.Recordset.EOF
        If Not IsNull(clip_library.Recordset(0)) Then
            clip_types_listbox.AddItem clip_library.Recordset.Fields("type_desc"
)
            clip_abbr_listbox.AddItem clip_library.Recordset.Fields("clip_type")
        End If
        clip_library.Recordset.MoveNext
```

```
        Loop
        clip_library.Refresh clip_types_listbox.Selected(0) = True Call Extract_Template
        playlist_changed = False
        done_button.Enabled = False
        status.Text = template_name$
End Sub '
Sub Remove_Button_Click ()
    edit_template.MousePointer = hourglass
    status.Text = "Removing Template Entry..."

Call Remove_from_Playlist(pl_template_listbox)

status.Text = template_name
    edit_template.MousePointer = default
End Sub

Sub Valid_times_listbox_Click ()
    add_button.Enabled = True
End Sub

Sub Valid_times_listbox_DblClick ()

Dim i, j As Integer edit_template.MousePointer = hourglass
    status.Text = "Adding Entry..."

For i = 0 To clip_types_listbox.ListCount - 1
        If clip_types_listbox.Selected(i) = True Then
            For j = 0 To valid_times_listbox.ListCount - 1
                If valid_times_listbox.Selected(j) = True Then
                    clip_time$ = valid_times_listbox.List(valid_times_listbox.Li
stIndex)
                    clip_typex$ = clip_types_listbox.List(clip_types_listbox.Lis
tIndex)
                    Call Add_to_Playlist(clip_typex$, clip_time$, pl_template_li
stbox)
                End If
            Next
        End If
    Next edit_template.MousePointer = default
    status.Text = template_name
End Sub
```

`CONTEMPL.FRM`

```
'Remember thsi form will be called by a user already having a
' playlist title that simply wants to use a different template
'
'

Sub Add_to_Playlist (clip_type As String, clip_time As String, List As Control)

'SUBROUTINE USAGE and ARGUMENTS
'
'   call add_to_playlist (clip_type {string}, clip_time {string}, list{control})
'
'   The first argument is a string and should be the clip description field
'   The second argument is a string and should be the clip run time in seconds
'   The third argument is a control and should be the list box to add informatio
n to.
'
'GLOBAL/EXTERNAL DEPENDANCIES
'
'   max_playlist_minutes - integer
'                          maximum playlist length in miuites.
'                          (can be exceeded)
'
'   in_twilight_zone     -- logical
'                          set to true when max_playlist_minutes
'                          value exceeded
'
'   playlist_changed     -- logical
'                          set to false to indicate that playlist has
'                          been modified.
'
'MODIFICATION HISTORY:
'    (none)
'
'FUNCTIONAL DESCRIPTION:
'
'   This Subroutine adds clips to the playlist listbox
'
'NOTES:
'    (none)

'done_button.Enabled = True

If List.ListCount > 0 Then

For index_position = 0 To List.ListCount

If List.Selected(index_position) Then out$ = Format(Str(index_position + 1), "0000") & " " & format_c
um_time(0) & "   " & clip_time & "    " & "<" & clip_type & ">"
                List.AddItem out$, index_position + 1
                List.Selected(index_position + 1) = True
                Call Recalculate_Listbox(List)
                Exit Sub
            End If
        Next out$ = Format(Str(index_position + 1), "0000") & " " & format_cum_time(
```

```
0) & " " & clip_time & " " & "<" & clip_type & ">"
            List.AddItem out$
            List.Selected(List.ListCount - 1) = True
            Call Recalculate_Listbox(List)
            Exit Sub
        Else
            out$ = Format(Str(List.ListCount + 1), "0000") & " " & format_cum_time(
0) & " " & clip_time & " " & "<" & clip_type & ">"
            List.AddItem out$
            List.Selected(List.ListCount - 1) = True
            Call Recalculate_Listbox(List)
        End If End Sub '
Sub Extract_Template ()
'
'SUBROUTINE USAGE and ARGUMENTS
'
'    call Extract_Template ()
'
'
'GLOBAL/EXTERNAL DEPENDANCIES
'
'    (incomplete dependancy documentation)
'    clip_addr_listbox
'    clip_type_listbox
'    pl_template_listbox
'    num_initial_records
'    template_library.{table}
'        {table} is the selected playlist from user
'
'
'MODIFICATION HISTORY:
'    (none)
'
'FUNCTIONAL DESCRIPTION:
'
' Fill the Playlist Template Listbox with the selected
' playlist template data from the battery of databases
' and stuff...
'
'NOTES:
'    (none)

'    On Error GoTo 100

Do While Not template_library.Recordset.EOF
        clip_typex$ = template_library.Recordset.Fields("clip_type")
        legnth% = template_library.Recordset.Fields("duration")
        template_library.Recordset.MoveNext
        duration$ = format_cum_time(legnth%)
        For i = 0 To clip_abbr_listbox.ListCount
            If clip_typex$ = clip_abbr_listbox.List(i) Then
                type_desc$ = clip_types_listbox.List(i)
            End If
        Next
        Call Add_to_Playlist(type_desc$, duration$, pl_template_listbox)
    Loop
    num_initial_records = pl_template_listbox.ListCount
```

```
        'If num_initial_records < 1 Then
        '    Empty_Table = True
        'Else
        '    template_library.Recordset.MoveFirst
        'End If Exit Sub 100 :
    MsgBox (Str(Err))
    Unload open_template
    Exit Sub End Sub Sub Recalculate_Listbox (listbox As Control)

'Function USAGE and ARGUMENTS
'
'    Call Recalculate_Listbox(listbox)
'        Pass the listbox control and this routine calculates
'        the cumulative playlist time for the entire listbox.
'
'
'GLOBAL/EXTERNAL DEPENDANCIES
'
'    Max_Playlist_Minutes as global max playlist len to display warning
'
'MODIFICATION HISTORY:
'    (none)
'
'FUNCTIONAL DESCRIPTION:
'
'    Recalculates the Cumulative field in the playlist template
'    listbox and updates the cumulative time histogram
'
'
'NOTES:
'    (none)
'

Dim current_selection As Integer
    Dim cum_time As Integer
    Dim listbox_entry As Integer listbox.MousePointer = hourglass current_selection = listbox.ListIndex
    For listbox_entry = 0 To listbox.ListCount - 1

If listbox_entry > 0 Then
            cum_time = decode_cum_time(Mid$(listbox.List(listbox_entry - 1), 7,
7))
        Else
            cum_time = 0
        End If cum_time = cum_time + decode_cum_time(Mid$(listbox.List(listbox_entry),
16, 7))
```

```
        Entry$ = listbox.List(listbox_entry)
        Mid$(Entry$, 7, 7) = format_cum_time(cum_time)
        Mid$(Entry$, 1, 4) = Format(Str(listbox_entry + 1), "0000")
        listbox.List(listbox_entry) = Entry$
    Next If cum_time > (max_playlist_minutes * 60) And Not in_twilight_zone Then
        MsgBox ("test")
        in_twilight_zone = True
    Else
        If cum_time < (max_playlist_minutes * 60) Then in_twilight_zone = False
    End If listbox.MousePointer = default
End Sub '
Sub Cancel_Button_Click ()
    Unload open_template
End Sub Sub edit_button_Click ()

Status.Text = opening_form
    open_template.MousePointer = hourglass

'   Load the Edit/Create Template form
'   ------------------------------------
    selected_template = existing_templates_listbox.List(existing_templates_listb
ox.ListIndex)

template_library.RecordSource = template_library_table
    template_library.Refresh
    edit_template.Show modal open_template.MousePointer = hourglass
    Status.Text = loading
    pl_template_listbox.Clear '   Refresh the Playlist Template Contents list upon return from the
'   Edit/Create Template form
'   ------------------------------------------------------------------
    template_library.RecordSource = existing_templates_listbox.List(existing_tem
plates_listbox.ListIndex)
    template_library.Refresh Call Extract_Template Status.Text = ready
    open_template.MousePointer = default End Sub Sub Existing_Templates_Listbox_Click ()

pl_template_listbox.Clear
    template_library.RecordSource = existing_templates_listbox.List(existing_tem
plates_listbox.ListIndex)
    template_library.Refresh Status.Text = loading
```

```
        open_template.MousePointer = hourglass
        Call Extract_Template
        Status.Text = ready
        open_template.MousePointer = default
End Sub Sub Form_Load ()

Status.Text = loading
    If security_level < supervisor Then
        new_button.Enabled = False
        edit_button.Enabled = False
    End If clip_library.DatabaseName = drive & local_path & library_name
    clip_library.RecordSource = "Select * from clip_types"
    clip_library.Refresh template_library.DatabaseName = Template.name
    template_library.RecordSource = Template.table(Template_Data).name
    template_library.Refresh '   Load the Hidden Clip abbreviation and Clip Type Listboxes
'   ----------------------------------------------------------
    Do While Not clip_library.Recordset.EOF
        If Not IsNull(clip_library.Recordset(0)) Then
            clip_types_listbox.AddItem clip_library.Recordset.Fields("type_desc'
)
            clip_abbr_listbox.AddItem clip_library.Recordset.Fields("clip_type")
        End If
        clip_library.Recordset.MoveNext
    Loop
    clip_library.Refresh '   Load Existing_templates listbox
'   -------------------------------
    Do While Not template_library.Recordset.EOF
        If Not IsNull(template_library.Recordset(0)) Then
            existing_templates_listbox.AddItem template_library.Recordset(0)
        End If
        template_library.Recordset.MoveNext
    Loop
    template_library.Refresh
    existing_templates_listbox.Selected(0) = True template_library.RecordSource = existing_templates_listbox.List(existing_tem
plates_listbox.ListIndex)
    template_library.Refresh Call Extract_Template
    Status.Text = ready
End Sub Sub New_Button_Click ()

'This subroutine creates a new database table, inserts fields, inserts
'indexes, and notifies the index database of the new table's creation
```

```
    Dim num_templates template_library.RecordSource = template_library_table
    template_library.Refresh '   Figure out what the name of the new template will be
'   ---------------------------------------------------------------
    num_templates = Val(existing_templates_listbox.ListCount)
    num_templates = num_templates + 1

'   Add it to the visible listbox
'   -----------------------------
    existing_templates_listbox.AddItem Format(Str(num_templates), "0000")
    selected_template = Format(Str(num_templates), "0000")

'   Add a new table to the template_library database
'   ------------------------------------------------
    Call add_table(template_library.Database, selected_template, Template.table(
Templates))
    Call add_index(template_library.Database, selected_template, Template.table(
Templates))
    template_library.Refresh '   add the new table name and details to the index database
'   --------------------------------------------------------
    template_library.Recordset.AddNew
    template_library.Recordset.Fields(Left$(Template.table(1).Field(1).name, end
_of_line(Template.table(1).Field(1).name))) = Left$(selected_template, end_of_li
ne(selected_template))
    template_library.Recordset.Update '   Open the Playlist template edit window
'   --------------------------------------
    edit_template.Show modal pl_template_listbox.Clear
    Status.Text = loading '   Refresh the Playlist Template Contents list upon return from the
'   Edit/Create Template form
'   ----------------------------------------------------------------
    existing_templates_listbox.Selected(existing_templates_listbox.ListCount - 1
) = True
    template_library.RecordSource = existing_templates_listbox.List(existing_tem
plates_listbox.ListIndex)
    template_library.Refresh Call Extract_Template
    Status.Text = ready End Sub Sub Select_Button_Click ()
MsgBox ("almost there")
End Sub
```

```
PARTIAL.FRM
'FORM USAGE
'
'
'MODIFICATION HISTORY:
'    (none)
'
'FUNCTIONAL DESCRIPTION:
'
'
'
'NOTES:
'    (none)
'
Dim selected_store As String * 7
Dim Changed As Integer
Dim Pending_Status As Integer Sub Cancel_Button_Click ()
    Unload Config_Wheel
End Sub Sub Retrieve_Current_Sockets (Store As String, list_box As Control)
'
'SUBROUTINE USAGE and ARGUMENTS
'
'    call Retrieve_Current_Sockets
'            (Store{String},
'                list_box{Control})
'
'GLOBAL/EXTERNAL DEPENDANCIES
'    (none)
'
'MODIFICATION HISTORY:
'    (none)
'
'FUNCTIONAL DESCRIPTION:
'
'    Query the Playlists database for all existing
'    playlists belonging to a particular store id and
'    load them into a listbox
'
'NOTES:
'    (none)
'
'
    list_box.Clear
'
'   Fill a List Box with the Socket Data for the Selected Store
'   -----------------------------------------------------------
    Sockets.RecordSource = "Select * from " & Store & Socket
    Sockets.Refresh
'
'     sql = "select all [playlist_id] from playlists "
'     sql = sql & "where """ & Selected_Store & """= playlists.[store_id]"
'
    Do While Not Sockets.Recordset.EOF
        If Not IsNull(Sockets.Recordset(0)) Then
```

```
            list_box.AddItem Format(Str(list_box.ListCount + 1), "00") & " " &
Sockets.Recordset.Fields(Left$(StoreInfo.table(socket_data).Field(socket_content
s).name, end_of_line(StoreInfo.table(socket_data).Field(socket_contents).name)))
        End If
'
        Sockets.Recordset.MoveNext
    Loop
    Sockets.Refresh
    list_box.Selected(0) = True
'
End Sub Sub Retrieve_Pending_Sockets (Store As String, list_box As Control)

'
'   Extract Socket Information for a particular store from the
'   PENDING database and load it into a listbox.
'
'
    list_box.Clear
'
'   Fill a List Box with the Socket Data for the Selected Store
'   -----------------------------------------------------------
    Pending_Uplink.RecordSource = Store & Socket
    Pending_Uplink.Refresh Do While Not Pending_Uplink.Recordset.EOF
        If Not IsNull(Pending_Uplink.Recordset(0)) Then
            list_box.AddItem Format(Str(list_box.ListCount + 1), "00") & " " &
Pending_Uplink.Recordset.Fields(Left$(StoreInfo.table(socket_data).Field(socket_
contents).name, end_of_line(StoreInfo.table(socket_data).Field(socket_contents).
name)))
        End If Pending_Uplink.Recordset.MoveNext
    Loop
    Pending_Uplink.Refresh
    list_box.Selected(0) = True End Sub Sub Add_Button_Click ()
    Changed = True
    Config_Wheel.MousePointer = Hourglass
    selected_playlist$ = PL_List.List(PL_List.ListIndex)
    socket_list.AddItem Format(Str(socket_list.ListIndex + 1), "00") & " " & se
lected_playlist, socket_list.ListIndex
    Pointer% = socket_list.ListIndex
    socket_list.RemoveItem socket_list.ListIndex
    If Pointer% < total_local_sockets Then
        socket_list.Selected(Pointer%) = True
    Else
        socket_list.Selected(0) = True
    End If
    Config_Wheel.MousePointer = Default End Sub Sub Close_Button_Click ()
```

```
    If (Changed) Then
        mb_response = MsgBox("Changes to Socket List will be lost", MB_OKCANCEL,
"Warning")
        If mb_response = idok Then
            Unload Config_Wheel
        End If
    Else
        Unload Config_Wheel
    End If End Sub Sub Current_Button_Click ()

Config_Wheel.MousePointer = Hourglass
    Call Retrieve_Current_Sockets(selected_store, socket_list)
    Socket_Status = "Current at Store"
    Config_Wheel.MousePointer = Default End Sub Sub Delete_Button_Click ()
    Changed = True
End Sub Sub Done_Button_Click ()
'
'This button needs to delete the table in the pending database
'if it exists.
'Then the revised pending socket table for the store site is added.
'
'The local library must be checked to insure that each clip exists
' on the local disk drive. If a clip in the playlist doesnt exist
' it must be added to the pending clip table for the store site
'
'
    Dim count As Integer If (Changed) Then '       Move the Database Lock so it will not be in our way
'       ---------------------------------------------------
        Pending_Uplink.RecordSource = Pending.table(uplink_counter).name
        Pending_Uplink.Refresh '       Delete the pending changes to the store site
'       --------------------------------------------
        Config_Wheel.MousePointer = Hourglass If Pending_Status Then
            status.Text = "Deleting Table..."
            Call delete_table(Pending_Uplink.Database, selected_store & Socket)
        End If '       Add a New Table to the pending database for the selected stores sockets
'       -----------------------------------------------------------------------
        status.Text = "Adding Table..."
        Call add_table(Pending_Uplink.Database, selected_store & Socket, Pending
.table(socket_pending))
        Pending_Uplink.RecordSource = selected_store & Socket
```

```
        Pending_Uplink.Refresh status.Text = updating
        For count = 0 To socket_list.ListCount - 1 playlist_title$ = socket_list.List(count)
            playlist_title$ = Mid$(playlist_title$, 5, end_of_line(playlist_titl
e$))

Pending_Uplink.Recordset.AddNew
            Pending_Uplink.Recordset.Fields(Left$(Pending.table(socket_pending).
Field(Pending_Socket_Number).name, end_of_line(Pending.table(socket_pending).Fie
ld(Pending_Socket_Number).name))) = count + 1
            Pending_Uplink.Recordset.Fields(Left$(Pending.table(socket_pending).
Field(Pending_Socket_Contents).name, end_of_line(Pending.table(socket_pending).F
ield(Pending_Socket_Contents).name))) = playlist_title$
            Pending_Uplink.Recordset.Update Next count
        status.Text = ready
        Config_Wheel.MousePointer = Default
        Changed = False
    End If End Sub Sub Duplicate_Button_Click ()
' duplicate playlist and template End Sub Sub edit_button_Click ()

selected_playlist = PL_List.List(PL_List.ListIndex)

status.Text = opening_form
    Config_Wheel.MousePointer = Hourglass edit_playlist.Show modal status.Text = ready
    Config_Wheel.MousePointer = Default
End Sub Sub Form_Load ()

status.Text = loading
    Config_Wheel.MousePointer = Hourglass

If config_full_wheel = True Then
        Config_Wheel.Caption = "Full Playlist/Socket Update Sheet"
        new_Button.Enabled = True
    Else
        Config_Wheel.Caption = "Partial Playlist/Socket Update Sheet"
        new_Button.Enabled = False
    End If Store_Data.DatabaseName = StoreInfo.name
```

```
    Store_Data.RecordSource = Left$(StoreInfo.table(StoreInfo_Data).name, end_of
_line(StoreInfo.table(StoreInfo_Data).name))
    Store_Data.Refresh Sockets.DatabaseName = StoreInfo.name Playlists.DatabaseName = playlist.name
    Playlists.RecordSource = playlist.table(pl_library).name
    Playlists.Refresh Pending_Uplink.DatabaseName = Pending.name
    Pending_Uplink.RecordSource = Pending.table(uplink_counter).name
    Pending_Uplink.Refresh Pending_Status = True Rem
Rem Fill List Box with Valid Store Site Data
Rem ------------------------------------

Do While Not Store_Data.Recordset.EOF
        If Not IsNull(Store_Data.Recordset(0)) Then
            StoreInf_List.AddItem Store_Data.Recordset(0)
        End If
        Store_Data.Recordset.MoveNext
    Loop
    Store_Data.Refresh '
'   Use First Store in Store info list for Default Display
'   ------------------------------------
    Socket_List_Label.Caption = Store_Data.Recordset(0) & " Sockets"
    StoreInf_List.Selected(0) = True
    selected_store = StoreInf_List.List(ListIndex)
    Store_Phone_Box.Text = "(" & Store_Data.Recordset.Fields("area_code") & ") "
 & Store_Data.Recordset.Fields("exchange") & "-" & Store_Data.Recordset.Fields("
number")

Store_Name_Box.Text = Store_Data.Recordset.Fields(Left$(StoreInfo.table(Stor
eInfo_Data).Field(Store_Name).name, end_of_line(StoreInfo.table(StoreInfo_Data).
Field(Store_Name).name)))
    Store_State_Box.Text = Store_Data.Recordset.Fields(Left$(StoreInfo.table(Stc
reInfo_Data).Field(Store_State).name, end_of_line(StoreInfo.table(StoreInfo_Data
).Field(Store_State).name)))
    Store_City_Box.Text = Store_Data.Recordset.Fields(Left$(StoreInfo.table(Stor
eInfo_Data).Field(Store_City).name, end_of_line(StoreInfo.table(StoreInfo_Data).
Field(Store_City).name)))
    total_local_sockets = Store_Data.Recordset.Fields(Left$(StoreInfo.table(Stor
eInfo_Data).Field(Socket_Qty).name, end_of_line(StoreInfo.table(StoreInfo_Data).
Field(Socket_Qty).name)))
'
'   Determine if there are alreay Playlist Changes Pending by
'   looking to see if there is a table in the pending database
'   for the selected store
'   ------------------------------------
    On Error GoTo no_pending_table
    Pending_Uplink.RecordSource = selected_store & Socket
    Pending_Uplink.Refresh '
'   Fill Socket List Box with sockets for Default Store
```

```
'   ------------------------------------------
    Call Retrieve_Current_Sockets(selected_store, socket_list)

'
'   Fill List Box with Valid Playlist Titles
'   ------------------------------------------
    Do While Not Playlists.Recordset.EOF
        If Not IsNull(Playlists.Recordset(0)) Then
            PL_List.AddItem Playlists.Recordset(0)
        End If
        Playlists.Recordset.MoveNext
    Loop
    Playlists.Refresh
    PL_List.Selected(0) = True status.Text = ready
    Config_Wheel.MousePointer = Default
    Exit Sub no_pending_table:
    Pending_Status = False
    pending_button.Enabled = False
Resume Next End Sub Sub New_Button_Click ()

Config_Wheel.status.Text = opening_form
    Config_Wheel.MousePointer = Hourglass open_template.Show modal Config_Wheel.status.Text = ready
    Config_Wheel.MousePointer = Default
End Sub Sub Pending_Button_Click ()

Config_Wheel.MousePointer = Hourglass
    Call Retrieve_Pending_Sockets(selected_store, socket_list)
    Socket_Status = "Pending Uplink"
    Config_Wheel.MousePointer = Default End Sub Sub pl_list_DblClick ()
    selected_playlist = PL_List.List(PL_List.ListIndex)

Config_Wheel.status.Text = opening_form
    Config_Wheel.MousePointer = Hourglass edit_playlist.Show modal Config_Wheel.status.Text = ready
    Config_Wheel.MousePointer = Default End Sub Sub storeinf_list_Click ()
```

```
        status.Text = searching
        Config_Wheel.MousePointer = Hourglass Store_Data.Refresh
        selected_store$ = StoreInf_List.List(StoreInf_List.ListIndex)
        Socket_List_Label.Caption = selected_store$ & " Sockets"

Pending_Status = True
        pending_button.Enabled = True

On Error GoTo no_pending_table_again
        Pending_Uplink.RecordSource = selected_store & Socket
        Pending_Uplink.Refresh Rem
Rem Move Storeinf Database Pointer to Selected_Store
Rem This Keeps the Store Info Panel Current
Rem ---------------------------------------------
        For i = 0 To (StoreInf_List.ListIndex - 1)
            Store_Data.Recordset.MoveNext
        Next Store_Phone_Box.Text = "(" & Store_Data.Recordset.Fields("area_code") & ") "
 & Store_Data.Recordset.Fields("exchange") & "-" & Store_Data.Recordset.Fields("
number")
        Call Retrieve_Current_Sockets(selected_store$, socket_list)

status.Text = ready
        Config_Wheel.MousePointer = Default
Exit Sub no_pending_table_again:
        Pending_Status = False
        pending_button.Enabled = False
Resume Next End Sub
```

PLAYBACK.FRM
'FORM USAGE
'
'
'MODIFICATION HISTORY:
'    (none)
'
'FUNCTIONAL DESCRIPTION:
'
'
'
'NOTES:
'    (none)
'

Sub Add_to_Playlist (clip_type As String, clip_time As String, list As Control)

'SUBROUTINE USAGE and ARGUMENTS
'
'    call add_to_playlist (clip_type {string}, clip_time {string}, list{control})
'
'    The first argument is a string and should be the clip description field
'    The second argument is a string and should be the clip run time in seconds
'    The third argument is a control and should be the list box to add informatio
n to.
'
'GLOBAL/EXTERNAL DEPENDANCIES
'
'    max_playlist_minutes - integer
'                            maximum playlist length in miuites.
'                            (can be exceeded)
'
'    in_twilight_zone     -- logical
'                            set to true when max_playlist_minutes
'                            value exceeded
'
'    playlist_changed     -- logical
'                            set to false to indicate that playlist has
'                            been modified.
'
'MODIFICATION HISTORY:
'    (none)
'
'FUNCTIONAL DESCRIPTION:
'
'    This Subroutine adds clips to the playlist listbox
'
'NOTES:
'    (none)

'    done_button.Enabled = True

If list.ListCount > 0 Then

For index_position = 0 To list.ListCount

If list.Selected(index_position) Then out$ = Format(Str(index_position + 1), "0000") & "  " & format_c
um_time(0) & "   " & clip_time & "    " & "<" & clip_type & ">"
                list.AddItem out$, index_position + 1
                list.Selected(index_position + 1) = True

```
                    Call Recalculate_Listbox(list)
                    Exit Sub
                End If
            Next out$ = Format(Str(index_position + 1), "0000") & "   " & format_cum_time(
0) & "   " & clip_time & "    " & "<" & clip_type & ">"
            list.AddItem out$
            list.Selected(list.ListCount - 1) = True
            Call Recalculate_Listbox(list)
            Exit Sub
        Else
            out$ = Format(Str(list.ListCount + 1), "0000") & "   " & format_cum_time(
0) & "   " & clip_time & "    " & "<" & clip_type & ">"
            list.AddItem out$
            list.Selected(list.ListCount - 1) = True
            Call Recalculate_Listbox(list)
        End If End Sub Sub Extract_Template ()
'
'SUBROUTINE USAGE and ARGUMENTS
'
'    call Extract_Template ()
'
'
'GLOBAL/EXTERNAL DEPENDANCIES
'
'    clip_addr_listbox
'    clip_type_listbox
'    pl_template_listbox
'    num_initial_records
'    template_library.{table}
'        {table} is the selected playlist from user
'
'
'MODIFICATION HISTORY:
'    (none)
'
'FUNCTIONAL DESCRIPTION:
'
' Fill the Playlist Template Listbox with the selected
' playlist template data from the battery of databases
' and stuff...
'
'NOTES:
'    (none)

'    On Error GoTo 100

Do While Not template_library.Recordset.EOF
        clip_typex$ = template_library.Recordset.Fields("clip_type")
        legnth% = template_library.Recordset.Fields("duration")
        template_library.Recordset.MoveNext
        duration$ = format_cum_time(legnth%)
        For i = 0 To Clip_Abbr_Listbox.ListCount
            If clip_typex$ = Clip_Abbr_Listbox.List(i) Then
                type_desc$ = clip_types_listbox.List(i)
            End If
```

```
        Next
    Call Add_to_Playlist(type_desc$, duration$, pl_template_listbox)
    Loop
    num_initial_records = pl_template_listbox.ListCount If num_initial_records < 1 Then
        Empty_Table = True
    Else
        template_library.Recordset.MoveFirst
    End If Exit Sub End Sub Sub front_group (abbr As String)

If abbr = Clip_Abbr_Listbox.List(0) Then bumper_group.ZOrder 0
    If abbr = Clip_Abbr_Listbox.List(1) Then commercial_group.ZOrder 0
    If abbr = Clip_Abbr_Listbox.List(2) Then interrupt_group.ZOrder 0
    If abbr = Clip_Abbr_Listbox.List(3) Then specific_group.ZOrder 0
    If abbr = Clip_Abbr_Listbox.List(4) Then logo_group.ZOrder 0
    If abbr = Clip_Abbr_Listbox.List(5) Then prog_ins_group.ZOrder 0
    If abbr = Clip_Abbr_Listbox.List(6) Then visual_music_group.ZOrder 0

End Sub

Function Get_Clip_Type (clip_abbr As String) As String

Dim count As Integer

For count = 0 To Clip_Abbr_Listbox.ListCount
        If clip_abbr = Clip_Abbr_Listbox.List(count) Then
            Get_Clip_Type = clip_types_listbox.List(count)
            Exit Function
        End If
    Next
    Get_Clip_Type = "******"
End Function Sub List2_Click ()
    bumper_group.ZOrder 0
End Sub Sub Picture1_Click ()

End Sub

Sub Query_Database (sql As String, listbox As Control, sn_listbox As Control, database As Data)

database.RecordSource = sql$
    database.Refresh

Do While Not database.Recordset.EOF
        If Not IsNull(database.Recordset(0)) Then
            entry = Right$(format_cum_time(Val(database.Recordset.Fields("Clip_Run_Time"))), 4) & " " & Left$(database.Recordset.Fields("Clip_Title"), 25)
            listbox.AddItem entry
            entry = database.Recordset.Fields("Clip_SN")
```

```
            sn_listbox.AddItem entry
            database.Recordset.MoveNext
        End If
    Loop End Sub Sub Recalculate_Listbox (listbox As Control)

'Function USAGE and ARGUMENTS
'
'    Call Recalculate_Listbox(listbox)
'        Pass the listbox control and this routine calculates
'        the cumulative playlist time for the entire listbox.
'
'
'GLOBAL/EXTERNAL DEPENDANCIES
'
'    Max_Playlist_Minutes as global max playlist len to display warning
'
'MODIFICATION HISTORY:
'    (none)
'
'FUNCTIONAL DESCRIPTION:
'
'    Recalculates the Cumulative field in the playlist template
'    listbox and updates the cumulative time histogram
'
'
'NOTES:
'    (none)
'

Dim current_selection As Integer
    Dim cum_time As Integer
    Dim listbox_entry As Integer listbox.MousePointer = hourglass current_selection = listbox.ListIndex
    For listbox_entry = 0 To listbox.ListCount - 1

If listbox_entry > 0 Then
            cum_time = decode_cum_time(Mid$(listbox.List(listbox_entry - 1), 7, 7))
        Else
            cum_time = 0
        End If cum_time = cum_time + decode_cum_time(Mid$(listbox.List(listbox_entry), 16, 7))

entry$ = listbox.List(listbox_entry)
        Mid$(entry$, 7, 7) = format_cum_time(cum_time)
        Mid$(entry$, 1, 4) = Format(Str(listbox_entry + 1), "0000")
        listbox.List(listbox_entry) = entry$
    Next If cum_time > (max_playlist_minutes * 60) And Not in_twilight_zone Then
        MsgBox ("test")
```

```
            in_twilight_zone = True
    Else
        If cum_time < (max_playlist_minutes * 60) Then in_twilight_zone = False
    End If '   Call Update_Histogram(cum_time, pl_histogram)
    listbox.MousePointer = default
End Sub Sub Bumper_Group_Click ()
    bumper_group.ZOrder 0
End Sub Sub Bumper_listbox_Click ()
    bumper_group.ZOrder 0
End Sub Sub Bumper_listbox_DblClick ()

MsgBox (bumper_sn_listbox.List(bumper_listbox.ListIndex))

End Sub

Sub Cancel_command_Click ()
    Unload edit_playlist
End Sub

Sub Commercial_group_Click ()
    commercial_group.ZOrder 0
End Sub

Sub Commercial_listbox_Click ()
    commercial_group.ZOrder 0
End Sub

Sub Form_Load ()

Dim serial_num As String * 12
    Dim seconds As Integer
    Dim count As Integer
    Dim entry As String * 80 status.Text = loading
    edit_playlist.MousePointer = hourglass

'   Establish Database Controls for this form
'   -------------------------------------------
    prog.DatabaseName = Library.name
    prog.RecordSource = Left$(Library.table(programming).name, end_of_line(Library.table(programming).name))
    prog.Refresh clip_library.DatabaseName = Library.name
    clip_library.RecordSource = "Select * from " & Left$(Library.table(clip_types).name, end_of_line(Library.table(clip_types).name))
    clip_library.Refresh '   Attach to the playlist index database to get info about selected playlist
'   -------------------------------------------------------------------------
    PL.DatabaseName = playlist.name
    PL.RecordSource = Left$(playlist.table(PL_Library).name, end_of_line(playlis
```

```
t.table(PL_Library).name))
    PL.Refresh

'   Get the Template_ID used to create this playlist from that information
'   ----------------------------------------------------------------
    Playlist_Template$ = PL.Recordset.Fields(Left$(playlist.table(PL_Library).Fi
eld(PL_template_id).name, end_of_line(playlist.table(PL_Library).Field(PL_templa
te_id).name)))

'   Attach to the Template_ID in the template database
'   ----------------------------------------------------------------
    template_library.DatabaseName = template.name
    template_library.RecordSource = Playlist_Template$
    template_library.Refresh '   Attach to the actual playlist in the playlist database
'   ----------------------------------------------------------------
    PL.DatabaseName = playlist.name
    PL.RecordSource = selected_Playlist
    PL.Refresh '   Load the Hidden VALID_CLIP_TYPES and CLIP_ABBR Listboxes
'   ----------------------------------------------------------------
    clip_types_listbox.Clear
    Clip_Abbr_Listbox.Clear
    Do While Not clip_library.Recordset.EOF
        If Not IsNull(clip_library.Recordset(0)) Then
            clip_types_listbox.AddItem clip_library.Recordset.Fields(Left$(Libra
ry.table(clip_types).Field(clip_description).name, end_of_line(Library.table(cli
p_types).Field(clip_description).name)))
            Clip_Abbr_Listbox.AddItem clip_library.Recordset.Fields(Left$(Librar
y.table(clip_types).Field(clip_type).name, end_of_line(Library.table(clip_types)
.Field(clip_type).name)))
        End If
        clip_library.Recordset.MoveNext
    Loop
    clip_library.Refresh '   Fill the Hidden Clip_SN listbox
'   ----------------------------------------------------------------
    pl_sn_listbox.Clear
    Do While Not PL.Recordset.EOF
        If Not IsNull(PL.Recordset(0)) Then serial_num = PL.Recordset.Fields(Left$(playlist.table(site_playlist)
.Field(PL_Clip_SN).name, end_of_line(playlist.table(site_playlist).Field(PL_Clip
_SN).name)))
            pl_sn_listbox.AddItem serial_num End If
        PL.Recordset.MoveNext
    Loop
    PL.Refresh '   Fill the hidden template and clip_length listboxes
'   ----------------------------------------------------------------
    pl_template_listbox.Clear
    clip_len_listbox.Clear
    Do While Not template_library.Recordset.EOF
        If Not IsNull(template_library.Recordset(0)) Then
```

```
            pl_template_listbox.AddItem template_library.Recordset.Fields(Left$(
template.table(templates).Field(t_clip_type).name, end_of_line(template.table(te
mplates).Field(t_clip_type).name)))
            clip_len_listbox.AddItem template_library.Recordset.Fields(Left$(tem
plate.table(templates).Field(t_duration).name, end_of_line(template.table(templa
tes).Field(t_duration).name)))

End If
        template_library.Recordset.MoveNext
    Loop
    template_library.Refresh seconds = 0

For count = 0 To pl_template_listbox.ListCount - 1 serial_num = pl_sn_listbox.List(count)
        sql$ = "Select * from programming where """ & serial_num & """ =programm
ing.clip_sn"
        clip_library.RecordSource = sql$
        clip_library.Refresh If count < pl_sn_listbox.ListCount Then
            entry = format_cum_time(seconds) & " " & Right$(format_cum_time(Str
(clip_len_listbox.List(count))), 3) & " " & Left$(clip_library.Recordset.Fields
("Clip_Title"), 25)
        Else
            entry = format_cum_time(seconds) & " " & Right$(format_cum_time(Str
(clip_len_listbox.List(count))), 3) & " " & String(25, " ")
        End If abbr$ = pl_template_listbox.List(count)
        clip$ = Get_Clip_Type(abbr$)
        entry = Left$(entry, 30) & " <" & clip$ & ">"
        pl_title_listbox.AddItem entry seconds = seconds + Val(clip_len_listbox.List(count))

Next count
'*******************************************************************

'   Fill the Hidden PL_Template Listbox with the template for the selected Playl
ist
'   ----------------------------------------------------------------
'       Call Extract_Template '       Do While Not PL.Recordset.EOF
'           If Not IsNull(PL.Recordset(0)) Then '           Grab all info about the clip from the clip library
'           ----------------------------------------------------
'           serial_num = PL.Recordset.Fields(Left$(playlist.table(site_playlist
).Field(PL_Clip_SN).Name, End_of_Line(playlist.table(site_playlist).Field(PL_Cli
p_SN).Name)))

'           sql$ = "Select * from programming where """ & serial_num & """ =pro
gramming.clip_sn"
'           clip_library.RecordSource = sql$
'           clip_library.Refresh
```

```
'          Combine the Playlist and the Playlist Template data into the
'          Playlist display box
'          ------------------------------------------------------------
'               entry = format_cum_time(seconds) & " " & Right$(format_cum_time(Va
l(clip_library.Recordset.Fields("Clip_Run_Time"))), 4) & " " & Left$(clip_libra
ry.Recordset.Fields("Clip_Title"), 25)
'               entry = Mid$(entry, 1, 30) & Mid$(pl_template_listbox.List(pl_title
_list.ListCount), 25, 25)

'pl_title_list.AddItem entry

'seconds = seconds + clip_library.Recordset.Fields("Clip_Run_Time")

'Do While pl_title_list.ListCount <= pl_template_listbox.ListCount
    '     entry = String(30, " ") & Mid$(pl_template_listbox.List(pl_title_list.I
istCount), 25, 25)
    '     pl_title_list.AddItem entry
    'Loop
'***********************************************************************
'   Fill the Programming Selection Boxes
'   ------------------------------------ sql$ = "Select * from programming where clip_type=""logo"""
    Call Query_Database(sql$, logo_listbox, logo_sn_listbox, clip_library)

sql$ = "Select * from programming where clip_type=""bump"""
    Call Query_Database(sql$, bumper_listbox, bumper_sn_listbox, clip_library)

sql$ = "Select * from programming where clip_type=""vmus"""
    Call Query_Database(sql$, visual_music_listbox, visual_music_sn_listbox, cli
p_library)

sql$ = "Select * from programming where clip_type=""intr"""
    Call Query_Database(sql$, interrupt_listbox, interrupt_sn_listbox, clip_libr
ary)

sql$ = "Select * from programming where clip_type=""pins"""
    Call Query_Database(sql$, prog_ins_listbox, prog_ins_sn_listbox, clip_librar
y)

sql$ = "Select * from programming where clip_type=""krgr"""
    Call Query_Database(sql$, specific_listbox, specific_sn_listbox, clip_librar
y)

sql$ = "Select * from programming where clip_type=""logo"""
    Call Query_Database(sql$, logo_listbox, logo_sn_listbox, clip_library)

pl_title_listbox.Selected(0) = True
    abbr$ = pl_template_listbox.List(pl_title_listbox.ListIndex)
    Call front_group(abbr$)

edit_playlist.MousePointer = default
    status.Text = ready
End Sub

Sub Interrupt_group_Click ()
    interrupt_group.ZOrder 0
```

```
End Sub

Sub Interrupt_listbox_Click ()
    interrupt_group.ZOrder 0
End Sub

Sub Label3_Click ()
    logo_group.ZOrder 0
End Sub

Sub Label4_Click ()
    bumper_group.ZOrder 0
End Sub

Sub Label5_Click ()
    interrupt_group.ZOrder 0
End Sub

Sub Label6_Click ()
    commercial_group.ZOrder 0
End Sub

Sub Label7_Click ()
    prog_ins_group.ZOrder 0
End Sub

Sub Label8_Click ()
    visual_music_group.ZOrder 0
End Sub

Sub Label9_Click ()
    specific_group.ZOrder 0
End Sub

Sub Logo_Group_Click ()
    logo_group.ZOrder 0
End Sub

Sub Logo_listbox_Click ()
    logo_group.ZOrder 0
End Sub

Sub mnuprogbumpersel_Click ()
    bumper_group.ZOrder 0
End Sub

Sub mnuprogchainsel_Click ()
    specific_group.ZOrder 0
End Sub

Sub MnuProgcommsel_Click ()
    commercial_group.ZOrder 0
End Sub

Sub mnuproginsertsel_Click ()
    prog_ins_group.ZOrder 0
End Sub

Sub mnuprogintersel_Click ()
    interrupt_group.ZOrder 0
End Sub
```

```
Sub mnuproglogosel_Click ()
    logo_group.ZOrder 0
End Sub

Sub mnuprogvismussel_Click ()
    visual_music_group.ZOrder 0
End Sub

Sub PL_Title_Listbox_Click ()

abbr$ = pl_template_listbox.List(pl_title_listbox.ListIndex)
    Call front_group(abbr$)

End Sub

Sub Prog_ins_group_Click ()
    prog_ins_group.ZOrder 0
End Sub

Sub Prog_ins_listbox_Click ()
    prog_ins_group.ZOrder 0
End Sub

Sub specific_group_Click ()
    specific_group.ZOrder 0
End Sub

Sub Specific_listbox_Click ()
    specific_group.ZOrder 0
End Sub

Sub Visual_music_group_Click ()
    visual_music_group.ZOrder 0
End Sub

Sub Visual_music_listbox_Click ()
    visual_music_group.ZOrder 0
End Sub
```

```
UPLINK.FRM
'FORM USAGE
'
'
'MODIFICATION HISTORY:
'    (none)
'
'FUNCTIONAL DESCRIPTION:
'
'
'
'NOTES:
'    (none)
'

Sub MnuSelExit_Click ()
    End
End Sub

Sub MnuSelPlaylistFull_Click ()
    Config_full_wheel = True
    config_wheel.Show modal
End Sub Sub MnuSelPlaylistPartial_Click ()
    Config_full_wheel = False
    config_wheel.Show modal
End Sub Sub Form_Load ()

'    Playlist library Database Structure Information
'    ------------------------------------------------
'
playlist.name = Local_Drive$ & Local_Path$ & Playlist_Name
playlist.num_tables = indefinite playlist.table(1).name = "playlists"
playlist.table(1).num_fields = 6
pl_Library = 1 playlist.table(1).Field(1).name = "playlist_id"
playlist.table(1).Field(1).Type = DB_TEXT
playlist.table(1).Field(1).Size = 14
PL_Id = 1 playlist.table(1).Field(2).name = "create_oper"
playlist.table(1).Field(2).Type = DB_TEXT
playlist.table(1).Field(2).Size = 8
PL_create_oper = 2 playlist.table(1).Field(3).name = "create_Date"
playlist.table(1).Field(3).Type = DB_DATE
PL_create_date = 3 playlist.table(1).Field(4).name = "modified"
playlist.table(1).Field(4).Type = DB_DATE
playlist.table(1).Field(4).Size = 8
PL_Modified = 4 playlist.table(1).Field(5).name = "modified_oper"
```

```
playlist.table(1).Field(5).Type = DB_TEXT
playlist.table(1).Field(5).Size = 8
PL_modified_oper = 5 playlist.table(1).Field(6).name = "template_id"
playlist.table(1).Field(6).Type = DB_TEXT
playlist.table(1).Field(6).Size = 10
PL_template_ID = 6

'playlist.Table(2).name = (derrived) Playlist Contents
playlist.table(2).num_fields = 2
site_playlist = 2 playlist.table(2).Field(1).name = "seq_num"
playlist.table(2).Field(1).Type = DB_DOUBLE
PL_seq_num = 1 playlist.table(2).Field(2).name = "clip_SN"
playlist.table(2).Field(2).Type = DB_TEXT
playlist.table(2).Field(2).Size = 12
PL_clip_SN = 2

'   Template library Database Structure Information
'   ----------------------------------------------
'
Template.name = Local_Drive$ & Local_Path$ & TemplateLib_Name
Template.num_tables = indefinite Template.table(1).name = "playlists"
Template.table(1).num_fields = 5
template_data = 1

Template.table(1).Field(1).name = "template_id"
Template.table(1).Field(1).Type = DB_TEXT
Template.table(1).Field(1).Size = 10
t_id = 1

Template.table(1).Field(2).name = "create_oper"
Template.table(1).Field(2).Type = DB_TEXT
Template.table(1).Field(2).Size = 8
t_create_oper = 2

Template.table(1).Field(3).name = "create_date"
Template.table(1).Field(3).Type = DB_DATE
t_create_date = 3

Template.table(1).Field(4).name = "modified_oper"
Template.table(1).Field(4).Type = DB_TEXT
Template.table(1).Field(4).Size = 8
t_modified_oper = 4

Template.table(1).Field(5).name = "modified"
Template.table(1).Field(5).Type = DB_DATE
t_modified_date = 5

'Template.Table(2).name = (derrived) Template Contents
Template.table(2).num_fields = 3
templates = 2
```

```
Template.table(2).Field(1).name = "seq_num"
Template.table(2).Field(1).Type = DB_DOUBLE
t_seq_num = 1

Template.table(2).Field(2).name = "clip_type"
Template.table(2).Field(2).Type = DB_TEXT
Template.table(2).Field(2).Size = 4
t_clip_type = 2

Template.table(2).Field(3).name = "duration"
Template.table(2).Field(3).Type = DB_DOUBLE
t_duration = 3

Template.table(templates).Index.name = Template.table(templates).Field(t_seq_num
).name
Template.table(templates).Index.Fields = "+" & Template.table(templates).Field(t
_seq_num).name
Template.table(templates).Index.Unique = True '   StoreInfo library Database Structure Information
'   -----------------------------------------------
'
StoreInfo.name = Local_Drive$ & Local_Path$ & StoreInfo_Name
StoreInfo.num_tables = indefinite StoreInfo.table(1).name = "store_data"
StoreInfo.table(1).num_fields = 14
StoreInfo_Data = 1

StoreInfo.table(1).Field(1).name = "store_id"
StoreInfo.table(1).Field(1).Type = DB_TEXT
StoreInfo.table(1).Field(1).Size = 50
Store_ID = 1

StoreInfo.table(1).Field(2).name = "store_name"
StoreInfo.table(1).Field(2).Type = DB_TEXT
StoreInfo.table(1).Field(2).Size = 50
Store_Name = 2

StoreInfo.table(1).Field(3).name = "store_address"
StoreInfo.table(1).Field(3).Type = DB_TEXT
StoreInfo.table(1).Field(3).Size = 50
Store_Address = 3

StoreInfo.table(1).Field(4).name = "city"
StoreInfo.table(1).Field(4).Type = DB_TEXT
StoreInfo.table(1).Field(4).Size = 18
Store_City = 4

StoreInfo.table(1).Field(5).name = "state"
StoreInfo.table(1).Field(5).Type = DB_TEXT
StoreInfo.table(1).Field(5).Size = 2
Store_State = 5

StoreInfo.table(1).Field(6).name = "country"
StoreInfo.table(1).Field(6).Type = DB_TEXT
StoreInfo.table(1).Field(6).Size = 3
Store_Country = 6

StoreInfo.table(1).Field(7).name = "country_code"
StoreInfo.table(1).Field(7).Type = DB_TEXT
```

```
StoreInfo.table(1).Field(7).Size = 3
Store_Country_Code = 7

StoreInfo.table(1).Field(8).name = "area_code"
StoreInfo.table(1).Field(8).Type = DB_TEXT
StoreInfo.table(1).Field(8).Size = 3
Store_Area_Code = 8

StoreInfo.table(1).Field(9).name = "exchange"
StoreInfo.table(1).Field(9).Type = DB_TEXT
StoreInfo.table(1).Field(9).Size = 3
Store_Exchange = 9

StoreInfo.table(1).Field(10).name = "number"
StoreInfo.table(1).Field(10).Type = DB_TEXT
StoreInfo.table(1).Field(10).Size = 4
Store_Phone_Number = 10

StoreInfo.table(1).Field(11).name = "manager"
StoreInfo.table(1).Field(11).Type = DB_TEXT
StoreInfo.table(1).Field(11).Size = 50
Store_Manager = 11

StoreInfo.table(1).Field(12).name = "modified"
StoreInfo.table(1).Field(12).Type = DB_DATE
Store_Modified = 12

StoreInfo.table(1).Field(13).name = "modified_oper"
StoreInfo.table(1).Field(13).Type = DB_TEXT
StoreInfo.table(1).Field(13).Size = 8
Store_Modified_Oper = 13

StoreInfo.table(1).Field(14).name = "data_phone"
StoreInfo.table(1).Field(14).Type = DB_TEXT
StoreInfo.table(1).Field(14).Size = 20
Store_Dataphone = 14

StoreInfo.table(1).Field(15).name = "Socket_Qty"
StoreInfo.table(1).Field(15).Type = DB_DOUBLE
'StoreInfo.table(1).Field(15).Size = 20
Socket_Qty = 15

StoreInfo.table(2).name = "Library_Data"
StoreInfo.table(2).num_fields = 1
Library_Data = 2

StoreInfo.table(2).Field(1).name = "Clip_Sn"
StoreInfo.table(2).Field(1).Type = DB_TEXT
StoreInfo.table(2).Field(1).Size = 12
Clip_SN = 1

StoreInfo.table(3).name = "Socket_Data"
StoreInfo.table(3).num_fields = 2
Socket_Data = 3

StoreInfo.table(3).Field(1).name = "Socket_Number"
StoreInfo.table(3).Field(1).Type = DB_DOUBLE
Socket_Number = 1

StoreInfo.table(3).Field(2).name = "Socket_Content"
StoreInfo.table(3).Field(2).Type = DB_TEXT
```

```
StoreInfo.table(3).Field(2).Size = 14
Socket_Contents = 2

'   Pending Uplink Database Structure
'   ----------------------------------
'
Pending.name = Local_Drive$ & Local_Path$ & Pending_Name
Pending.num_tables = indefinite 'Pending.table(1).Name = (derrived) Pending Clip SN
Pending.table(1).num_fields = 1
Clip_Pending = 1

Pending.table(1).Field(1).name = "Clip_SN"
Pending.table(1).Field(1).Type = DB_TEXT
Pending.table(1).Field(1).Size = 12
Pending_Clip_SN = 1

'Pending.Table(2).Name = (Derrived) Pending Store Sockets
Pending.table(2).num_fields = 2
Socket_Pending = 2

Pending.table(2).Field(1).name = "socket_number"
Pending.table(2).Field(1).Type = DB_DOUBLE
'Pending.Table(2).Field(1).Size =
Pending_Socket_Number = 1

Pending.table(2).Field(2).name = "socket_content"
Pending.table(2).Field(2).Type = DB_TEXT
Pending.table(2).Field(2).Size = 14
Pending_Socket_Contents = 2

Pending.table(3).name = "Uplink_Count"
Pending.table(3).num_fields = 1
Uplink_Counter = 3

Pending.table(3).Field(1).name = "Uplink_Count"

'   Clip Library library Database Structure Information
'   ----------------------------------------------------
'
library.name = Local_Drive$ & Local_Path$ & Library_Name
library.num_tables = 2 library.table(1).name = "clip_types"
library.table(1).num_fields = 3
Clip_Types = 1 library.table(1).Field(1).name = "clip_type"
library.table(1).Field(1).Type = DB_TEXT
library.table(1).Field(1).Size = 4
clip_type = 1 library.table(1).Field(2).name = "type_desc"
library.table(1).Field(2).Type = DB_TEXT
library.table(1).Field(2).Size = 50
Clip_Description = 2 library.table(1).Field(3).name = "valid_times"
library.table(1).Field(3).Type = DB_TEXT
```

```
library.table(1).Field(3).Size = 255
valid_times = 3 library.table(2).name = "programming"
library.table(2).num_fields = 6
programming = 2 library.table(2).Field(1).name = "clip_title"
library.table(2).Field(1).Type = DB_TEXT
library.table(2).Field(1).Size = 50
Clip_Title = 1 library.table(2).Field(2).name = "clip_type"
library.table(2).Field(2).Type = DB_TEXT
library.table(2).Field(2).Size = 4
Prog_clip_Type = 2 library.table(2).Field(3).name = "clip_run_time"
library.table(2).Field(3).Type = DB_DOUBLE
Clip_Run_Time = 3 library.table(2).Field(4).name = "clip_sn"
library.table(2).Field(4).Type = DB_TEXT
library.table(2).Field(4).Size = 12
Prog_Clip_SN = 4 library.table(2).Field(5).name = "Freq_weight"
library.table(2).Field(5).Type = DB_DOUBLE
Freq_Weight = 5 library.table(2).Field(6).name = "clip_comments"
library.table(2).Field(6).Type = DB_TEXT
library.table(2).Field(6).Size = 100
Clip_Comments = 6
'
security_level = supervisor
'security_level = worker_bee status.Text = ready
main.MousePointer = default End Sub Sub MnuSelAbout_Click ()
    MsgBox ("STV Uplink S/W Rev -.1")
End Sub Sub MnuSelFileExit_Click ()
    End
End Sub Sub MnuSelFulPlaylist_Click ()
    Config_full_wheel = True status.Text = opening_form
    main.MousePointer = hourglass config_wheel.Show modal status.Text = ready
    main.MousePointer = default
```

```
End Sub

Sub MnuSelPartialPlaylist_Click ()
    Config_full_wheel = False status.Text = opening_form
    main.MousePointer = hourglass config_wheel.Show modal status.Text = ready
    main.MousePointer = default
End Sub
```

UPLINK.BAS
```
Rem
Rem        StoreTeleVision Network Management System
Rem            Copyright 1994 STV Network, Inc
Rem
Rem
Rem                      Author J. Magilton
Rem                      Revision 0.9b    8/29/94
Rem
Rem Installation/PC Specific Values
Rem ---------------------------------
Global Const Local_Drive$ = "C:"
Global Const Local_Path$ = "\storetv\sforward\"
Global Const indefinite% = -2
Global Total_Local_Sockets As Integer
Global Const Socket = "SOCK"
Global Const Serial_Num = "SN"

Rem
Rem System Database Information
Rem ---------------------------
Type table_fields
    Name As String * 20
    Type As Integer
    Size As Integer
End Type Type table_index
    Name As String * 20
    Fields As String * 20
    Unique As Integer
End Type Type database_tables
    Name As String * 20
    num_fields As Integer
    Field(20) As table_fields
    Index As table_index
End Type Type Database_Struct
    Name As String * 72
    Table(10) As database_tables
    num_tables As Integer
End Type
'
'---------------------------------------------
'
'Database Reference Constructs for Playlists Database
'
Global Const Playlist_Name = "playlist.mdb"
Global Playlist As Database_Struct
'   Table Pointers
Global PL_Library As Integer
Global Site_Playlist As Integer
'   Field Pointers
Global PL_ID As Integer
Global PL_Create_Date As Integer
Global PL_Create_Oper As Integer
Global PL_Modified_Date As Integer
Global PL_Mofified_Oper As Integer
Global PL_Template_ID As Integer
```

```
'
Global PL_Seq_Num As Integer
Global PL_Clip_SN As Integer
'
'----------------------------------------
'
'Database Reference Constructs for Clip Library Database
'
Global Const Library_Name = "library.mdb"
Global Library As Database_Struct
'    Table Pointers
Global Clip_Types As Integer
Global Programming As Integer
'    Field Pointers
Global Clip_Type As Integer
Global Clip_Description As Integer
Global Valid_Times As Integer
'
Global Clip_Title As Integer
Global Prog_Clip_Type As Integer
Global Clip_Run_Time As Integer
Global Prog_Clip_SN As Integer
Global Freq_Weight As Integer
Global Clip_Comments As Integer
'
'----------------------------------------
'
'Database Reference Constructs for StoreInfo Database
'
Global Const StoreInfo_Name = "storeinf.mdb"
Global StoreInfo As Database_Struct
'    Table Pointers
Global StoreInfo_Data As Integer
Global Library_Data As Integer
Global Socket_Data As Integer
'    Field Pointers
Global Store_Name As Integer
Global Store_Address As Integer
Global Store_City As Integer
Global Store_State As Integer
Global Store_Country As Integer
Global Store_Country_Code As Integer
Global Store_Area_Code As Integer
Global Store_Exchange As Integer
Global Store_Phone_Number As Integer
Global Store_Manager As Integer
Global Store_Modified_Date As Integer
Global Store_Modified_Oper As Integer
Global Store_DataPhone As Integer
Global Socket_Qty As Integer
'
Global Clip_SN As Integer
'
Global Socket_Number As Integer
Global Socket_Contents As Integer
'
'----------------------------------------
'
Global Const TemplateLib_Name = "templats.mdb"
Global template As Database_Struct
'    Table Pointers
```

```
Global Template_Data As Integer
Global Templates As Integer
'    Field Pointers
Global t_id As Integer
Global t_create_oper As Integer
Global t_create_date As Integer
Global t_modified_oper As Integer
Global t_modified As Integer
'
Global t_seq_num As Integer
Global t_clip_type As Integer
Global t_duration As Integer
'
'------------------------------------
'
Global Const system_name$ = "system.mdb"
Global Const system_table$ = "users"

Global Const equip_name$ = "equip.mdb"
Global Const equip_table$ = "inventory"
'*
'------------------------------------
'
'Database Reference Constructs for Pending Database
'
Global Const Pending_Name = "pending.mdb"
Global Pending As Database_Struct
'    Table Pointers
Global Clip_Pending As Integer
Global Socket_Pending As Integer
Global Uplink_Counter As Integer
'    Field Pointers
Global Pending_Clip_SN As Integer
'
Global Pending_Socket_Number As Integer
Global Pending_Socket_Contents As Integer
'
Rem
Rem System Wide Values/Variables
Rem --------------------------------
Global Config_Full_Wheel%

Rem
Rem Status Panel Sayings
Rem --------------------
Global Const ready = "Ready."
Global Const loading = "Loading..."
Global Const searching = "Searching..."
Global Const Updating = "Updating..."
Global Const opening_form = "Opening Form..."
Global Const ok = "[ok]"
Global Const fail = "[fail]"

Rem
Rem Security
Rem --------
Global Const supervisor = 100
Global Const worker_bee = 20
Global security_level%

Global Selected_Playlist As String * 14
```

```
Global Selected_Template As String * 14

Global Const max_playlist_minutes = 32
Global Const Min_Playlist_Minutes = 25

Global in_twilight_zone                         'Logical

Rem
Rem Database Errors
Rem ---------------
Global Const no_records_in_table = 3021

'*********************************************************
' Visual Basic global constant file. This file can be loaded
' into a code module.
'
' Some constants are commented out because they have
' duplicates (e.g., NONE appears several places).
'
' If you are updating a Visual Basic application written with
' an older version, you should replace your global constants
' with the constants in this file.
'
'''''''''''''''''''''''''''''''

' General

' Clipboard formats
Global Const CF_LINK = &HBF00
Global Const CF_TEXT = 1
Global Const CF_BITMAP = 2
Global Const CF_METAFILE = 3
Global Const CF_DIB = 8
Global Const CF_PALETTE = 9

' DragOver
Global Const ENTER = 0
Global Const LEAVE = 1
Global Const OVER = 2

' Drag (controls)
Global Const CANCEL = 0
Global Const BEGIN_DRAG = 1
Global Const END_DRAG = 2

' Show parameters
Global Const MODAL = 1
Global Const MODELESS = 0

' Arrange Method
' for MDI Forms
Global Const CASCADE = 0
Global Const TILE_HORIZONTAL = 1
Global Const TILE_VERTICAL = 2
Global Const ARRANGE_ICONS = 3

'ZOrder Method
Global Const BRINGTOFRONT = 0
Global Const SENDTOBACK = 1
```

```
' Key Codes
Global Const KEY_LBUTTON = &H1
Global Const KEY_RBUTTON = &H2
Global Const KEY_CANCEL = &H3
Global Const KEY_MBUTTON = &H4        ' NOT contiguous with L & RBUTTON
Global Const KEY_BACK = &H8
Global Const KEY_TAB = &H9
Global Const KEY_CLEAR = &HC
Global Const KEY_RETURN = &HD
Global Const KEY_SHIFT = &H10
Global Const KEY_CONTROL = &H11
Global Const KEY_MENU = &H12
Global Const KEY_PAUSE = &H13
Global Const KEY_CAPITAL = &H14
Global Const KEY_ESCAPE = &H1B
Global Const KEY_SPACE = &H20
Global Const KEY_PRIOR = &H21
Global Const KEY_NEXT = &H22
Global Const KEY_END = &H23
Global Const KEY_HOME = &H24
Global Const KEY_LEFT = &H25
Global Const KEY_UP = &H26
Global Const KEY_RIGHT = &H27
Global Const KEY_DOWN = &H28
Global Const KEY_SELECT = &H29
Global Const KEY_PRINT = &H2A
Global Const KEY_EXECUTE = &H2B
Global Const KEY_SNAPSHOT = &H2C
Global Const KEY_INSERT = &H2D
Global Const KEY_DELETE = &H2E
Global Const KEY_HELP = &H2F ' KEY_A thru KEY_Z are the same as their ASCII equivalents: 'A' thru 'Z'
' KEY_0 thru KEY_9 are the same as their ASCII equivalents: '0' thru '9'

Global Const KEY_NUMPAD0 = &H60
Global Const KEY_NUMPAD1 = &H61
Global Const KEY_NUMPAD2 = &H62
Global Const KEY_NUMPAD3 = &H63
Global Const KEY_NUMPAD4 = &H64
Global Const KEY_NUMPAD5 = &H65
Global Const KEY_NUMPAD6 = &H66
Global Const KEY_NUMPAD7 = &H67
Global Const KEY_NUMPAD8 = &H68
Global Const KEY_NUMPAD9 = &H69
Global Const KEY_MULTIPLY = &H6A
Global Const KEY_ADD = &H6B
Global Const KEY_SEPARATOR = &H6C
Global Const KEY_SUBTRACT = &H6D
Global Const KEY_DECIMAL = &H6E
Global Const KEY_DIVIDE = &H6F
Global Const KEY_F1 = &H70
Global Const KEY_F2 = &H71
Global Const KEY_F3 = &H72
Global Const KEY_F4 = &H73
Global Const KEY_F5 = &H74
Global Const KEY_F6 = &H75
Global Const KEY_F7 = &H76
Global Const KEY_F8 = &H77
Global Const KEY_F9 = &H78
```

```
Global Const KEY_F10 = &H79
Global Const KEY_F11 = &H7A
Global Const KEY_F12 = &H7B
Global Const KEY_F13 = &H7C
Global Const KEY_F14 = &H7D
Global Const KEY_F15 = &H7E
Global Const KEY_F16 = &H7F Global Const KEY_NUMLOCK = &H90

' Variant VarType tags

Global Const V_EMPTY = 0
Global Const V_NULL = 1
Global Const V_INTEGER = 2
Global Const V_LONG = 3
Global Const V_SINGLE = 4
Global Const V_DOUBLE = 5
Global Const V_CURRENCY = 6
Global Const V_DATE = 7
Global Const V_STRING = 8

' Event Parameters

' ErrNum (LinkError)
Global Const WRONG_FORMAT = 1
Global Const DDE_SOURCE_CLOSED = 6
Global Const TOO_MANY_LINKS = 7
Global Const DATA_TRANSFER_FAILED = 8

' QueryUnload
Global Const FORM_CONTROLMENU = 0
Global Const FORM_CODE = 1
Global Const APP_WINDOWS = 2
Global Const APP_TASKMANAGER = 3
Global Const FORM_MDIFORM = 4

' Properties

' Colors
Global Const BLACK = &H0&
Global Const RED = &HFF&
Global Const GREEN = &HFF00&
Global Const YELLOW = &HFFFF&
Global Const BLUE = &HFF0000
Global Const MAGENTA = &HFF00FF
Global Const CYAN = &HFFFF00
Global Const WHITE = &HFFFFFF ' System Colors
Global Const SCROLL_BARS = &H80000000          ' Scroll-bars gray area.
Global Const DESKTOP = &H80000001              ' Desktop.
Global Const ACTIVE_TITLE_BAR = &H80000002     ' Active window caption.
Global Const INACTIVE_TITLE_BAR = &H80000003   ' Inactive window caption.
Global Const MENU_BAR = &H80000004             ' Menu background.
Global Const WINDOW_BACKGROUND = &H80000005    ' Window background.
Global Const WINDOW_FRAME = &H80000006         ' Window frame.
Global Const MENU_TEXT = &H80000007            ' Text in menus.
Global Const WINDOW_TEXT = &H80000008          ' Text in windows.
Global Const TITLE_BAR_TEXT = &H80000009       ' Text in caption, size box, scr
```

```
oll-bar arrow box..
Global Const ACTIVE_BORDER = &H8000000A            ' Active window border.
Global Const INACTIVE_BORDER = &H8000000B          ' Inactive window border.
Global Const APPLICATION_WORKSPACE = &H8000000C    ' Background color of multiple d
ocument interface (MDI) applications.
Global Const HIGHLIGHT = &H8000000D                ' Items selected item in a contn
ol.
Global Const HIGHLIGHT_TEXT = &H8000000E           ' Text of item selected in a con
trol.
Global Const BUTTON_FACE = &H8000000F              ' Face shading on command buttor
s.
Global Const BUTTON_SHADOW = &H80000010            ' Edge shading on command button
s.
Global Const GRAY_TEXT = &H80000011                ' Grayed (disabled) text.  This
color is set to 0 if the current display driver does not support a solid gray co
lor.
Global Const BUTTON_TEXT = &H80000012              ' Text on push buttons.

' Enumerated Types

' Align (picture box)
Global Const NONE = 0
Global Const ALIGN_TOP = 1
Global Const ALIGN_BOTTOM = 2

' Alignment
Global Const LEFT_JUSTIFY = 0    ' 0 - Left Justify
Global Const RIGHT_JUSTIFY = 1   ' 1 - Right Justify
Global Const CENTER = 2          ' 2 - Center ' BorderStyle (form)
'Global Const NONE = 0            ' 0 - None
Global Const FIXED_SINGLE = 1    ' 1 - Fixed Single
Global Const SIZABLE = 2         ' 2 - Sizable (Forms only)
Global Const FIXED_DOUBLE = 3    ' 3 - Fixed Double (Forms only)

' BorderStyle (Shape and Line)
'Global Const TRANSPARENT = 0     '0 - Transparent
'Global Const SOLID = 1           '1 - Solid
'Global Const DASH = 2            ' 2 - Dash
'Global Const DOT = 3             ' 3 - Dot
'Global Const DASH_DOT = 4        ' 4 - Dash-Dot
'Global Const DASH_DOT_DOT = 5    ' 5 - Dash-Dot-Dot
'Global Const INSIDE_SOLID = 6    ' 6 - Inside Solid ' MousePointer
Global Const default = 0         ' 0 - Default
Global Const ARROW = 1           ' 1 - Arrow
Global Const CROSSHAIR = 2       ' 2 - Cross
Global Const IBEAM = 3           ' 3 - I-Beam
Global Const ICON_POINTER = 4    ' 4 - Icon
Global Const SIZE_POINTER = 5    ' 5 - Size
Global Const SIZE_NE_SW = 6      ' 6 - Size NE SW
Global Const SIZE_N_S = 7        ' 7 - Size N S
Global Const SIZE_NW_SE = 8      ' 8 - Size NW SE
Global Const SIZE_W_E = 9        ' 9 - Size W E
Global Const UP_ARROW = 10       ' 10 - Up Arrow
Global Const hourglass = 11      ' 11 - Hourglass
Global Const NO_DROP = 12        ' 12 - No drop ' DragMode
```

```
Global Const MANUAL = 0      ' 0 - Manual
Global Const AUTOMATIC = 1   ' 1 - Automatic ' DrawMode
Global Const BLACKNESS = 1        ' 1 - Blackness
Global Const NOT_MERGE_PEN = 2    ' 2 - Not Merge Pen
Global Const MASK_NOT_PEN = 3     ' 3 - Mask Not Pen
Global Const NOT_COPY_PEN = 4     ' 4 - Not Copy Pen
Global Const MASK_PEN_NOT = 5     ' 5 - Mask Pen Not
Global Const INVERT = 6           ' 6 - Invert
Global Const XOR_PEN = 7          ' 7 - Xor Pen
Global Const NOT_MASK_PEN = 8     ' 8 - Not Mask Pen
Global Const MASK_PEN = 9         ' 9 - Mask Pen
Global Const NOT_XOR_PEN = 10     ' 10 - Not Xor Pen
Global Const NOP = 11             ' 11 - Nop
Global Const MERGE_NOT_PEN = 12   ' 12 - Merge Not Pen
Global Const COPY_PEN = 13        ' 13 - Copy Pen
Global Const MERGE_PEN_NOT = 14   ' 14 - Merge Pen Not
Global Const MERGE_PEN = 15       ' 15 - Merge Pen
Global Const WHITENESS = 16       ' 16 - Whiteness ' DrawStyle
Global Const SOLID = 0            ' 0 - Solid
Global Const DASH = 1             ' 1 - Dash
Global Const DOT = 2              ' 2 - Dot
Global Const DASH_DOT = 3         ' 3 - Dash-Dot
Global Const DASH_DOT_DOT = 4     ' 4 - Dash-Dot-Dot
Global Const INVISIBLE = 5        ' 5 - Invisible
Global Const INSIDE_SOLID = 6     ' 6 - Inside Solid ' FillStyle
' Global Const SOLID = 0             ' 0 - Solid
Global Const TRANSPARENT = 1         ' 1 - Transparent
Global Const HORIZONTAL_LINE = 2     ' 2 - Horizontal Line
Global Const VERTICAL_LINE = 3       ' 3 - Vertical Line
Global Const UPWARD_DIAGONAL = 4     ' 4 - Upward Diagonal
Global Const DOWNWARD_DIAGONAL = 5   ' 5 - Downward Diagonal
Global Const CROSS = 6               ' 6 - Cross
Global Const DIAGONAL_CROSS = 7      ' 7 - Diagonal Cross ' LinkMode (forms and controls)
' Global Const NONE = 0             ' 0 - None
Global Const LINK_SOURCE = 1        ' 1 - Source (forms only)
Global Const LINK_AUTOMATIC = 1     ' 1 - Automatic (controls only)
Global Const LINK_MANUAL = 2        ' 2 - Manual (controls only)
Global Const LINK_NOTIFY = 3        ' 3 - Notify (controls only)

' LinkMode (kept for VB1.0 compatibility, use new constants instead)
Global Const HOT = 1       ' 1 - Hot (controls only)
Global Const SERVER = 1    ' 1 - Server (forms only)
Global Const COLD = 2      ' 2 - Cold (controls only)

' ScaleMode
Global Const USER = 0          ' 0 - User
Global Const TWIPS = 1         ' 1 - Twip
Global Const POINTS = 2        ' 2 - Point
Global Const PIXELS = 3        ' 3 - Pixel
Global Const CHARACTERS = 4    ' 4 - Character
Global Const INCHES = 5        ' 5 - Inch
Global Const MILLIMETERS = 6   ' 6 - Millimeter
```

```
Global Const CENTIMETERS = 7    ' 7 - Centimeter

' ScrollBar
' Global Const NONE     = 0   ' 0 - None
Global Const HORIZONTAL = 1    ' 1 - Horizontal
Global Const VERTICAL = 2      ' 2 - Vertical
Global Const BOTH = 3          ' 3 - Both ' Shape
Global Const SHAPE_RECTANGLE = 0
Global Const SHAPE_SQUARE = 1
Global Const SHAPE_OVAL = 2
Global Const SHAPE_CIRCLE = 3
Global Const SHAPE_ROUNDED_RECTANGLE = 4
Global Const SHAPE_ROUNDED_SQUARE = 5

' WindowState
Global Const NORMAL = 0        ' 0 - Normal
Global Const MINIMIZED = 1     ' 1 - Minimized
Global Const MAXIMIZED = 2     ' 2 - Maximized ' Check Value
Global Const UNCHECKED = 0     ' 0 - Unchecked
Global Const CHECKED = 1       ' 1 - Checked
Global Const GRAYED = 2        ' 2 - Grayed ' Shift parameter masks
Global Const SHIFT_MASK = 1
Global Const CTRL_MASK = 2
Global Const ALT_MASK = 4

' Button parameter masks
Global Const LEFT_BUTTON = 1
Global Const RIGHT_BUTTON = 2
Global Const MIDDLE_BUTTON = 4

' Function Parameters
' MsgBox parameters
Global Const MB_OK = 0                      ' OK button only
Global Const MB_OKCANCEL = 1                ' OK and Cancel buttons
Global Const MB_ABORTRETRYIGNORE = 2        ' Abort, Retry, and Ignore buttons
Global Const MB_YESNOCANCEL = 3             ' Yes, No, and Cancel buttons
Global Const MB_YESNO = 4                   ' Yes and No buttons
Global Const MB_RETRYCANCEL = 5             ' Retry and Cancel buttons Global Const MB_ICONSTOP = 16               ' Critical message
Global Const MB_ICONQUESTION = 32           ' Warning query
Global Const MB_ICONEXCLAMATION = 48        ' Warning message
Global Const MB_ICONINFORMATION = 64        ' Information message Global Const MB_APPLMODAL = 0               ' Application Modal Message Box
Global Const MB_DEFBUTTON1 = 0              ' First button is default
Global Const MB_DEFBUTTON2 = 256            ' Second button is default
Global Const MB_DEFBUTTON3 = 512            ' Third button is default
Global Const MB_SYSTEMMODAL = 4096          'System Modal ' MsgBox return values
Global Const IDOK = 1                       ' OK button pressed
Global Const IDCANCEL = 2                   ' Cancel button pressed
Global Const IDABORT = 3                    ' Abort button pressed
Global Const IDRETRY = 4                    ' Retry button pressed
```

```
Global Const IDIGNORE = 5                   ' Ignore button pressed
Global Const IDYES = 6                      ' Yes button pressed
Global Const IDNO = 7                       ' No button pressed ' SetAttr, Dir, GetAttr functions
Global Const ATTR_NORMAL = 0
Global Const ATTR_READONLY = 1
Global Const ATTR_HIDDEN = 2
Global Const ATTR_SYSTEM = 4
Global Const ATTR_VOLUME = 8
Global Const ATTR_DIRECTORY = 16
Global Const ATTR_ARCHIVE = 32

'Grid
'ColAlignment,FixedAlignment Properties
Global Const GRID_ALIGNLEFT = 0
Global Const GRID_ALIGNRIGHT = 1
Global Const GRID_ALIGNCENTER = 2

'Fillstyle Property
Global Const GRID_SINGLE = 0
Global Const GRID_REPEAT = 1

'Data control
'Error event Response arguments
Global Const DATA_ERRCONTINUE = 0
Global Const DATA_ERRDISPLAY = 1

'Editmode property values
Global Const DATA_EDITNONE = 0
Global Const DATA_EDITMODE = 1
Global Const DATA_EDITADD = 2

' Options property values
Global Const DATA_DENYWRITE = &H1
Global Const DATA_DENYREAD = &H2
Global Const DATA_READONLY = &H4
Global Const DATA_APPENDONLY = &H8
Global Const DATA_INCONSISTENT = &H10
Global Const DATA_CONSISTENT = &H20
Global Const DATA_SQLPASSTHROUGH = &H40

'Validate event Action arguments
Global Const DATA_ACTIONCANCEL = 0
Global Const DATA_ACTIONMOVEFIRST = 1
Global Const DATA_ACTIONMOVEPREVIOUS = 2
Global Const DATA_ACTIONMOVENEXT = 3
Global Const DATA_ACTIONMOVELAST = 4
Global Const DATA_ACTIONADDNEW = 5
Global Const DATA_ACTIONUPDATE = 6
Global Const DATA_ACTIONDELETE = 7
Global Const DATA_ACTIONFIND = 8
Global Const DATA_ACTIONBOOKMARK = 9
Global Const DATA_ACTIONCLOSE = 10
Global Const DATA_ACTIONUNLOAD = 11

'OLE Client Control
'Actions
Global Const OLE_CREATE_EMBED = 0
```

```
Global Const OLE_CREATE_NEW = 0            'from ole1 control
Global Const OLE_CREATE_LINK = 1
Global Const OLE_CREATE_FROM_FILE = 1      'from ole1 control
Global Const OLE_COPY = 4
Global Const OLE_PASTE = 5
Global Const OLE_UPDATE = 6
Global Const OLE_ACTIVATE = 7
Global Const OLE_CLOSE = 9
Global Const OLE_DELETE = 10
Global Const OLE_SAVE_TO_FILE = 11
Global Const OLE_READ_FROM_FILE = 12
Global Const OLE_INSERT_OBJ_DLG = 14
Global Const OLE_PASTE_SPECIAL_DLG = 15
Global Const OLE_FETCH_VERBS = 17
Global Const OLE_SAVE_TO_OLE1FILE = 18

'OLEType
Global Const OLE_LINKED = 0
Global Const OLE_EMBEDDED = 1
Global Const OLE_NONE = 3

'OLETypeAllowed
Global Const OLE_EITHER = 2

'UpdateOptions
Global Const OLE_AUTOMATIC = 0
Global Const OLE_FROZEN = 1
Global Const OLE_MANUAL = 2

'AutoActivate modes
'Note that OLE_ACTIVATE_GETFOCUS only applies to objects that
'support "inside-out" activation.  See related Verb notes below.
Global Const OLE_ACTIVATE_MANUAL = 0
Global Const OLE_ACTIVATE_GETFOCUS = 1
Global Const OLE_ACTIVATE_DOUBLECLICK = 2

'SizeModes
Global Const OLE_SIZE_CLIP = 0
Global Const OLE_SIZE_STRETCH = 1
Global Const OLE_SIZE_AUTOSIZE = 2

'DisplayTypes
Global Const OLE_DISPLAY_CONTENT = 0
Global Const OLE_DISPLAY_ICON = 1

'Update Event Constants
Global Const OLE_CHANGED = 0
Global Const OLE_SAVED = 1
Global Const OLE_CLOSED = 2
Global Const OLE_RENAMED = 3

'Special Verb Values
Global Const VERB_PRIMARY = 0
Global Const VERB_SHOW = -1
Global Const VERB_OPEN = -2
Global Const VERB_HIDE = -3
Global Const VERB_INPLACEUIACTIVATE = -4
Global Const VERB_INPLACEACTIVATE = -5
'The last two verbs are for objects that support "inside-out" activation,
'meaning they can be edited in-place, and that they support being left
'in-place-active even when the input focus moves to another control or form.
```

```
'These objects actually have 2 levels of being active.  "InPlace Active"
'means that the object is ready for the user to click inside it and start
'working with it.  "In-Place UI-Active" means that, in addition, if the object
'has any other UI associated with it, such as floating palette windows,
'that those windows are visible and ready for use.  Any number of objects
'can be "In-Place Active" at a time, although only one can be
'"InPlace UI-Active".

'You can cause an object to move to either one of states programmatically by
'setting the Verb property to the appropriate verb and setting
'Action=OLE_ACTIVATE.

'Also, if you set AutoActivate = OLE_ACTIVATE_GETFOCUS, the server will
'automatically be put into "InPlace UI-Active" state when the user clicks
'on or tabs into the control.

'VerbFlag Bit Masks
Global Const VERBFLAG_GRAYED = &H1
Global Const VERBFLAG_DISABLED = &H2
Global Const VERBFLAG_CHECKED = &H8
Global Const VERBFLAG_SEPARATOR = &H800

'MiscFlag Bits - Or these together as desired for special behaviors

'MEMSTORAGE causes the control to use memory to store the object while
'           it is loaded.  This is faster than the default (disk-tempfile),
'           but can consume a lot of memory for objects whose data takes
'           up a lot of space, such as the bitmap for a paint program.
Global Const OLE_MISCFLAG_MEMSTORAGE = &H1

'DISABLEINPLACE overrides the control's default behavior of allowing
'           in-place activation for objects that support it.  If you
'           are having problems activating an object inplace, you can
'           force it to always activate in a separate window by setting this
'           bit
Global Const OLE_MISCFLAG_DISABLEINPLACE = &H2

'Common Dialog Control
'Action Property
Global Const DLG_FILE_OPEN = 1
Global Const DLG_FILE_SAVE = 2
Global Const DLG_COLOR = 3
Global Const DLG_FONT = 4
Global Const DLG_PRINT = 5
Global Const DLG_HELP = 6

'File Open/Save Dialog Flags
Global Const OFN_READONLY = &H1&
Global Const OFN_OVERWRITEPROMPT = &H2&
Global Const OFN_HIDEREADONLY = &H4&
Global Const OFN_NOCHANGEDIR = &H8&
Global Const OFN_SHOWHELP = &H10&
Global Const OFN_NOVALIDATE = &H100&
Global Const OFN_ALLOWMULTISELECT = &H200&
Global Const OFN_EXTENSIONDIFFERENT = &H400&
Global Const OFN_PATHMUSTEXIST = &H800&
Global Const OFN_FILEMUSTEXIST = &H1000&
Global Const OFN_CREATEPROMPT = &H2000&
Global Const OFN_SHAREAWARE = &H4000&
Global Const OFN_NOREADONLYRETURN = &H8000&
```

```
'Color Dialog Flags
Global Const CC_RGBINIT = &H1&
Global Const CC_FULLOPEN = &H2&
Global Const CC_PREVENTFULLOPEN = &H4&
Global Const CC_SHOWHELP = &H8&

'Fonts Dialog Flags
Global Const CF_SCREENFONTS = &H1&
Global Const CF_PRINTERFONTS = &H2&
Global Const CF_BOTH = &H3&
Global Const CF_SHOWHELP = &H4&
Global Const CF_INITTOLOGFONTSTRUCT = &H40&
Global Const CF_USESTYLE = &H80&
Global Const CF_EFFECTS = &H100&
Global Const CF_APPLY = &H200&
Global Const CF_ANSIONLY = &H400&
Global Const CF_NOVECTORFONTS = &H800&
Global Const CF_NOSIMULATIONS = &H1000&
Global Const CF_LIMITSIZE = &H2000&
Global Const CF_FIXEDPITCHONLY = &H4000&
Global Const CF_WYSIWYG = &H8000&             'must also have CF_SCREENFONTS & CF_PP
INTERFONTS
Global Const CF_FORCEFONTEXIST = &H10000
Global Const CF_SCALABLEONLY = &H20000
Global Const CF_TTONLY = &H40000
Global Const CF_NOFACESEL = &H80000
Global Const CF_NOSTYLESEL = &H100000
Global Const CF_NOSIZESEL = &H200000

'Printer Dialog Flags
Global Const PD_ALLPAGES = &H0&
Global Const PD_SELECTION = &H1&
Global Const PD_PAGENUMS = &H2&
Global Const PD_NOSELECTION = &H4&
Global Const PD_NOPAGENUMS = &H8&
Global Const PD_COLLATE = &H10&
Global Const PD_PRINTTOFILE = &H20&
Global Const PD_PRINTSETUP = &H40&
Global Const PD_NOWARNING = &H80&
Global Const PD_RETURNDC = &H100&
Global Const PD_RETURNIC = &H200&
Global Const PD_RETURNDEFAULT = &H400&
Global Const PD_SHOWHELP = &H800&
Global Const PD_USEDEVMODECOPIES = &H40000
Global Const PD_DISABLEPRINTTOFILE = &H80000
Global Const PD_HIDEPRINTTOFILE = &H100000

'Help Constants
Global Const HELP_CONTEXT = &H1           'Display topic in ulTopic
Global Const HELP_QUIT = &H2              'Terminate help
Global Const HELP_INDEX = &H3             'Display index
Global Const HELP_CONTENTS = &H3
Global Const HELP_HELPONHELP = &H4        'Display help on using help
Global Const HELP_SETINDEX = &H5          'Set the current Index for multi index
 help
Global Const HELP_SETCONTENTS = &H5
Global Const HELP_CONTEXTPOPUP = &H8
Global Const HELP_FORCEFILE = &H9
Global Const HELP_KEY = &H101             'Display topic for keyword in offabDat
a
Global Const HELP_COMMAND = &H102
```

```
Global Const HELP_PARTIALKEY = &H105      'call the search engine in winhelp 'Error Constants
Global Const CDERR_DIALOGFAILURE = -32768

Global Const CDERR_GENERALCODES = &H7FFF
Global Const CDERR_STRUCTSIZE = &H7FFE
Global Const CDERR_INITIALIZATION = &H7FFD
Global Const CDERR_NOTEMPLATE = &H7FFC
Global Const CDERR_NOHINSTANCE = &H7FFB
Global Const CDERR_LOADSTRFAILURE = &H7FFA
Global Const CDERR_FINDRESFAILURE = &H7FF9
Global Const CDERR_LOADRESFAILURE = &H7FF8
Global Const CDERR_LOCKRESFAILURE = &H7FF7
Global Const CDERR_MEMALLOCFAILURE = &H7FF6
Global Const CDERR_MEMLOCKFAILURE = &H7FF5
Global Const CDERR_NOHOOK = &H7FF4

'Added for CMDIALOG.VBX
Global Const CDERR_CANCEL = &H7FF3
Global Const CDERR_NODLL = &H7FF2
Global Const CDERR_ERRPROC = &H7FF1
Global Const CDERR_ALLOC = &H7FF0
Global Const CDERR_HELP = &H7FEF Global Const PDERR_PRINTERCODES = &H6FFF
Global Const PDERR_SETUPFAILURE = &H6FFE
Global Const PDERR_PARSEFAILURE = &H6FFD
Global Const PDERR_RETDEFFAILURE = &H6FFC
Global Const PDERR_LOADDRVFAILURE = &H6FFB
Global Const PDERR_GETDEVMODEFAIL = &H6FFA
Global Const PDERR_INITFAILURE = &H6FF9
Global Const PDERR_NODEVICES = &H6FF8
Global Const PDERR_NODEFAULTPRN = &H6FF7
Global Const PDERR_DNDMMISMATCH = &H6FF6
Global Const PDERR_CREATEICFAILURE = &H6FF5
Global Const PDERR_PRINTERNOTFOUND = &H6FF4

Global Const CFERR_CHOOSEFONTCODES = &H5FFF
Global Const CFERR_NOFONTS = &H5FFE

Global Const FNERR_FILENAMECODES = &H4FFF
Global Const FNERR_SUBCLASSFAILURE = &H4FFE
Global Const FNERR_INVALIDFILENAME = &H4FFD
Global Const FNERR_BUFFERTOOSMALL = &H4FFC Global Const FRERR_FINDREPLACECODES = &H3FFF
Global Const CCERR_CHOOSECOLORCODES = &H2FFF '---------------------------------------------------------------
'       Table of Contents for Visual Basic Professional
'
'       1.  3-D Controls
'           (Frame/Panel/Option/Check/Command/Group Push)
'       2.  Animated Button
'       3.  Gauge Control
'       4.  Graph Control Section
'       5.  Key Status Control
'       6.  Spin Button
'       7.  MCI Control (Multimedia)
```

```
'       8. Masked Edit Control
'       9. Comm Control
'       10. Outline Control
'-----------------------------------------------------------

'-----------------------------------------------------------
'3D Controls
'-----------------------------------------------------------
'Alignment (Check Box)
Global Const SSCB_TEXT_RIGHT = 0          '0 - Text to the right
Global Const SSCB_TEXT_LEFT = 1           '1 - Text to the left 'Alignment (Option Button)
Global Const SSOB_TEXT_RIGHT = 0          '0 - Text to the right
Global Const SSOB_TEXT_LEFT = 1           '1 - Text to the left 'Alignment (Frame)
Global Const SSFR_LEFT_JUSTIFY = 0        '0 - Left justify text
Global Const SSFR_RIGHT_JUSTIFY = 1       '1 - Right justify text
Global Const SSFR_CENTER = 2              '2 - Center text 'Alignment (Panel)
Global Const SSPN_LEFT_TOP = 0            '0 - Text to left and top
Global Const SSPN_LEFT_MIDDLE = 1         '1 - Text to left and middle
Global Const SSPN_LEFT_BOTTOM = 2         '2 - Text to left and bottom
Global Const SSPN_RIGHT_TOP = 3           '3 - Text to right and top
Global Const SSPN_RIGHT_MIDDLE = 4        '4 - Text to right and middle
Global Const SSPN_RIGHT_BOTTOM = 5        '5 - Text to right and bottom
Global Const SSPN_CENTER_TOP = 6          '6 - Text to center and top
Global Const SSPN_CENTER_MIDDLE = 7       '7 - Text to center and middle
Global Const SSPN_CENTER_BOTTOM = 8       '8 - Text to center and bottom 'Autosize (Command Button)
Global Const SS_AUTOSIZE_NONE = 0         '0 - No Autosizing
Global Const SSPB_AUTOSIZE_PICTOBUT = 1   '0 - Autosize Picture to Button
Global Const SSPB_AUTOSIZE_BUTTOPIC = 2   '0 - Autosize Button to Picture 'Autosize (Ribbon Button)
'Global Const SS_AUTOSIZE_NONE     = 0    '0 - No Autosizing
Global Const SSRI_AUTOSIZE_PICTOBUT = 1   '0 - Autosize Picture to Button
Global Const SSRI_AUTOSIZE_BUTTOPIC = 2   '0 - Autosize Button to Picture 'Autosize (Panel)
'Global Const SS_AUTOSIZE_NONE     = 0    '0 - No Autosizing
Global Const SSPN_AUTOSIZE_WIDTH = 1      '1 - Autosize Panel width to Caption
Global Const SSPN_AUTOSIZE_HEIGHT = 2     '2 - Autosize Panel height to Caption
Global Const SSPN_AUTOSIZE_CHILD = 3      '3 - Autosize Child to Panel 'BevelInner (Panel)
Global Const SS_BEVELINNER_NONE = 0       '0 - No Inner Bevel
Global Const SS_BEVELINNER_INSET = 1      '1 - Inset Inner Bevel
Global Const SS_BEVELINNER_RAISED = 2     '2 - Raised Inner Bevel 'BevelOuter (Panel)
Global Const SS_BEVELOUTER_NONE = 0       '0 - No Outer Bevel
Global Const SS_BEVELOUTER_INSET = 1      '1 - Inset Outer Bevel
Global Const SS_BEVELOUTER_RAISED = 2     '2 - Raised Outer Bevel 'FloodType (Panel)
Global Const SS_FLOODTYPE_NONE = 0        '0 - No flood
```

```
Global Const SS_FLOODTYPE_L_TO_R = 1      '1 - Left to right
Global Const SS_FLOODTYPE_R_TO_L = 2      '2 - Right to left
Global Const SS_FLOODTYPE_T_TO_B = 3      '3 - Top to bottom
Global Const SS_FLOODTYPE_B_TO_T = 4      '4 - Bottom to top
Global Const SS_FLOODTYPE_CIRCLE = 5      '5 - Widening circle 'Font3D (Panel, Command Button, Option Button, Check Box, Frame)
Global Const SS_FONT3D_NONE = 0           '0 - No 3-D text
Global Const SS_FONT3D_RAISED_LIGHT = 1   '1 - Raised with light shading
Global Const SS_FONT3D_RAISED_HEAVY = 2   '2 - Raised with heavy shading
Global Const SS_FONT3D_INSET_LIGHT = 3    '3 - Inset with light shading
Global Const SS_FONT3D_INSET_HEAVY = 4    '4 - Inset with heavy shading 'PictureDnChange (Ribbon Button)
Global Const SS_PICDN_NOCHANGE = 0        '0 - Use 'Up'bitmap with no change
Global Const SS_PICDN_DITHER = 1          '1 - Dither 'Up'bitmap
Global Const SS_PICDN_INVERT = 2          '2 - Invert 'Up'bitmap 'ShadowColor (Panel, Frame)
Global Const SS_SHADOW_DARKGREY = 0       '0 - Dark grey shadow
Global Const SS_SHADOW_BLACK = 1          '1 - Black shadow 'ShadowStyle (Frame)
Global Const SS_SHADOW_INSET = 0          '0 - Shadow inset
Global Const SS_SHADOW_RAISED = 1         '1 - Shadow raised '-------------------------------------
'Animated Button
'-------------------------------------
'Cycle property
Global Const ANI_ANIMATED = 0
Global Const ANI_MULTISTATE = 1
Global Const ANI_TWO_STATE = 2

'Click Filter property
Global Const ANI_ANYWHERE = 0
Global Const ANI_IMAGE_AND_TEXT = 1
Global Const ANI_IMAGE = 2
Global Const ANI_TEXT = 3

'PicDrawMode Property
Global Const ANI_XPOS_YPOS = 0
Global Const ANI_AUTOSIZE = 1
Global Const ANI_STRETCH = 2

'SpecialOp Property
Global Const ANI_CLICK = 1

'TextPosition Property
Global Const ANI_CENTER = 0
Global Const ANI_LEFT = 1
Global Const ANI_RIGHT = 2
Global Const ANI_BOTTON = 3
Global Const ANI_TOP = 4

'-------------------------------------
'GAUGE
'-------------------------------------
'Style Property
```

```
Global Const GAUGE_HORIZ = 0
Global Const GAUGE_VERT = 1
Global Const GAUGE_SEMI = 2
Global Const GAUGE_FULL = 3

'------------------------------------
'Graph Control
'------------------------------------
'General
Global Const G_NONE = 0
Global Const G_DEFAULT = 0

Global Const G_OFF = 0
Global Const G_ON = 1

Global Const G_MONO = 0
Global Const G_COLOR = 1

'Graph Types
Global Const G_PIE2D = 1
Global Const G_PIE3D = 2
Global Const G_BAR2D = 3
Global Const G_BAR3D = 4
Global Const G_GANTT = 5
Global Const G_LINE = 6
Global Const G_LOGLIN = 7
Global Const G_AREA = 8
Global Const G_SCATTER = 9
Global Const G_POLAR = 10
Global Const G_HLC = 11

'Colors
Global Const G_BLACK = 0
Global Const G_BLUE = 1
Global Const G_GREEN = 2
Global Const G_CYAN = 3
Global Const G_RED = 4
Global Const G_MAGENTA = 5
Global Const G_BROWN = 6
Global Const G_LIGHT_GRAY = 7
Global Const G_DARK_GRAY = 8
Global Const G_LIGHT_BLUE = 9
Global Const G_LIGHT_GREEN = 10
Global Const G_LIGHT_CYAN = 11
Global Const G_LIGHT_RED = 12
Global Const G_LIGHT_MAGENTA = 13
Global Const G_YELLOW = 14
Global Const G_WHITE = 15
Global Const G_AUTOBW = 16

'Patterns
Global Const G_SOLID = 0
Global Const G_HOLLOW = 1
Global Const G_HATCH1 = 2
Global Const G_HATCH2 = 3
Global Const G_HATCH3 = 4
Global Const G_HATCH4 = 5
Global Const G_HATCH5 = 6
Global Const G_HATCH6 = 7
Global Const G_BITMAP1 = 16
```

```
Global Const G_BITMAP2 = 17
Global Const G_BITMAP3 = 18
Global Const G_BITMAP4 = 19
Global Const G_BITMAP5 = 20
Global Const G_BITMAP6 = 21
Global Const G_BITMAP7 = 22
Global Const G_BITMAP8 = 23
Global Const G_BITMAP9 = 24
Global Const G_BITMAP10 = 25
Global Const G_BITMAP11 = 26
Global Const G_BITMAP12 = 27
Global Const G_BITMAP13 = 28
Global Const G_BITMAP14 = 29
Global Const G_BITMAP15 = 30
Global Const G_BITMAP16 = 31

'Symbols
Global Const G_CROSS_PLUS = 0
Global Const G_CROSS_TIMES = 1
Global Const G_TRIANGLE_UP = 2
Global Const G_SOLID_TRIANGLE_UP = 3
Global Const G_TRIANGLE_DOWN = 4
Global Const G_SOLID_TRIANGLE_DOWN = 5
Global Const G_SQUARE = 6
Global Const G_SOLID_SQUARE = 7
Global Const G_DIAMOND = 8
Global Const G_SOLID_DIAMOND = 9

'Line Styles
'Global Const G_SOLID = 0
Global Const G_DASH = 1
Global Const G_DOT = 2
Global Const G_DASHDOT = 3
Global Const G_DASHDOTDOT = 4

'Grids
Global Const G_HORIZONTAL = 1
Global Const G_VERTICAL = 2

'Statistics
Global Const G_MEAN = 1
Global Const G_MIN_MAX = 2
Global Const G_STD_DEV = 4
Global Const G_BEST_FIT = 8

'Data Arrays
Global Const G_GRAPH_DATA = 1
Global Const G_COLOR_DATA = 2
Global Const G_EXTRA_DATA = 3
Global Const G_LABEL_TEXT = 4
Global Const G_LEGEND_TEXT = 5
Global Const G_PATTERN_DATA = 6
Global Const G_SYMBOL_DATA = 7
Global Const G_XPOS_DATA = 8
Global Const G_ALL_DATA = 9

'Draw Mode
Global Const G_NO_ACTION = 0
Global Const G_CLEAR = 1
Global Const G_DRAW = 2
Global Const G_BLIT = 3
```

```
Global Const G_COPY = 4
Global Const G_PRINT = 5
Global Const G_WRITE = 6

'Print Options
Global Const G_BORDER = 2

'Pie Chart Options                  '
Global Const G_NO_LINES = 1
Global Const G_COLORED = 2
Global Const G_PERCENTS = 4

'Bar Chart Options                  '
'Global Const G_HORIZONTAL = 1
Global Const G_STACKED = 2
Global Const G_PERCENTAGE = 4
Global Const G_Z_CLUSTERED = 6

'Gantt Chart Options                '
Global Const G_SPACED_BARS = 1

'Line/Polar Chart Options           '
Global Const G_SYMBOLS = 1
Global Const G_STICKS = 2
Global Const G_LINES = 4

'Area Chart Options                 '
Global Const G_ABSOLUTE = 1
Global Const G_PERCENT = 2

'HLC Chart Options                  '
Global Const G_NO_CLOSE = 1
Global Const G_NO_HIGH_LOW = 2

'----------------------------------------
'Key Status Control
'----------------------------------------
'Style
Global Const KEYSTAT_CAPSLOCK = 0
Global Const KEYSTAT_NUMLOCK = 1
Global Const KEYSTAT_INSERT = 2
Global Const KEYSTAT_SCROLLLOCK = 3

'----------------------------------------
'MCI Control (Multimedia)
'----------------------------------------
'NOTE:
'Please use the updated Multimedia constants
'in the WINMMSYS.TXT file from the \VB\WINAPI
'subdirectory.

'Mode Property
'Global Const MCI_MODE_NOT_OPEN = 11
'Global Const MCI_MODE_STOP = 12
'Global Const MCI_MODE_PLAY = 13
'Global Const MCI_MODE_RECORD = 14
'Global Const MCI_MODE_SEEK = 15
'Global Const MCI_MODE_PAUSE = 16
'Global Const MCI_MODE_READY = 17
```

```
'NotifyValue Property
'Global Const MCI_NOTIFY_SUCCESSFUL = 1
'Global Const MCI_NOTIFY_SUPERSEDED = 2
'Global Const MCI_ABORTED = 4
'Global Const MCI_FAILURE = 8

'Orientation Property
'Global Const MCI_ORIENT_HORZ = 0
'Global Const MCI_ORIENT_VERT = 1

'RecordMode Porperty
'Global Const MCI_RECORD_INSERT = 0
'Global Const MCI_RECORD_OVERWRITE = 1

'TimeFormat Property
'Global Const MCI_FORMAT_MILLISECONDS = 0
'Global Const MCI_FORMAT_HMS = 1
'Global Const MCI_FORMAT_MSF = 2
'Global Const MCI_FORMAT_FRAMES = 3
'Global Const MCI_FORMAT_SMPTE_24 = 4
'Global Const MCI_FORMAT_SMPTE_25 = 5
'Global Const MCI_FORMAT_SMPTE_30 = 6
'Global Const MCI_FORMAT_SMPTE_30DROP = 7
'Global Const MCI_FORMAT_BYTES = 8
'Global Const MCI_FORMAT_SAMPLES = 9
'Global Const MCI_FORMAT_TMSF = 10

'---------------------------------------
'Spin Button
'---------------------------------------
'SpinOrientation
Global Const SPIN_VERTICAL = 0
Global Const SPIN_HORIZONTAL = 1

'---------------------------------------
'Masked Edit Control
'---------------------------------------
'ClipMode
Global Const ME_INCLIT = 0
Global Const ME_EXCLIT = 1

'---------------------------------------
'Comm Control
'---------------------------------------
'Handshaking
Global Const MSCOMM_HANDSHAKE_NONE = 0
Global Const MSCOMM_HANDSHAKE_XONXOFF = 1
Global Const MSCOMM_HANDSHAKE_RTS = 2
Global Const MSCOMM_HANDSHAKE_RTSXONXOFF = 3

'Event constants
Global Const MSCOMM_EV_SEND = 1
Global Const MSCOMM_EV_RECEIVE = 2
Global Const MSCOMM_EV_CTS = 3
Global Const MSCOMM_EV_DSR = 4
Global Const MSCOMM_EV_CD = 5
Global Const MSCOMM_EV_RING = 6
```

```
Global Const MSCOMM_EV_EOF = 7

'Error code constants
Global Const MSCOMM_ER_BREAK = 1001
Global Const MSCOMM_ER_CTSTO = 1002
Global Const MSCOMM_ER_DSRTO = 1003
Global Const MSCOMM_ER_FRAME = 1004
Global Const MSCOMM_ER_OVERRUN = 1006
Global Const MSCOMM_ER_CDTO = 1007
Global Const MSCOMM_ER_RXOVER = 1008
Global Const MSCOMM_ER_RXPARITY = 1009
Global Const MSCOMM_ER_TXFULL = 1010

'----------------------------------------
' MAPI SESSION CONTROL CONSTANTS
'----------------------------------------
'Action
Global Const SESSION_SIGNON = 1
Global Const SESSION_SIGNOFF = 2

'----------------------------------------
' MAPI MESSAGE CONTROL CONSTANTS
'----------------------------------------
'Action
Global Const MESSAGE_FETCH = 1              ' Load all messages from message store
Global Const MESSAGE_SENDDLG = 2            ' Send mail bring up default mapi dialog
Global Const MESSAGE_SEND = 3               ' Send mail without default mapi dialog
Global Const MESSAGE_SAVEMSG = 4            ' Save message in the compose buffer
Global Const MESSAGE_COPY = 5               ' Copy current message to compose buffer
Global Const MESSAGE_COMPOSE = 6            ' Initialize compose buffer (previous
                                            ' data is lost
Global Const MESSAGE_REPLY = 7              ' Fill Compose buffer as REPLY
Global Const MESSAGE_REPLYALL = 8           ' Fill Compose buffer as REPLY ALL
Global Const MESSAGE_FORWARD = 9            ' Fill Compose buffer as FORWARD
Global Const MESSAGE_DELETE = 10            ' Delete current message
Global Const MESSAGE_SHOWADBOOK = 11        ' Show Address book
Global Const MESSAGE_SHOWDETAILS = 12       ' Show details of the current recipient
Global Const MESSAGE_RESOLVENAME = 13       ' Resolve the display name of the recipient
Global Const RECIPIENT_DELETE = 14           ' Fill Compose buffer as FORWARD
Global Const ATTACHMENT_DELETE = 15         ' Delete current message '----------------------------------------
'   ERROR CONSTANT DECLARATIONS (MAPI CONTROLS)
'----------------------------------------
Global Const SUCCESS_SUCCESS = 32000
Global Const MAPI_USER_ABORT = 32001
Global Const MAPI_E_FAILURE = 32002
Global Const MAPI_E_LOGIN_FAILURE = 32003
Global Const MAPI_E_DISK_FULL = 32004
Global Const MAPI_E_INSUFFICIENT_MEMORY = 32005
Global Const MAPI_E_ACCESS_DENIED = 32006
Global Const MAPI_E_TOO_MANY_SESSIONS = 32008
```

```
Global Const MAPI_E_TOO_MANY_FILES = 32009
Global Const MAPI_E_TOO_MANY_RECIPIENTS = 32010
Global Const MAPI_E_ATTACHMENT_NOT_FOUND = 32011
Global Const MAPI_E_ATTACHMENT_OPEN_FAILURE = 32012
Global Const MAPI_E_ATTACHMENT_WRITE_FAILURE = 32013
Global Const MAPI_E_UNKNOWN_RECIPIENT = 32014
Global Const MAPI_E_BAD_RECIPTYPE = 32015
Global Const MAPI_E_NO_MESSAGES = 32016
Global Const MAPI_E_INVALID_MESSAGE = 32017
Global Const MAPI_E_TEXT_TOO_LARGE = 32018
Global Const MAPI_E_INVALID_SESSION = 32019
Global Const MAPI_E_TYPE_NOT_SUPPORTED = 32020
Global Const MAPI_E_AMBIGUOUS_RECIPIENT = 32021
Global Const MAPI_E_MESSAGE_IN_USE = 32022
Global Const MAPI_E_NETWORK_FAILURE = 32023
Global Const MAPI_E_INVALID_EDITFIELDS = 32024
Global Const MAPI_E_INVALID_RECIPS = 32025
Global Const MAPI_E_NOT_SUPPORTED = 32026

Global Const CONTROL_E_SESSION_EXISTS = 32050
Global Const CONTROL_E_INVALID_BUFFER = 32051
Global Const CONTROL_E_INVALID_READ_BUFFER_ACTION = 32052
Global Const CONTROL_E_NO_SESSION = 32053
Global Const CONTROL_E_INVALID_RECIPIENT = 32054
Global Const CONTROL_E_INVALID_COMPOSE_BUFFER_ACTION = 32055
Global Const CONTROL_E_FAILURE = 32056
Global Const CONTROL_E_NO_RECIPIENTS = 32057
Global Const CONTROL_E_NO_ATTACHMENTS = 32058

'----------------------------------------
'  MISCELLANEOUS GLOBAL CONSTANT DECLARATIONS (MAPI CONTROLS)
'----------------------------------------
Global Const RECIPTYPE_ORIG = 0
Global Const RECIPTYPE_TO = 1
Global Const RECIPTYPE_CC = 2
Global Const RECIPTYPE_BCC = 3

Global Const ATTACHTYPE_DATA = 0
Global Const ATTACHTYPE_EOLE = 1
Global Const ATTACHTYPE_SOLE = 2

'----------------------------------------------------
'  Outline
'----------------------------------------------------
' PictureType
Global Const MSOUTLINE_PICTURE_CLOSED = 0
Global Const MSOUTLINE_PICTURE_OPEN = 1
Global Const MSOUTLINE_PICTURE_LEAF = 2

'Outline Control Error Constants
Global Const MSOUTLINE_BADPICFORMAT = 32000
Global Const MSOUTLINE_BADINDENTATION = 32001
Global Const MSOUTLINE_MEM = 32002
Global Const MSOUTLINE_PARENTNOTEXPANDED = 32003

' *******************************************************
'
' Data Access constants
```

```
' Option argument values (CreateDynaset, etc)
Global Const DB_DENYWRITE = &H1
Global Const DB_DENYREAD = &H2
Global Const DB_READONLY = &H4
Global Const DB_APPENDONLY = &H8
Global Const DB_INCONSISTENT = &H10
Global Const DB_CONSISTENT = &H20
Global Const DB_SQLPASSTHROUGH = &H40

' SetDataAccessOption
Global Const DB_OPTIONINIPATH = 1

' Field Attributes
Global Const DB_FIXEDFIELD = &H1
Global Const DB_VARIABLEFIELD = &H2
Global Const DB_AUTOINCRFIELD = &H10
Global Const DB_UPDATABLEFIELD = &H20

' Field Data Types
Global Const DB_BOOLEAN = 1
Global Const DB_BYTE = 2
Global Const DB_INTEGER = 3
Global Const DB_LONG = 4
Global Const DB_CURRENCY = 5
Global Const DB_SINGLE = 6
Global Const DB_DOUBLE = 7
Global Const DB_DATE = 8
Global Const DB_TEXT = 10
Global Const DB_LONGBINARY = 11
Global Const DB_MEMO = 12

' TableDef Attributes
Global Const DB_ATTACHEXCLUSIVE = &H10000
Global Const DB_ATTACHSAVEPWD = &H20000
Global Const DB_SYSTEMOBJECT = &H80000002
Global Const DB_ATTACHEDTABLE = &H40000000
Global Const DB_ATTACHEDODBC = &H20000000

' ListTables TableType
Global Const DB_TABLE = 1
Global Const DB_QUERYDEF = 5

' ListTables Attributes (for QueryDefs)
Global Const DB_QACTION = &HF0
Global Const DB_QCROSSTAB = &H10
Global Const DB_QDELETE = &H20
Global Const DB_QUPDATE = &H30
Global Const DB_QAPPEND = &H40
Global Const DB_QMAKETABLE = &H50

' ListIndexes IndexAttributes values
Global Const DB_UNIQUE = 1
Global Const DB_PRIMARY = 2
Global Const DB_PROHIBITNULL = 4
Global Const DB_IGNORENULL = 8
' ListIndexes FieldAttributes value
Global Const DB_DESCENDING = 1    'For each field in Index ' CreateDatabase and CompactDatabase Language constants
```

```
Global Const DB_LANG_GENERAL = ";LANGID=0x0809;CP=1252;COUNTRY=0"
Global Const DB_LANG_SPANISH = ";LANGID=0x040A;CP=1252;COUNTRY=0"
Global Const DB_LANG_DUTCH = ";LANGID=0x0413;CP=1252;COUNTRY=0"
Global Const DB_LANG_SWEDFIN = ";LANGID=0x040C;CP=1252;COUNTRY=0"    'VB3 and Acc
ess 1.1 Databases
Global Const DB_LANG_NORWDAN = ";LANGID=0x0414;CP=1252;COUNTRY=0"    'VB3 and Acc
ess 1.1 Databases
Global Const DB_LANG_ICELANDIC = ";LANGID=0x040F;CP=1252;COUNTRY=0"  'VB3 and Acc
ess 1.1 Databases
Global Const DB_LANG_NORDIC = ";LANGID=0x041D;CP=1252;COUNTRY=0"     'Access 1.0
Databases only ' CreateDatabase and CompactDatabase options
Global Const DB_VERSION10 = 1        ' Microsoft Access Version 1.0
Global Const DB_ENCRYPT = 2          ' Make database encrypted.
Global Const DB_DECRYPT = 4          ' Decrypt database while compacting.

'Collating order values
Global Const DB_SORTGENERAL = 256    ' Sort by EFGPI rules (English, French, Ger
man,Portuguese, Italian)
Global Const DB_SORTSPANISH = 258    ' Sort by Spanish rules
Global Const DB_SORTDUTCH = 259      ' Sort by Dutch rules
Global Const DB_SORTSWEDFIN = 260    ' Sort by Swedish, Finnish rules
Global Const DB_SORTNORWDAN = 261    ' Sort by Norwegian, Danish rules
Global Const DB_SORTICELANDIC = 262  ' Sort by Icelandic rules
Global Const DB_SORTPDXINTL = 4096   ' Sort by Paradox international rules
Global Const DB_SORTPDXSWE = 4097    ' Sort by Paradox Swedish, Finnish rules
Global Const DB_SORTPDXNOR = 4098    ' Sort by Paradox Norwegian, Danish rules
Global Const DB_SORTUNDEFINED = -1   ' Sort rules are undefined or unknown Sub add_index (database_id As Database, table_id As String, tbl As database_tabl
es)

'Subroutine USAGE and Arguments
'
'
'GLOBAL/EXTERNAL DEPENDANCIES
'    (none)
'
'MODIFICATION HISTORY:
'    (none)
'
'FUNCTIONAL DESCRIPTION:
'
'
'
'NOTES:
'    (none)

Dim Indx As New Index
    Dim tbl_id As New Tabledef
    tbl_id = table_id

On Error GoTo 110

'   Add the specified index to the specified table
'   ------------------------------------------------
    Indx.Name = Left$(tbl.Index.name, end_of_line(tbl.Index.name))
    Indx.Fields = Left$(tbl.Index.Fields, end_of_line(tbl.Index.Fields))
    Indx.Unique = tbl.Index.Unique
```

```
        database_id.TableDefs(tbl_id).Indexes.Append Indx
Exit Sub

110 :
    Call database_error(Err, "Add Index")
End Sub

Sub add_table (database_id As Database, table_id As String, tbl As database_tabl
es)

Dim new_table As New Tabledef
    ReDim new_field(tbl.num_fields) As New Field

'On Error GoTo 100

'   Add fields to the new table
'   ---------------------------
    new_table = table_id
    For i = 1 To tbl.num_fields
        hold$ = tbl.Field(i).name
        new_field(i).Name = Left$(hold$, end_of_line(hold$))
        new_field(i).Type = tbl.Field(i).Type
        new_field(i).Size = tbl.Field(i).Size
        new_table.Fields.Append new_field(i)
    Next i '   Add the new table to the database
'   ---------------------------------
    database_id.TableDefs.Append new_table
Exit Sub 100 :
    Call database_error(Err, "Add Table")
End Sub Sub database_error (errmsg As Integer, from_where As String)
    MsgBox Str(errmsg), 0, from_where
End Sub Function decode_cum_time (time_string As String) As Double 'FUNCTION USAGE and Arguments
'
'   seconds{integer} = DECODE_CUM_TIME(interval{string})
'
'   Where interval is a string in the format "00:00:00"
'                       Hours ---------------^^ ^^ ^^
'                       Miniutes ---------------^^ ^^
'                       Seconds -------------------^^
'
'
'GLOBAL/EXTERNAL DEPENDANCIES
'    (none)
'
'MODIFICATION HISTORY:
'    (none)
'
'FUNCTIONAL DESCRIPTION:
'
```

```
'   This function returns the integer number of seconds
'   represented by the formatted string passed as an
'   argument
'
'NOTES:
'   Reciprocal character function is FORMAT_CUM_TIME()
'

Dim hr, min, sec As Integer hr = Val(Left$(time_string, 1))
    min = Val(Mid$(time_string, 3, 2))
    sec = Val(Right$(time_string, 2))
    decode_cum_time = sec + (min * 60) + (hr * 3600)

End Function

Sub delete_table (
```

What is claimed is:

1. A video media distribution network comprising:
   a distribution center for transmitting video program segments to a plurality of receiving sites;
   receivers located at the receiving sites;
   a tracking system tracking product movement at the receiving sites;
   a network management system forming playlists for each of the receiving sites in response to inputs from a user, the user having access to the product movement information from the tracking system; and
   display units for displaying the playlists at the receiving sites;
   wherein the tracking system tracks previously played program segments and wherein the network management system determines the playlists in response to both the product movement and the previously played program segments.

2. The video media distribution network of claim 1 further comprising, a data communications link between the distribution center and the receiving sites for transmitting information including reception verification, alarm messages and statistical information.

3. The video media distribution network of claim 1 further comprising, a plurality of controllers storing and playing back the program segments, the controllers playing back the program segments after time delays in response to the network management system.

4. The video media distribution network of claim 1 further comprising, at least one personal computer controlling transmission of the program segments and placement of the program segments in the playlists.

5. The video media distribution network of claim 1, wherein the receiving sites comprise stores.

6. The video media distribution network of claim 1, wherein the distribution center further comprises a satellite for transmitting the video program segments.

7. The video media distribution network of claim 1, wherein the distribution center further comprises a optical fiber link for transmitting the video program segments.

8. The video media distribution network of claim 1, wherein the distribution center further comprises a dedicated communication channel for transmitting the video program segments.

9. The video media distribution network of claim 1, wherein control data is placed in the video program segments.

10. The video media distribution network of claim 1, wherein the display units comprise television sets.

11. The video media distribution network of claim 1, wherein the receiving sites comprise schools.

12. The video media distribution network of claim 1, wherein the receiving sites comprise hospitals.

13. The video media distribution network of claim 1, wherein the video program segments result in a multimedia display.

14. The video media distribution network of claim 1, wherein the video program segments are stored at the receiving sites and forwarded to the display unit for display in response to the playlists formed by the network management system.

15. A video media distribution network comprising:
   a distribution center for transmitting video program segments to a plurality of stores, the stores having associated receiver addresses, and the video program segments having associated clip numbers;
   receivers located at the stores;
   a tracking system tracking product movement at the stores and tracking previously played program segments at the stores, the tracking system organizing information based on the receiver addresses and the clip numbers;
   a network management system forming playlists for the stores in response to inputs from a user, the user having access to information about the product movement and the previously played program segments; and
   display units for displaying the playlists at the stores.

16. The method of broadcasting video program segments in claim 15 further comprising, transmitting information to the stores, the information including reception verification, alarm messages and statistical information.

17. The method of broadcasting video program segments in claim 15, wherein the receivers receive and store the video program segments and playing back of the stored program segments occurs after time delays, the time delays being in response to a network management system.

18. The method of broadcasting video program segments in claim 15, wherein the transmitting of the video program segments is done with a satellite.

19. The method of broadcasting video program segments in claim 15, wherein the transmitting of the video program segments is done with an optical fiber link.

20. The method of broadcasting video program segments in claim 15, wherein the transmitting of the video program segments is done with a dedicated communication channel.

21. The method of broadcasting video program segments in claim 15, wherein control data is placed in the video program segments.

22. The method of broadcasting video program segments in claim 15, wherein the video display units comprise television sets.

23. The method of broadcasting video program segments in claim 15, wherein the video program segments result in a multi-media display.

* * * * *